United States Patent
Perriello

(12)
(10) Patent No.: US 6,245,235 B1
(45) Date of Patent: *Jun. 12, 2001

(54) SYSTEM AND METHOD OF IN-SITU BIOREMEDIATION WITH BUTANE-UTILIZING BACTERIA

(76) Inventor: Felix Anthony Perriello, 608 Normandy Dr., Norwood, MA (US) 02062

(*) Notice: Subject to any disclaimer, the term of this patent is extended or adjusted under 35 U.S.C. 154(b) by 0 days.

This patent is subject to a terminal disclaimer.

(21) Appl. No.: 09/275,320

(22) Filed: Mar. 24, 1999

Related U.S. Application Data

(63) Continuation-in-part of application No. 08/767,750, filed on Dec. 17, 1996, now Pat. No. 5,888,396.

(51) Int. Cl.$^7$ ........................................ C02F 3/34
(52) U.S. Cl. .................. 210/611; 210/620; 210/747; 210/908; 210/909; 435/262.5
(58) Field of Search ............................. 210/610, 611, 210/620, 908, 909, 747; 435/262, 262.5

(56) References Cited

U.S. PATENT DOCUMENTS

| | | |
|---|---|---|
| 3,846,290 | * 11/1974 | Raymond .................. 210/610 |
| 4,713,343 | 12/1987 | Wilson, Jr. et al. . |
| 5,006,250 | * 4/1991 | Roberts et al. ............ 210/610 |
| 5,037,551 | 8/1991 | Barkley et al. . |
| 5,057,221 | 10/1991 | Bryant et al. . |
| 5,302,286 | * 4/1994 | Semprini et al. .......... 210/747 |
| 5,316,940 | 5/1994 | Georgiou et al. . |
| 5,326,703 | 7/1994 | Hazen et al. . |
| 5,342,769 | 8/1994 | Hunter et al. . |
| 5,384,048 | 1/1995 | Hazen et al. . |
| 5,441,887 | 8/1995 | Hanson et al. . |
| 5,814,514 | 9/1998 | Steffan et al. . |

OTHER PUBLICATIONS

Fogel et al., Biodegradation of Chlorinated Ethenes by a Methane–Utilizing Mixed Culture, *Applied and Environment Microbiology*, vol. 51, No. 4, pp. 720–724 (Apr. 1986).

Wackett et al., Survey of Microbial Oxygenases: Trichloroethylene Degradation by Propane–Oxidizing Bacteria, *Applied and Environmental Microbiology*, vol. 55, No. 11, pp. 2960–2964 (Nov. 1989).

Broholm et al., Toxicity of 1,1,1,–Trichloroethane and Trichloroethene on a Mixed Culture of Methane–Oxidizing Bacteria, *Applied and Environmental Microbiology*, vol. 56, No. 8, pp. 2488–2493 (Aug. 1990).

Fox, Status and Trends in Bioremediation Treatment Technology, *Remediation*, pp. 293–303 (Summer 1991).

(List continued on next page.)

*Primary Examiner*—Christopher Upton
(74) *Attorney, Agent, or Firm*—Alan G. Towner; Eckert Seamans Cherin & Mellott, LLC

(57) ABSTRACT

A system and method are disclosed in which butane-utilizing bacteria are used to degrade pollutants such as trichloroethene (TCE) and trichloroethane (TCA) in-situ at contaminated sites. In a preferred embodiment, pollutant concentrations are reduced by injecting a butane substrate and an oxygen-containing gas into a contaminated area to stimulate the growth of butane-utilizing bacteria which degrade the pollutants by cometabolism or direct metabolism. Use of the butane/oxygen injection system results in substantially improved treatment of contaminated sites.

99 Claims, 22 Drawing Sheets

OTHER PUBLICATIONS

Alvarez–Cohen et al., Characterization of a Methane–Utilizing Bacterium from a Bacterial Consortium That Rapidly Degrades Trichloroethylene and Chloroform, *Applied and Environmental Microbiology*, Vo. 58, No. 6, pp. 1886–1893 (Jun. 1992).

Chang et al., Transformation Capacities of Chlorinated Organics by Mixed Cultures Enriched on Methane, Propane, Toluene, or Phenol, *Biotechnology and Bioengineering*, vol. 45, pp. 440–449 (Nov. 9, 1994).

Kim et al., Aerobic Cometabolism of Chloroform and 1,1,1,–Trichloroethane by Butane–Grown Microorganisms, *Bioremediation Journal*, vol. 1, No. 2, pp. 135–148 (1997).

Hamamura et al., Chloroform Cometabolism by Butane–Grown CF8, *Pseudomonas butanovora*, and *Myobacterium vaccae* JOB5 and Methane–Grown *Methylosinus trichosporium* OB3b, *Applied and Environmental Microbiology*, vol. 63, No. 9, pp. 3607–3613 (Sep. 1997).

Steffan et al., Biodegration of the Gasoline Oxygenates Methyl tert–Butyl Ether, Ethyl tert–Butyl Ether, and tert–Amyl Methyl Ether by Propane–Oxidizing Bacteria, *Applied and Environment Microbiology*, vol. 63, No. 11, pp. 4216–4222, (Nov. 1997).

\* cited by examiner

SYSTEM AND METHOD OF IN-SITU BIOREMEDIATION WITH BUTANE-UTILIZING BACTERIA

CROSS-REFERENCE TO RELATED APPLICATION

This application is a continuation-in-part of U.S. patent application Ser. No. 08/767,750 filed Dec. 17, 1996, now U.S. Pat. No. 5,888,396 which is incorporated herein by reference.

FIELD OF THE INVENTION

The present invention relates to the degradation of pollutants, and more particularly relates to a system and method of bioremediation of pollutants such as chlorinated aliphatic hydrocarbons using butane-utilizing microorganisms.

BACKGROUND INFORMATION

Chlorinated, volatile, aliphatic hydrocarbons such as trichloroethane (TCE) are the most commonly reported contaminants of groundwater. Through releases of solvents, degreasers and other compounds, chlorinated compound contamination in surface and subsurface environments has reached high levels, and in many areas has seriously jeopardized drinking water aquifers and reservoirs. TCE is a suspected human carcinogen and remains the number one priority pollutant on the National Priority List of the U.S. Environmental Protection Agency.

When the discovery of the magnitude of chlorinated contamination in aquifer systems in the United States, and worldwide, came to light in the early 1980s, few approaches were developed to aggressively remediate the chlorinated contaminated sites. Available remediation methods for subsurface environments include air sparging of the groundwater and the vacuum extraction of contaminants from the vadose zone. These remedial strategies transfer contamination from the subsurface environment to either the air or to activated carbon which must then be landfilled or incinerated. Landfilling contaminated activated carbon transfers the contamination from one source area to another while incineration is costly and requires considerable energy and costly equipment to completely volatilize organic compounds. In particular, groundwater and soil contaminated with chlorinated pollutants are currently remediated with steam injection, bioventing and soil vapor extraction (SVE/AS) systems with air-sparge capabilities, and conventional pump and treat (GP&T) methods employing air stripping towers. In addition to being costly, such remedial processes are often ineffective. Treatment strategies based on oxidation of contaminants that use ultraviolet radiation in combination with a chemical oxidant like hydrogen peroxide are also energy costly and require the injection of expensive chemicals.

Bioremediation is a method of harnessing the ability of microorganisms to degrade toxic pollutants. Anaerobic biodegradation of TCE usually results in the formation of harmful metabolites such as dichloroethylenes and the known carcinogen vinyl chloride.

The ability of aerobic methane-utilizing bacteria to degrade TCE cometabolically is known. However, the use of methane-utilizing bacteria is limited due to the toxic effects of chlorinated hydrocarbons like TCE in rather low concentrations. As disclosed by Broholm et al., "Toxicity of 1,1, 1-Trichloroethane and Trichloroethane on a Mixed Culture of Methane-Oxidizing Bacteria", *Applied and Environmental Microbiology*, Aug. 1990, p. 2488–2493, the toxic effects of trichloroethane become substantial above 6 mg per liter (ppm) in water. In addition, trace amounts of copper have proven to inhibit methane monooxygenase.

Until about 1985, chlorinated solvents were thought to be completely resistant to aerobic degradation in the environment. An EPA laboratory demonstrated that soil exposed to methane gas can degrade chlorinated solvents with emphasis on TCE. The phenomenon was termed cometabolism, a process whereby bacteria growing on a particular substrate or food source (methane) gratuitously oxidize or degrade a second substrate (TCE). For the past several years, the EPA has conducted field pilot studies using methane or propane injection to remediate chlorinated solvent contamination in the soil and groundwater. However, field testing demonstrated that methane and propane injection was limited. In addition, research demonstrated that the methane and propane utilizers could tolerate relatively low levels of chlorinated solvent contamination because the metabolic process produces intermediates like TCE-epoxide that are toxic to the bacteria.

The use of methane-utilizing bacteria to degrade TCE is disclosed in several patents. For example, U.S. Pat. No. 5,037,551 to Barkley and U.S. Pat. No. 5,057,221 to Bryant et al. disclose ex-situ bioreactors using a rigid substrate bed to support aerobic methanotrophic microorganisms which degrade halogenated organic compounds. The substrate bed may be made of manufactured solid material, such as activated carbon particles or contoured plastic spheres. In each of these patents, examples are provided wherein methane is supplied to an ex-situ bioreactor to degrade the halogenated organic compounds. In addition, U.S. Pat. No. 5,057,221 includes an example wherein propane is supplied to the bioreactor bed.

U.S. Pat. No. 5,384,048 to Hazen et al. discloses an in-situ groundwater bioremediation apparatus and method using a methane nutrient source. Bioremediation is carried out by periodically injecting nutrient fluid into the contaminant groundwater plume to stimulate the subsurface population of the microorganisms to increase. An oxygenated fluid is also injected into the plume to allow the aerobic microorganisms to break down the contaminants. The particular microorganisms disclosed are indigenous methanotrophs capable of biodegrading TCE by a series of enzymes including methane monooxygenase which are unique to this group of bacteria.

U.S. Pat. No. 5,326,703 to Hazen et al. discloses another in-situ method for biodegrading contaminants such as TCE.

U.S. Pat. No. 5,441,887 to Hanson et al. discloses an ex-situ method for biodegrading halogenated hydrocarbons by soluble methane monooxygenase. In the examples of this patent, methane is used as the food source for the methanotrophic bacteria.

U.S. Pat. No. 4,713,343 to Wilson Jr. et al. discloses a method for biodegrading halogenated hydrocarbons such as TCE. The method may be performed either in-situ or ex-situ, and uses microorganisms such as methanotrophic bacteria.

U.S. Pat. No. 5,316,940 to Georgiou et al. discloses an ex-situ packed bed bioreactor utilizing a specific mutant methanotrophic bacteria to biodegrade TCE. Methane or methanol is used as the energy source.

U.S. Pat. No. 5,342,769 to Hunter et al. discloses an ex-situ bioremediation method for removing contaminants such as TCE from groundwater. A specific natural methanogenic bacteria is used in the process, along with methane as the food source.

Despite these bioremediation efforts, a need still exists for the effective degradation of pollutants such as chlorinated aliphatic hydrocarbons. The present invention has been developed in view of the foregoing, and to remedy other deficiencies of the prior art.

SUMMARY OF THE INVENTION

In accordance with the present invention, a system and method are provided for in-situ bioremediation of pollutants. Butane is used to stimulate the growth of microorganisms. The butane-utilizing organisms are used to degrade pollutants cometabolically or by direct metabolism.

An aspect of the present invention is to provide an in-situ bioremediation system including a source of a butane substrate, a source of an oxygen-containing gas, and at least one injector in flow communication with the source of butane substrate and the source of oxygen-containing gas.

Another aspect of the present invention is to provide an in-situ bioremediation system including means for supplying a butane substrate to a contaminated site, and means for supplying an oxygen-containing gas to the contaminated site.

Another aspect of the present invention is to provide a method of treating a contaminated site. The method includes the steps of supplying a butane substrate to the contaminated site, and supplying an oxygen-containing gas to the contaminated site.

These and other aspects of the present invention will become more apparent from the following description.

DETAILED DESCRIPTION OF THE PREFERRED EMBODIMENTS

The present invention relates to an in-situ system and method for the degradation of pollutants. A butane substrate and an oxygen-containing gas are injected into a contaminated site to stimulate the growth of microorganisms which degrade the pollutants. As used herein, the term "butane substrate" includes liquids and gases in which butane is present in sufficient amounts to stimulate substantial growth of butane-utilizing bacteria. Butane is preferably the most prevalent compound of the butane substrate on a weight percent basis, and typically comprises at least about 10 weight percent of the butane substrate. The other constituents of the butane substrate may include any suitable compounds, including inert gases and/or other alkanes such as methane, ethane and propane. The butane substrate preferably comprises at least about 50 weight percent butane. More preferably, the butane substrate comprises at least about 90 weight percent butane. In a particular embodiment, the butane substrate comprises at least about 99 weight percent n-butane. The butane may contain straight (n-butane) and/or branched chain compounds. As used herein, the term "oxygen-containing gas" means gases which comprise oxygen, including pure oxygen as well as mixtures of oxygen with other gases. For example, the oxygen-containing gas may comprise air, pure oxygen, or oxygen blended with inert gases such as helium, argon, nitrogen, carbon monoxide or the like.

In-situ bioremedial processes that may be used in accordance with the present invention include the use of indigenous butane-utilizing microorganisms and/or the injection of non-indigenous butane-utilizing microorganisms into the surface or subsurface. Indigenous microorganisms can be stimulated to flourish by the addition of the butane substrate, oxygen-containing gas and, optionally, bacterial nutrients that may be limited in the ecosystem under scrutiny. Suitable bacterial nutrients include nitrogen-containing compounds and phosphorous-containing compounds. For example, the bacterial nutrients may comprise ammonia, nitrate, ammonium chloride and sodium orthophosphate salts, and combinations thereof.

Figure 1:
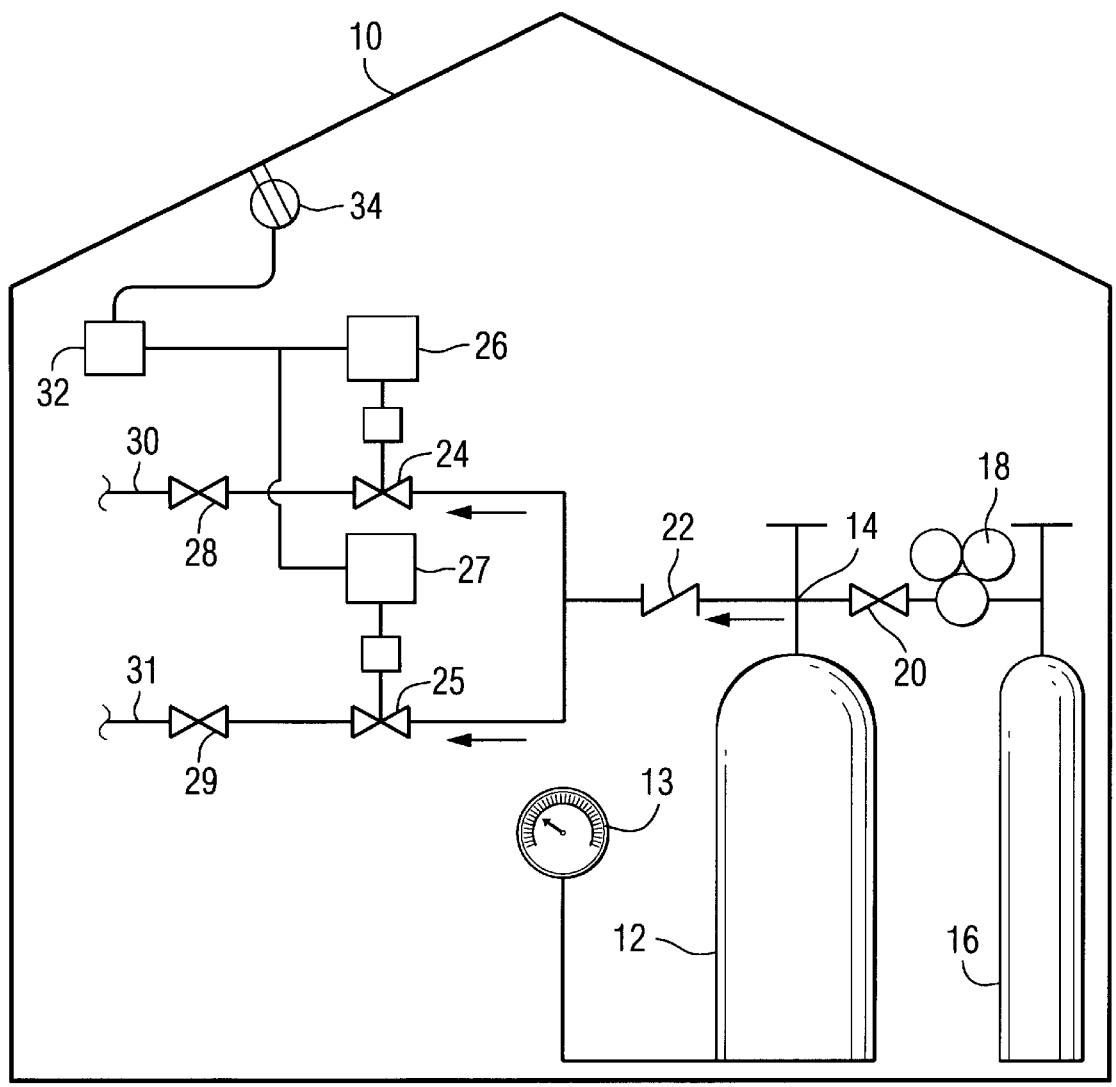
FIG. 1 is a schematic illustration of an in-situ butane injection system in accordance with an embodiment of the present invention.

FIG. 1 schematically illustrates an in-situ butane injection system in accordance with an embodiment of the present invention. The butane injection system is contained within a shed 10 which houses a butane cylinder 12. The butane cylinder 12 rests on a scale 13 which is used to measure the amount of butane contained within the cylinder 12. The cylinder 12 is connected to a dual port valve 14. A helium cylinder 16 is also contained within the shed 10. The helium cylinder 16 is connected through a regulator 18 and a gate valve 20 to the dual port valve 14. A check valve 22 is positioned between a single line from the butane cylinder 12 and two branched lines leading to solenoid valves 24 and 25. A digital timer 26 controls the solenoid valve 24, while another digital timer 27 controls the solenoid valve 25. Gate valves 28 and 29 are positioned downstream from the solenoid valves 24 and 25, respectively. The gate valve 28 communicates with a butane injection well line 30. The gate valve 29 communicates with another butane injection well line 31. A power reset assembly 32 is connected between the digital timers 26 and 27 and an electrical power source 34 such as a GFCI receptacle (120 VAC).

The flow of the butane substrate from the cylinder 12 through the butane injection well lines 30 and 31 is controlled by the in-situ butane injection system shown in FIG. 1. The flow of the butane substrate to the injection well lines 30 and 31 may be constant or may be pulsed. In one embodiment, the butane substrate is supplied periodically to the lines 30 and 31 at desired intervals. For example, butane pulses may be supplied from 0.01 second to several minutes per hour at any suitable flow rate.

Figure 2:
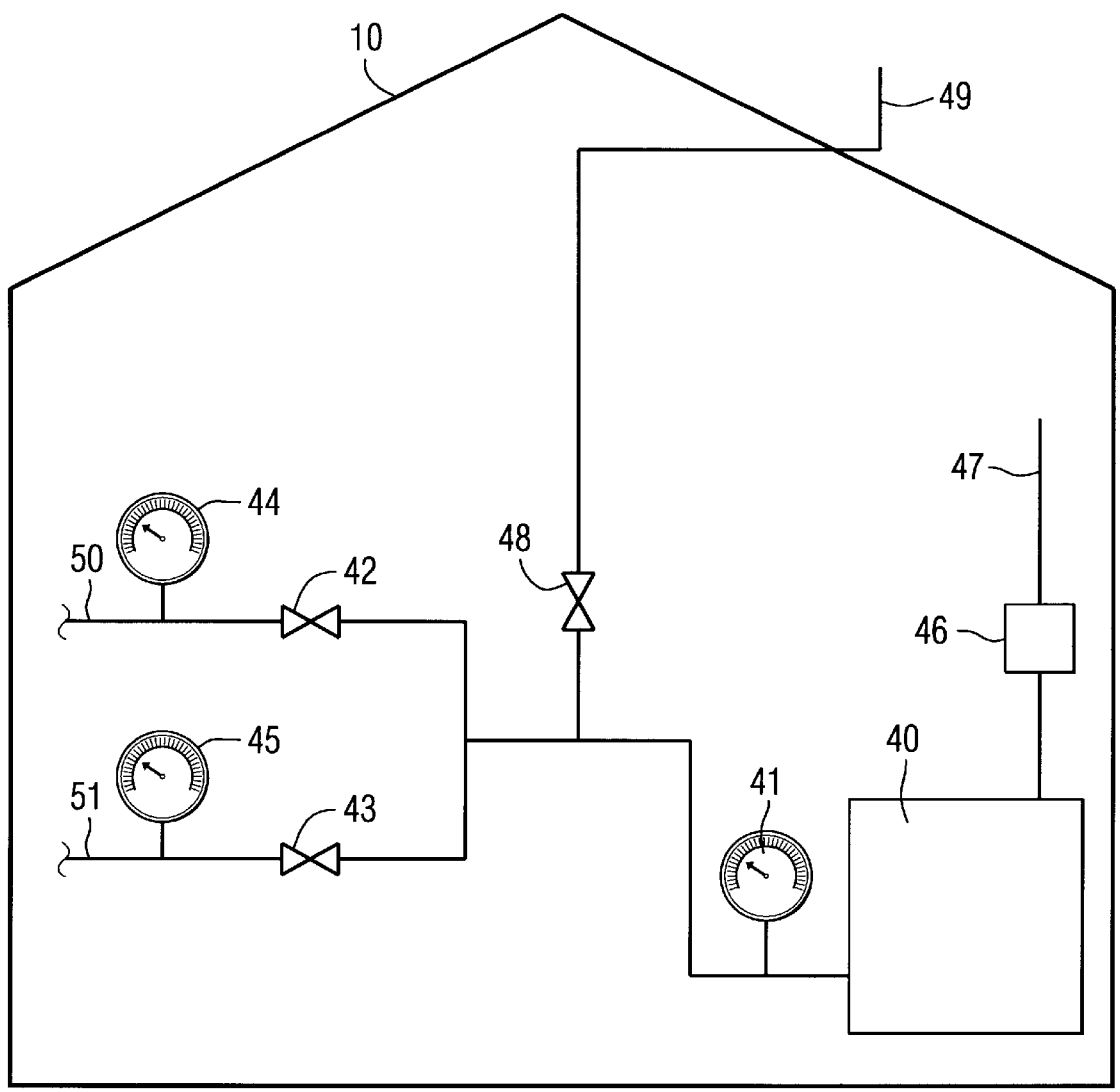
FIG. 2 is a schematic illustration of an in-situ air injection system in accordance with an embodiment of the present invention.

FIG. 2 schematically illustrates an in-situ air injection system in accordance with an embodiment of the present invention. The air injection system is housed within the shed 10. An air compressor 40 supplies air through a system gauge 41 to gate valves 42 and 43. A flow gauge 44 is located downstream from the gate valve 42, while another flow gauge 45 is located downstream from the gate valve 43. The air compressor 40 is electrically connected through a fuse panel disconnect system 46 to an electrical power supply 47 such as a 220 volt AC power supply. A dilution valve 48 is connected to the line between the system gauge and the gate valves 42 and 43. The dilution valve 48 is connected to a vent 49. An air injection well line 50 communicates with the gate valve 42, while another air injection well line 51 communicates with the gate valve 43. The gate valves 42 and 43 are used to equalize the air flow to each of the air injection well lines 50 and 51.

The flow of air from the compressor 40 through the air injection well lines 50 and 51 is controlled by the in-situ air injection system shown in FIG. 2. The flow of air or other types of oxygen-containing gases to the injection well lines 50 and 51 may be constant or may be pulsed. The oxygen-containing gas may be supplied periodically to the lines 50 and 51 at desired intervals. For example, air may be supplied from 0.1 second to 50 minutes per hour at any suitable flow rate.

Figure 3:
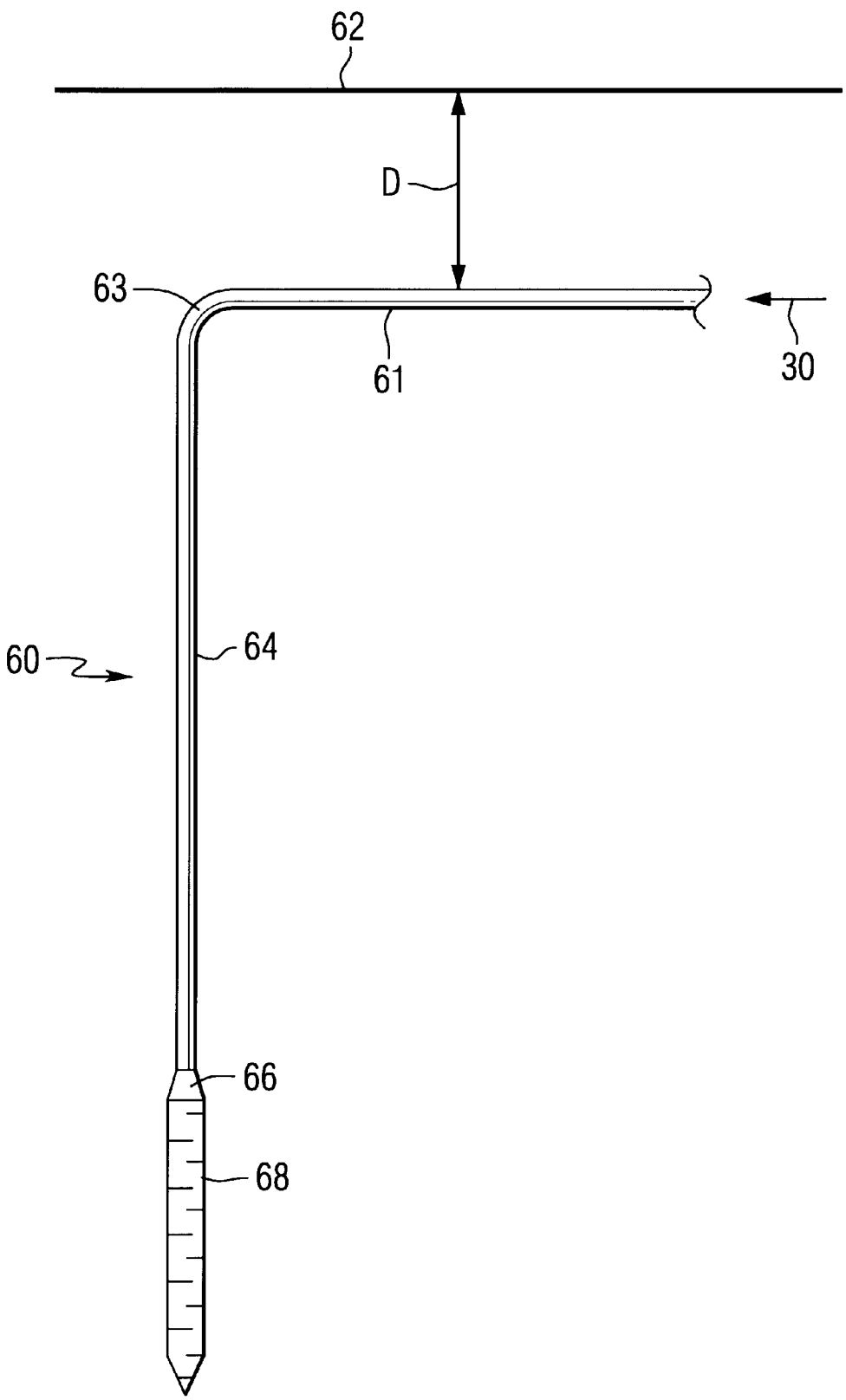
FIG. 3 is a partially schematic illustration of a butane injection well in accordance with an embodiment of the present invention.

FIG. 3 illustrates a butane injection well 60 in accordance with an embodiment of the present invention. The butane well injection line 30 shown in FIG. 1 is connected to the butane injection well 60 by a horizontal pipe 61 which is positioned a distance D below finish grade 62. The distance D is preferably at least 3 feet. The horizontal pipe 61 is connected by an elbow 63 to a vertical pipe 64. The vertical pipe 64 may have any suitable diameter and length. For example, the vertical pipe 64 may comprise a 1 inch outside diameter iron pipe having a length of from about 1 to about 100 or 500 feet or more. A fitting 66 is connected to the end of the vertical pipe 64. For example, the fitting 66 may be a 1 inch by 1¼ inch increaser fitting. A well point 68 is connected to the distal end of the vertical pipe 64 by the fitting 66. The well point 68 may be of any suitable construction which adequately permits dispersion of the butane into the treatment site. For example, the well point 68 may comprise a slotted stainless steel tube having an outside diameter of 1¼ inch and a length of 2 feet. Butane supplied from the butane injection well line 30 to the butane injection well 60 is introduced via the well point 68 into the treatment site at the desired location.

Figure 4:
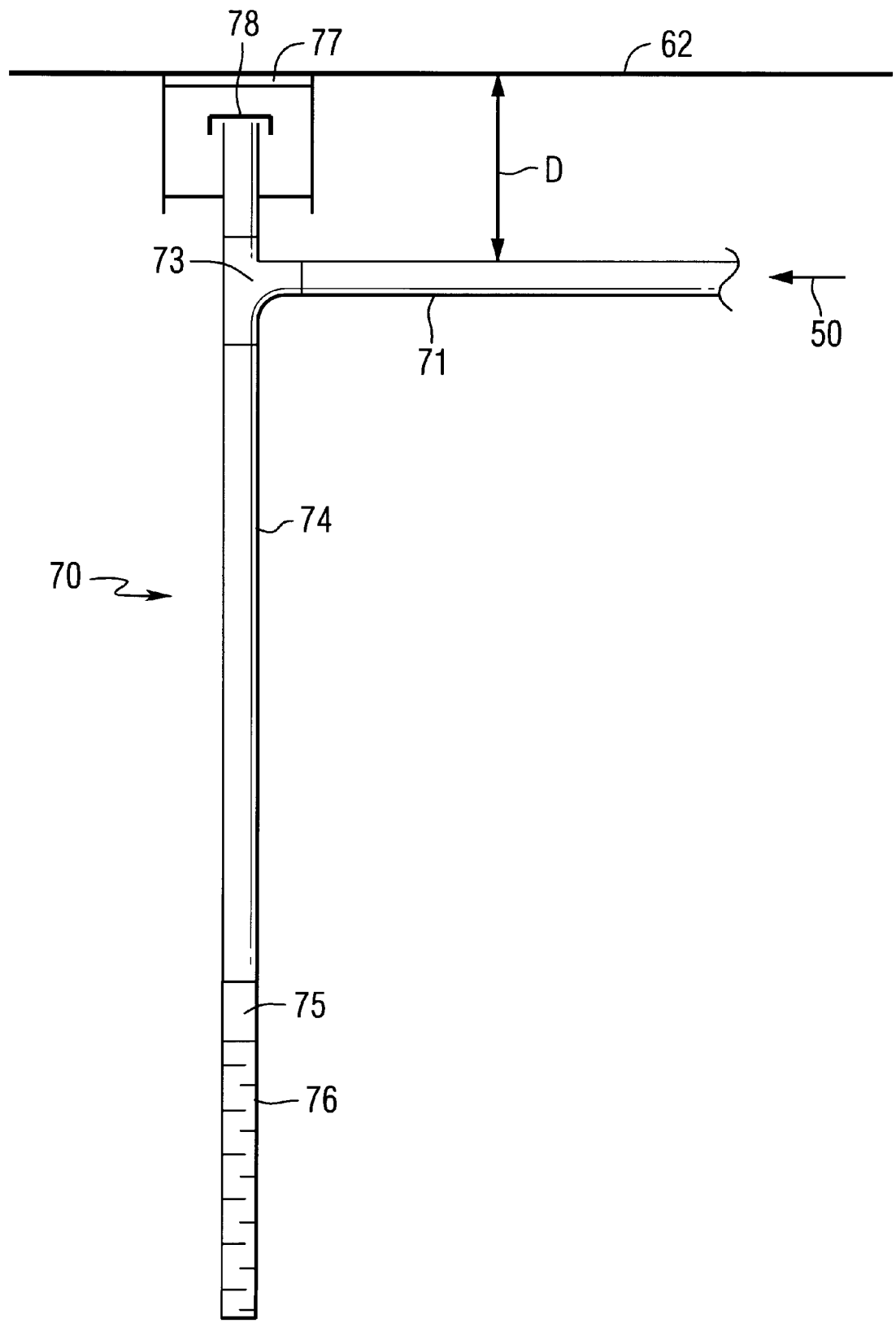
FIG. 4 is a partially schematic illustration of an air injection well in accordance with an embodiment of the present invention.

FIG. 4 illustrates an air injection well 70 in accordance with an embodiment of the present invention. The air injection well line 50 shown in FIG. 2 is connected to a horizontal pipe 71 of the air injection well 70. The horizontal pipe 71 is located a distance D below the finish grade 62, which is preferably at least 3 feet. A tee joint 73 connects the horizontal pipe 71 to a vertical pipe 74. For example, the tee joint 73 may have outside dimensions of 2 inch by 2 inch by 2 inch. The vertical pipe 74 may have any suitable diameter and length. For example, the vertical pipe 74 may comprise a 2 inch outside diameter PVC pipe having a length of from about 1 to about 100 or 500 feet or more, depending upon the desired depth of the air injection well 70. A fitting 75 connects the distal end of the vertical pipe 74 to a well screen 76. The fitting 75 may, for example, comprise a 2 inch by 2 inch coupler fitting. The well screen 76 may be of any suitable construction which adequately allows dispersion of air or other oxygen-containing gases into the treatment zone. For example, the well screen 76 may comprise a slotted PVC tube having an inside diameter of 2 inches and a length of 2 feet. Air or another oxygen-containing gas supplied from the air injection well line 50 to the air injection well 70 is dispersed via the well screen 46 at the desired location within the contaminated site. A road box 77 including a cap 78 is connected to the tee joint 73 in order to protect the top of the well 70 and to allow access to the well 70 for sampling purposes. In addition, the road box 77 allows access to the well 70 for manual or automatic addition of non-indigenous bacteria and/or bacterial nutrients such as nitrogen-containing compounds and phosphorous-containing compounds, if desired.

Although the butane injection well 60 and the air injection well 70 shown in FIGS. 3 and 4 are separate from each other, both butane and air could be supplied through the same injection well. Although two butane injection well lines 30 and 31 and two air injection well lines 50 and 51 are shown in FIGS. 1 and 2, single lines or any suitable number of multiple injection well lines may be used. In addition, the lines may be connected to the butane and air injection wells by any suitable manifold system.

Some of the hydrocarbon pollutants which may be degraded by the present system and method include chlorinated aliphatics, chlorinated aromatics and non-chlorinated aromatics, with chlorinated aliphatic hydrocarbons being of particular interest. Specific hydrocarbon pollutants include trichloroethene (TCE), trichloroethane (TCA) (e.g., 1,1,2-trichloroethane and 1,1,1-trichloroethane), methylene chloride, 1,1-dichloroethane, chloroform, 1,2-dichloropropane, dibromochloromethane, 2-chloroethylvinyl ether, tetrachloroethene (PCE), chlorobenzene, 1,2-dichloroethane, bromodichloromethane, trans-1,3-dichloropropene, cis-1,3-dichloropropene, bromoform, chloromethane, bromomethane, vinyl chloride, chloroethane, 1,1-dichloroethene, trans-1,2-dichloroethene, methyl tertiary butyl ether (MTBE), polychlorinated biphenyl (PCB), dichlorobenzenes, cis-1,2-dichloroethene, dibromomethane, 1,4-dichlorobutane, 1,2,3-trichloropropane, bromochloromethane, 2,2-dichloropropane, 1,2-dibromoethane, 1,3-dichloropropane, bromobenzene, chlorotoluenes, trichlorobenzenes, trimethylbenzenes, trans-1,4-dichloro-2-butene and butylbenzenes. Additional pollutants include petroleum compounds such as crude oil, refined oil, Nos. 2,4 and 6 fuel oils, gasoline, benzene, toluene, ethylbenzene and xylene (BTEX), and creosote and pesticides.

The bioremediation process of the present invention is performed in-situ to remove such contaminants from various environments including aqueous systems, ground water, capillary fringe areas, vadose zones and soil. Aqueous systems suitable for treatment include drinking water, groundwater, surface water, industrial waste water and the like.

The following example illustrates various aspects of the present invention, and is not intended to limit the scope of the invention.

Figure 5:
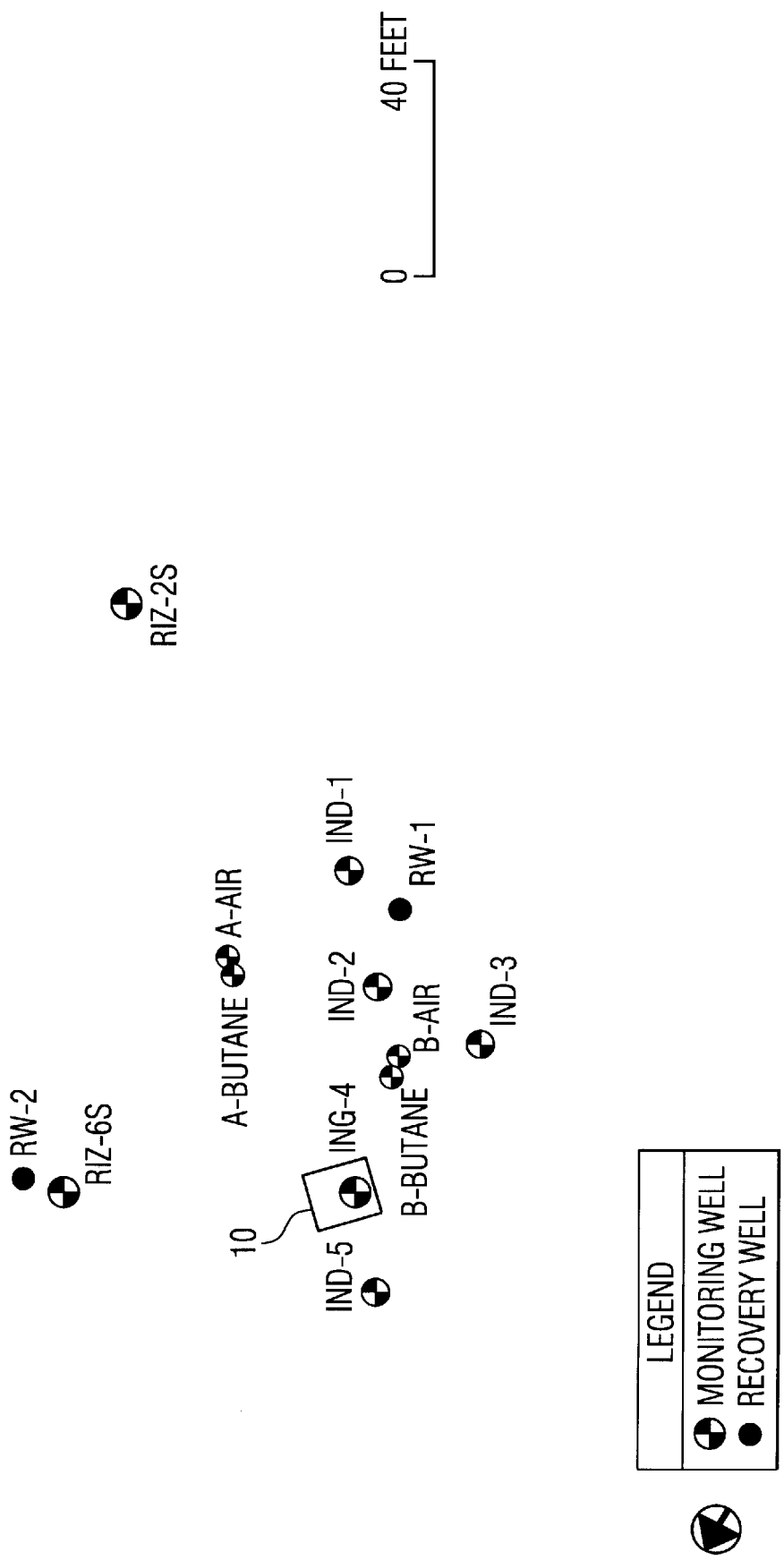
FIG. 5 is a plan view of a hazardous waste site contaminated with 1,1,1-TCA which was treated with an in-situ bioremediation system in accordance with an embodiment of the present invention.

A subsurface investigation was performed at a hazardous waste site in Massachusetts. A plan view of the site is shown in FIG. 5. The investigation indicated the presence of high concentrations of chlorinated volatile organic compounds (VOCs) in the soil and, to a greater extent, in the groundwater. Further assessment indicated the presence of chlorinated VOCs in the shallow aquifer. The soils and groundwater at the site had elevated concentrations of 1,1,1-TCA at dissolved-phase concentrations up to 900 mg/L. Given the extent of VOC contamination at the site, mass excavation and disposal was not deemed an acceptable remediation option. A conventional groundwater pump and treat (GP&T) system using standard air-stripping and granular activated carbon technology was initially installed at the site. This system included three recovery wells screened in the shallow aquifer in the vicinity of the highest VOC concentrations encountered during the subsurface investigations. Periodic groundwater quality monitoring revealed that the groundwater pump and treat system was having a limited impact on groundwater conditions in the shallow aquifer, and 1,1,1-TCA concentrations remained at levels above approximately 150,000 ppb at a particular monitoring well located near the source of the contamination. In an effort to accelerate remediation of the VOC plume identified at the site, an in-situ bioremediation system of the present invention was installed.

An eighteen month in-situ field demonstration was conducted at the hazardous waste site shown in FIG. 5. Butane was injected into the subsurface using a gas delivery system of the present invention, as illustrated in FIGS. 1–4. Monitoring for fugitive butane emissions was performed daily by automated instrumentation. Butane gas was pulsed into the subsurface at a rate that resulted in full microbial oxidation within the groundwater, capillary fringe and vadose zones. The total dissolved-phase concentrations of 1,1,1-TCA in a single monitoring well located within the biotreatment zone was 150,000 ppb shortly after the biotreatment began, 2,500 ppb eight months after the treatment began, and 580 ppb fourteen months after the biotreatment began. Pilot testing of this technology has shown that chloride ion and carbon dioxide concentrations and cell densities (in groundwater) increased by several orders of magnitude over background in the butane biostimulation zone.

The vapor pressure of butane is normally about 16 psi. As the ambient temperature drops to 40° F., the pressure inside a butane cylinder drops to a vacuum (negative). Therefore, an injection system was designed that would operate in extreme conditions of heat and cold while effectively and safely injecting butane into targeted areas in the subsurface. This was accomplished by pressurizing the butane cylinder with a helium feed through a dual port valve. The helium maintains a constant pressure (e.g., 50 psi) inside the butane cylinder. An internal dip tube located within the butane cylinder insured that the helium only pushed liquid butane out of the tank.

The electrical requirement for the system was a 120-V outlet to operate two digital timers (NEMA-4 and explosion proof) and two electric solenoid valves (NEMA-4 and explosion proof) that regulated the introduction of the cometabolic butane substrate into the VOC-impacted areas. Liquid butane was injected each hour from a 120-pound cylinder for 0.5 seconds using a helium pusher set at 50 psi for a total of approximately 24 cubic feet per day. Oxygen in the form of air was supplied by a five-horsepower rotary-vane air compressor (220-V). The system components, including the air compressor, butane and helium cylinders, injection system timers and valves, and ancillary equipment were located in a storage shed, as illustrated in FIGS. 1 and 2. The storage shed was equipped with a Lower Explosive Limit (LEL) monitor.

A hollow-stem-auger drill rig was used to install the two butane injection wells as shown in FIG. 3 about 20 feet below the surface of the ground. The butane injection wells comprised 1½inch outside diameter black iron pipe fitted with a 2-foot slotted stainless steel well point, advanced from the ground surface to a depth above the silt layer. Clean sand was placed around and up to two feet above the top of the well point, with a grout seal placed form the top of the sand pack to the ground surface using a tremie pipe, thus sealing the borehole and preventing short-circuits to the surface via the well annular space.

Each butane injection well was programmed to deliver two pounds of liquid butane into the subsurface daily. Butane was pulsed for a period of 0.5 seconds every hour utilizing helium as a pusher gas (approximately 24 ft$^3$ total of butane gas per day).

Butane injection at each well was controlled by a digital timer/intervalometer (NEMA-4 and explosion proof). Both timers operated on a GFCI circuit. The digital timers operated normally closed electric solenoid valves (one per well) designed for operation with flammable gases and liquids (NEMA-4 and explosion proof). The timers were programmed to open the solenoid valves for 0.5 seconds every hour to regulate the introduction of the cometabolic butane substrate into the VOC-impacted areas. Both solenoid valves operated on a GFCI circuit.

The butane injection system was equipped with an automatic flow sensor programmed to interrupt the power supply to the solenoid timers if a sudden release of butane gas was detected anywhere within the system in excess of two seconds. The de-energized solenoid valves returned to a normally closed position.

The two air injection wells, as illustrated in FIG. 4, were installed using a hollow-stem auger drill rig to a depth of about 20 feet. The air injection wells were constructed of two-inch inside-diameter schedule 40 PVC slotted well screens two feet long. Filter sand was placed in the annular space around the well screen to approximately two feet above the screen/riser interface. The two-foot well screen was installed at a depth above the silt layer in close proximity to a butane injection well with sand pack placed two feet above the top of the screened interval and grout seal placed form the top of the sand pack to the ground surface.

The ground was placed in the annular space using a tremie pipe. A watertight road box was cemented flush to the ground surface over each well.

Each air injection well was equipped with a pressure gauge to monitor the injection pressure at each well point. The air compressor was set to deliver 5 to 10 cfm per well at less than one breakout pressure in order to minimize VOC volatilization.

Periodic monitoring at the site consisted of in-situ measurement of dissolved oxygen, carbon dioxide and chloride ion concentration using colorimetric methods. Dissolved butane concentrations were quantified using a portable gas chromatograph. Serial dilutions and plating were conducted to enumerate viable cell counts in groundwater. Monitoring for fugitive butane emissions was conducted daily during the pilot study, and no evidence of breakthrough to the ambient air or other potential receptors was noted during the field study. Groundwater quality samples collected from the on-site monitoring wells were analyzed at a certified laboratory for VOCs referencing EPA method 8260.

Figure 6:
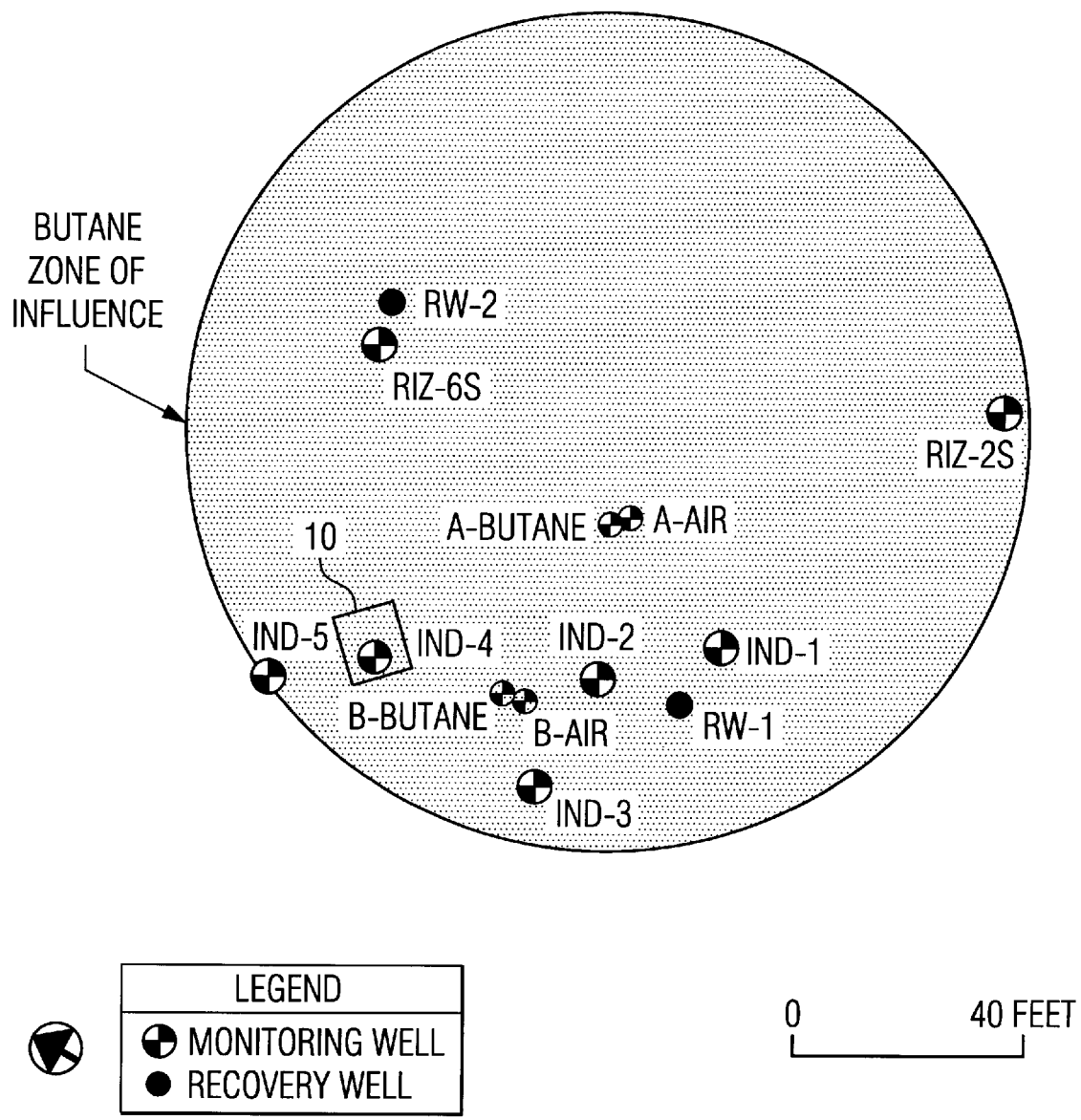
FIG. 6 is a plan view of the site shown in FIG. 5, illustrating a zone of butane influence in accordance with an embodiment of the present invention.
Figure 12:
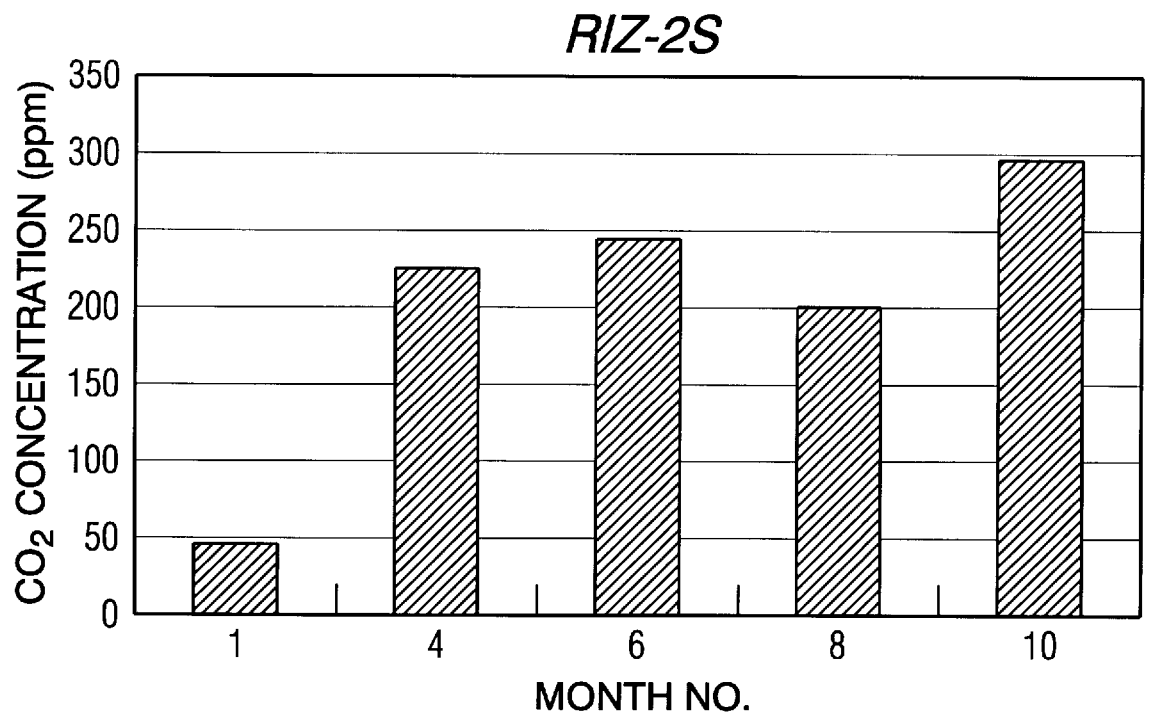
FIG. 12 is a graph showing increased carbon dioxide concentrations during treatment at the site shown in FIG. 5, demonstrating that butane enrichment increased cell densities and corresponding microbial respiration within the subsurface.
Figure 13:
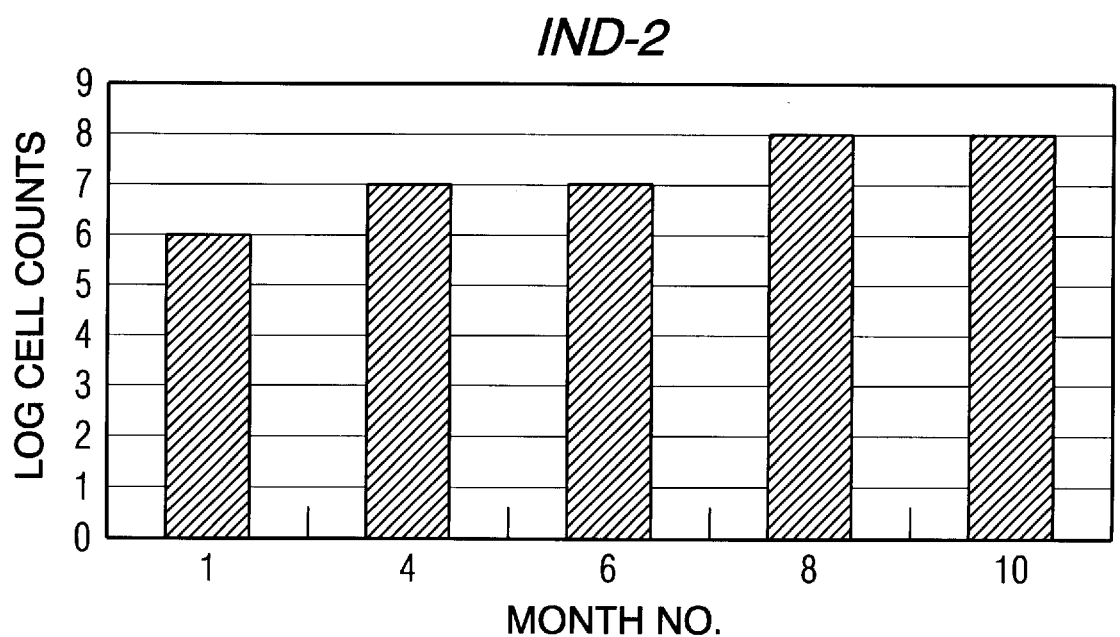
FIGS. 13–15 are graphs showing bacteria cell counts at three different locations within the site shown in FIG. 5 during the in-situ bioremediation process.
Figure 14:
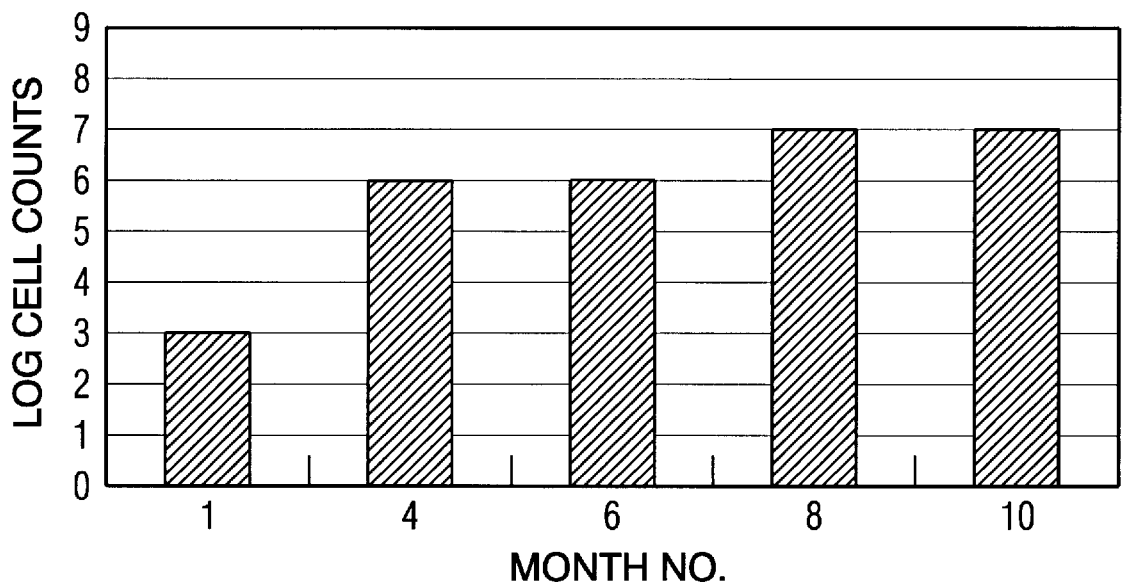
Figure 15:
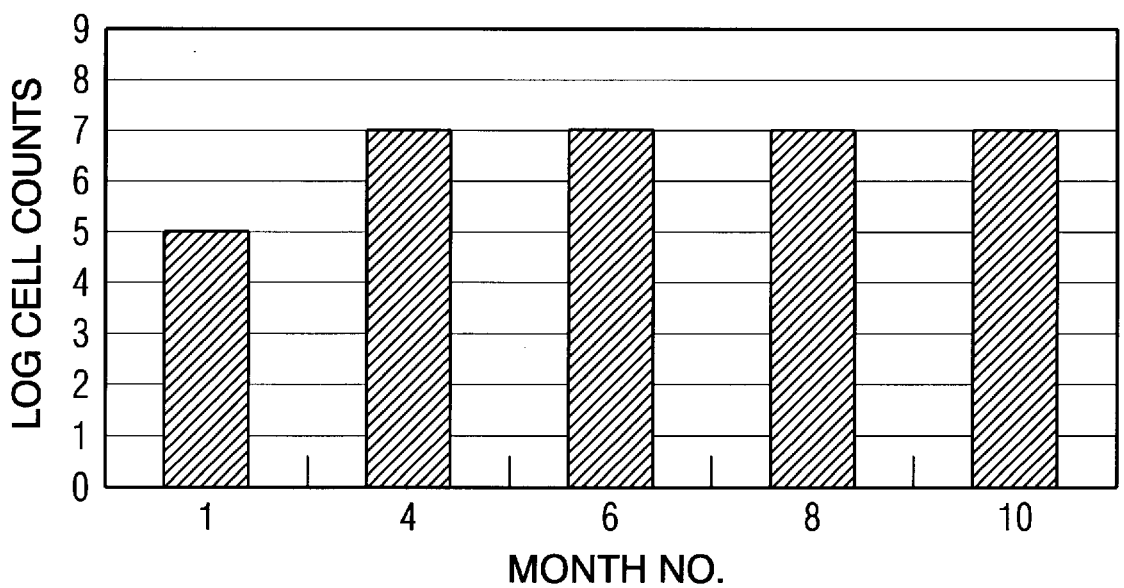

Data analysis shows that chloride ion concentrations (FIGS. 8–11), carbon dioxide concentrations (FIG. 12), and cell densities in groundwater (FIGS. 13–15) increased by several orders of magnitude over background in monitoring wells located within the butane biostimulation zone, shown in FIG. 6. Thus, the indigenous microbial populations were capable of using butane as a food source and their cell densities increased by several orders of magnitude while growing at the expense of butane. Butane was observed to undergo full microbial oxidation within the subsurface. An increase in chloride ion concentration was a direct indicator that 1,1,1-TCA molecules were being degraded within the subsurface. Chloride ion concentration is a conservative tracer and a process specific indicator of chlorinated compound destruction.

Figure 16:
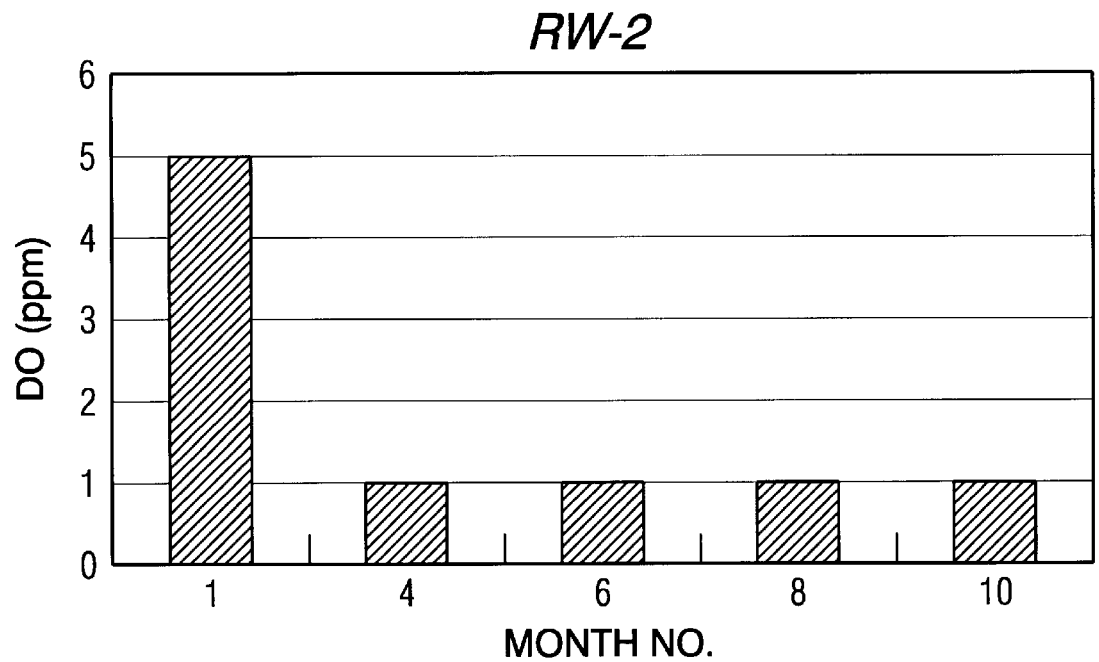
FIG. 16 is a graph showing dissolved oxygen concentrations in a monitoring well at the treatment site shown in FIG. 5 after the supply of oxygen was temporarily stopped, demonstrating the aerobic activity of the butane-utilizing bacteria.

In monitoring well RW-2 shown in FIG. 5, prior to each sampling event, the butane and air injection systems were shut down for a period of 24 hours to allow the subsurface conditions time to equilibrate. The background concentration of dissolved oxygen in monitoring well RW-2 was approximately 5 ppm prior to implementation of butane and air injection. The concentration of dissolved oxygen rose to approximately 8 ppm during operation of the air compressor. During the 24 hour shut down period, the dissolved oxygen in the groundwater in monitoring well RW-2 dropped to 1 ppm (FIG. 16). This indicated that a well-established aerobic microbial community had developed within the subsurface as a result of the butane and air injection.

Figure 17:
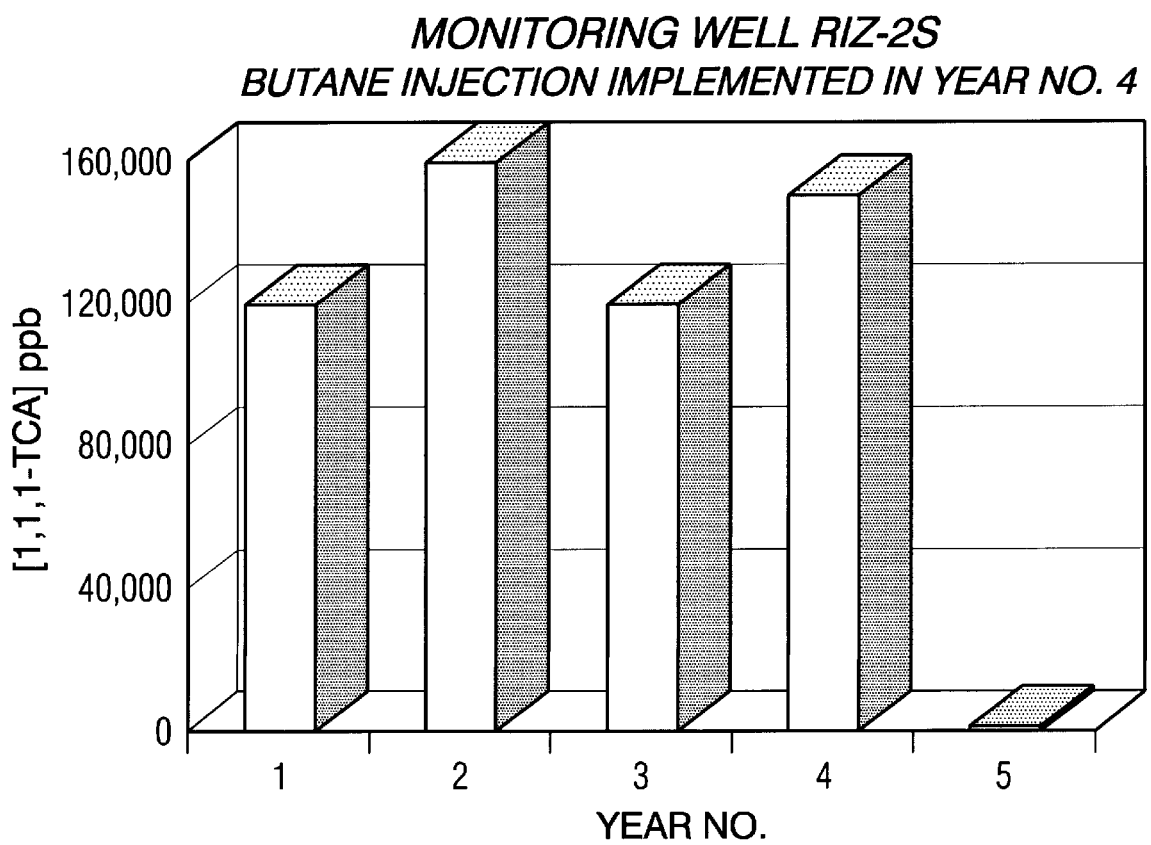
FIGS. 17–19 are graphs showing historical 1,1,1-TCA concentrations at three different locations within the contaminated site shown in FIG. 5, demonstrating high levels of 1,1,1-TCA during initial conventional bioremediation processing, and very low levels of 1,1,1-TCA at the site after initiation of the in-situ treatment process of the present invention.

The total dissolved-phase concentrations of 1,1,1-TCA (EPA Method 8260) in a monitoring well located within the treatment zone (RIZ-2S) was 150,000 ppb 2 months after the biotreatment began, 2,500 ppb 8 months after the biotreatment began, and 580 ppb 14 months after the biotreatment began. This indicates that the indigenous populations utilizing butane as a carbon source were also capable of expressing the requisite enzymes, most likely oxygenases, to cometabolize saturated chlorinated aliphatic hydrocarbons such as 1,1,1-TCA. FIG. 17 illustrates historical 1,1,1-TCA concentrations at the RIZ-2S monitoring well. In Year Nos. 1, 2 and 3, the conventional GP&T system was used at the site. In Year No. 4, the bioremediation process of the present invention was started, which continued through Year No. 5.

Figure 7:
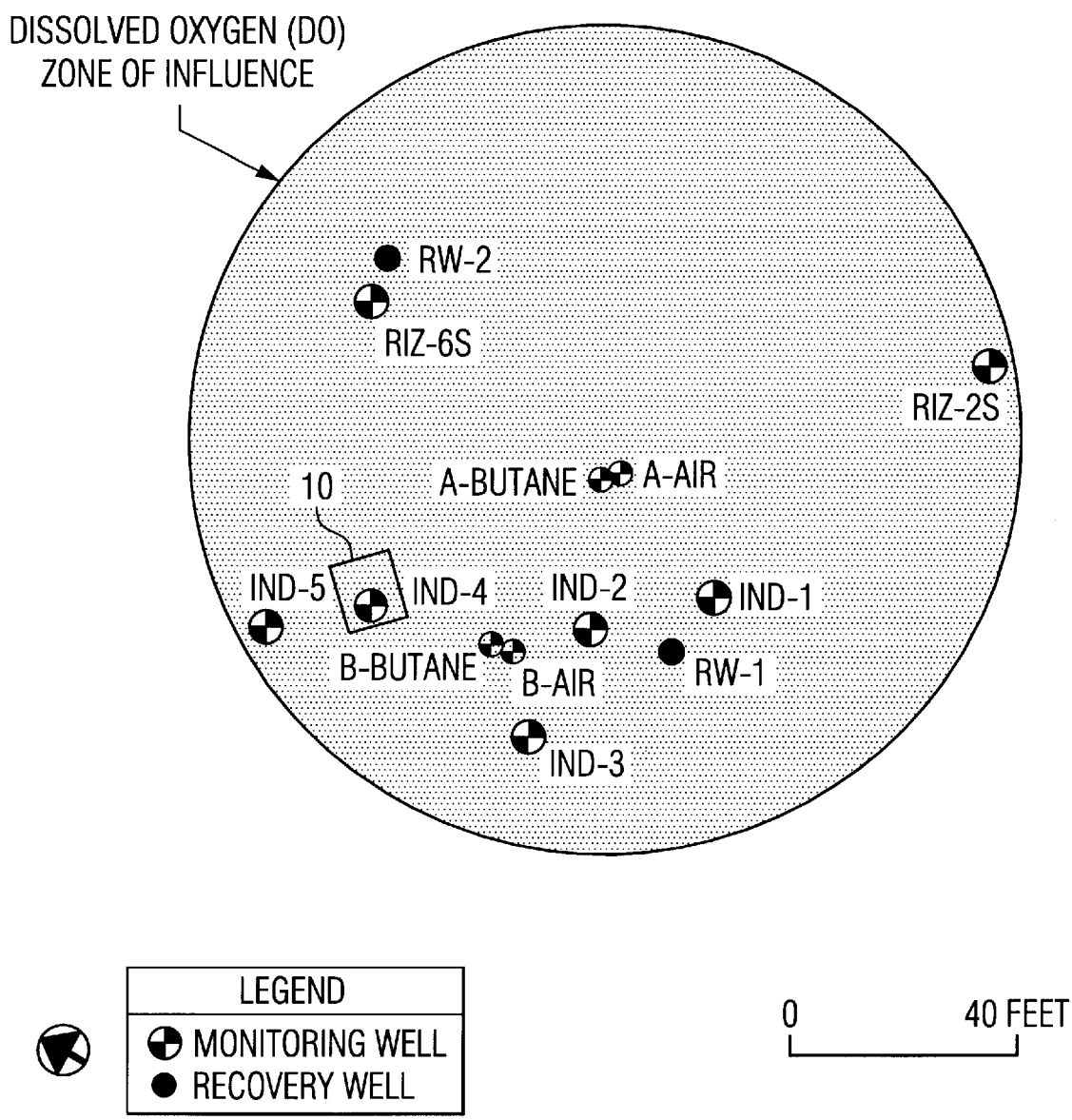
FIG. 7 is a plan view of the site shown in FIG. 5, illustrating a zone of dissolved oxygen influence in accordance with an embodiment of the present invention.
Figure 8:
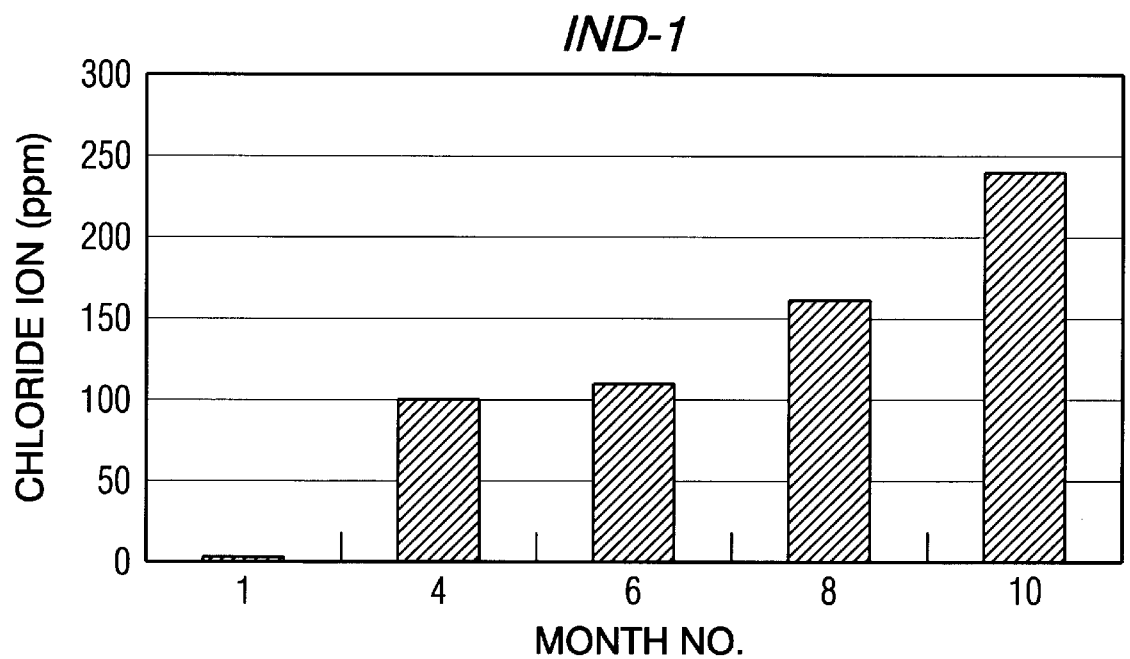
FIGS. 8–11 are graphs showing increased chloride ion concentrations at four different monitoring locations within the site shown in FIG. 5, demonstrating that the contaminant is degraded into its chloride ion constituents during the in-situ treatment.
Figure 9:
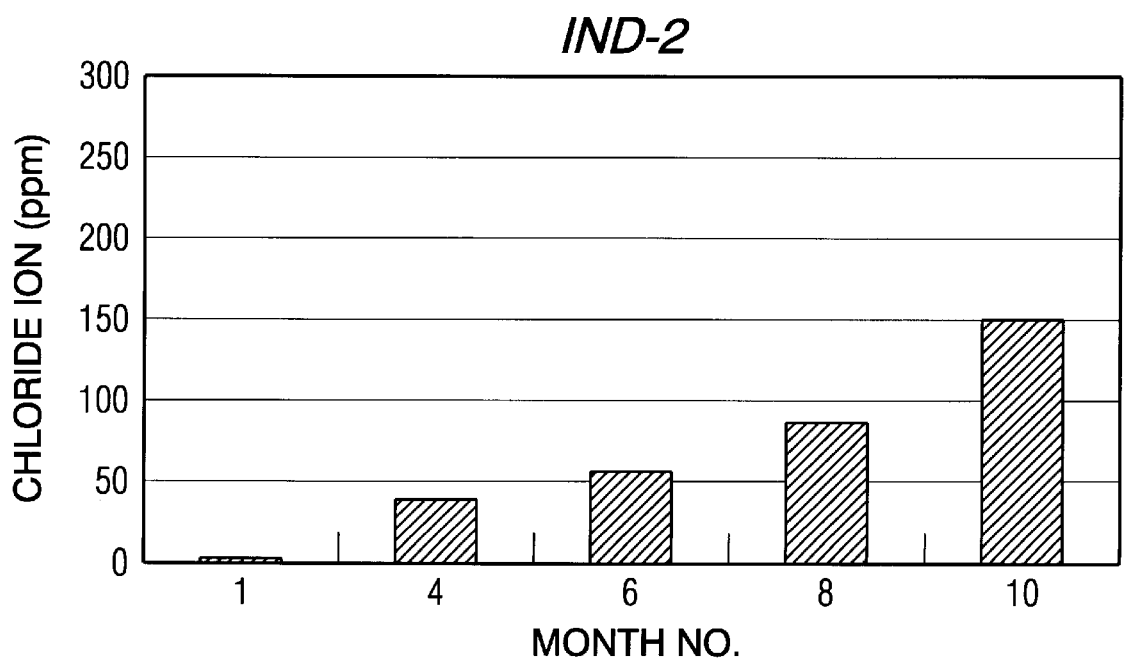
Figure 10:
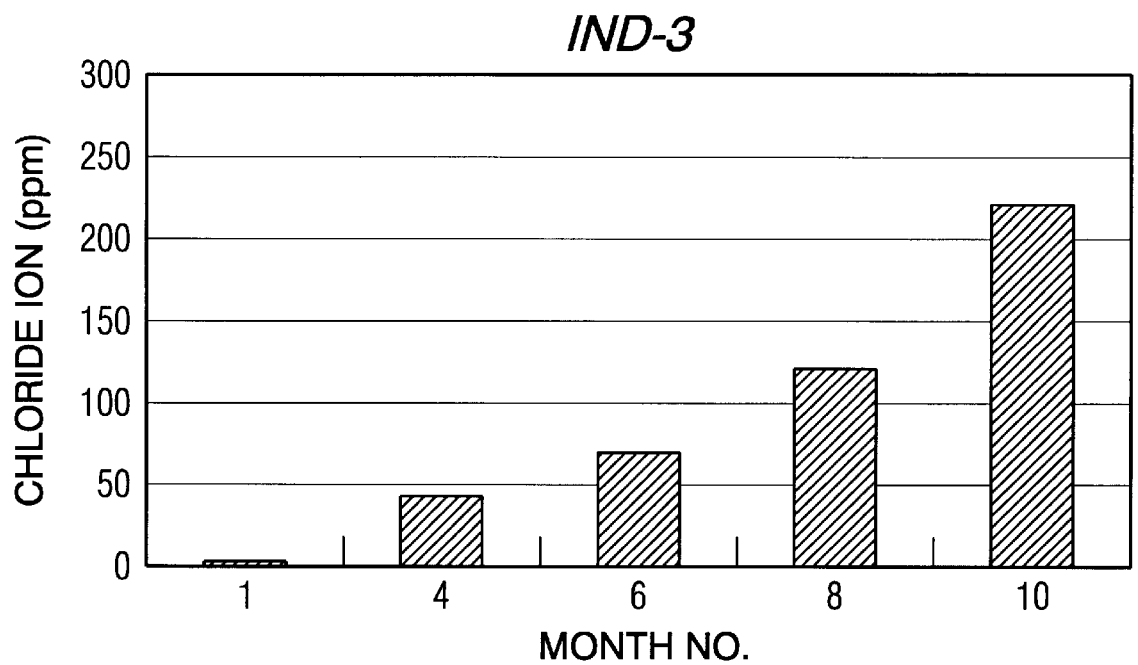
Figure 11:
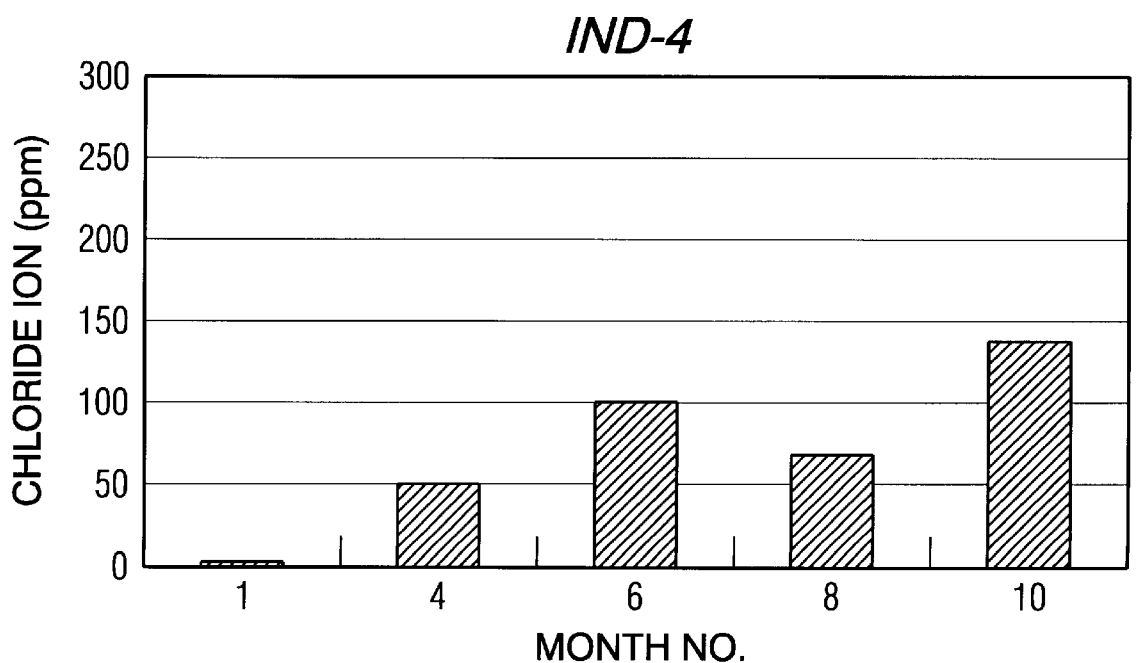
Figure 18:
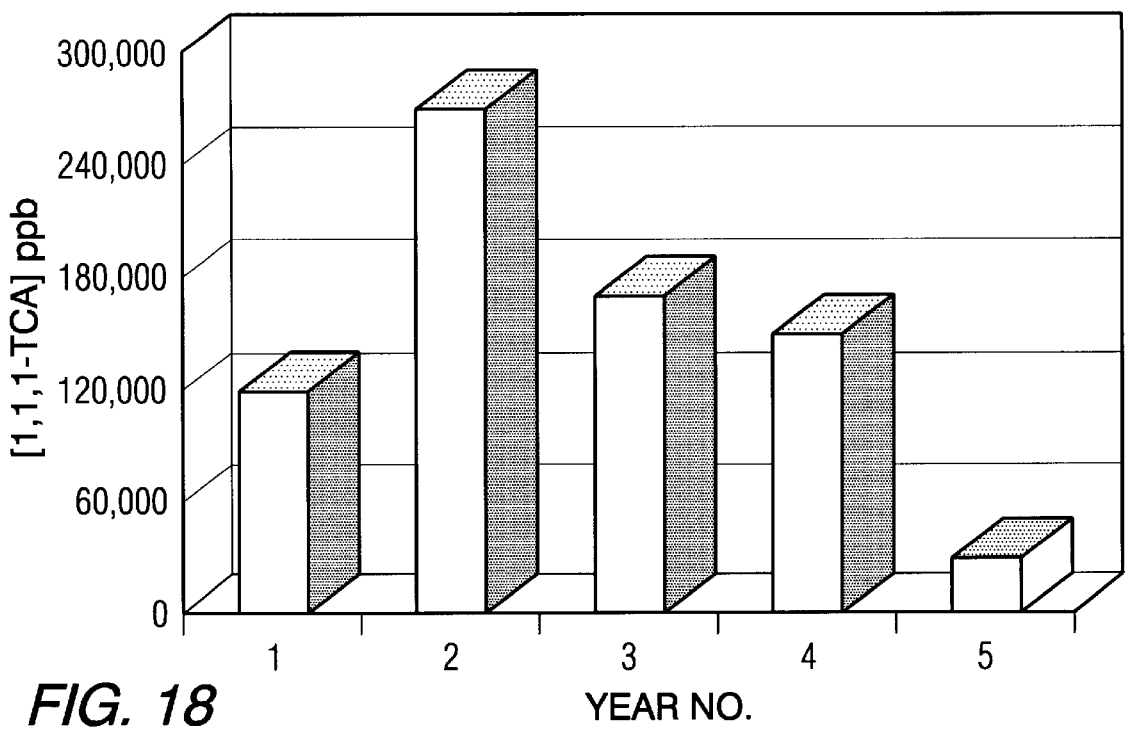
Figure 19:
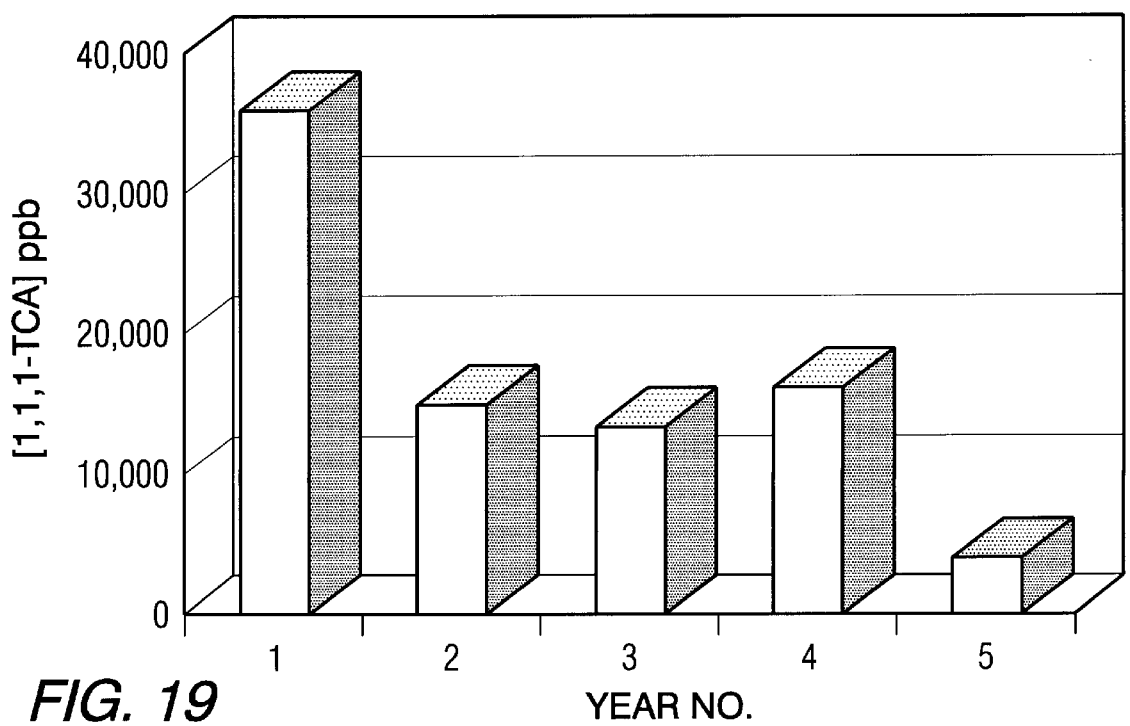

The analytical data (FIG. 18) for monitoring well RW-2 (shown in FIGS. 5–7) likewise demonstrated a significant drop in 1,1,1-TCA concentration as compared to the historical analytical concentrations dating back several years. In addition, the 1,1,1-TCA concentrations (FIG. 19) in monitoring well RW-1 (shown in FIGS. 5–7) demonstrated a more significant reduction in 1,1,1-TCA concentration. RW-1 is located nearer the butane injection wells, and further from the source area, than monitoring well RW-2, as shown in FIGS. 5–7. FIG. 6 shows the combined radius of influence for the butane injection wells. FIG. 7 shows the combined radius of influence for the air injection wells.

Figure 20:
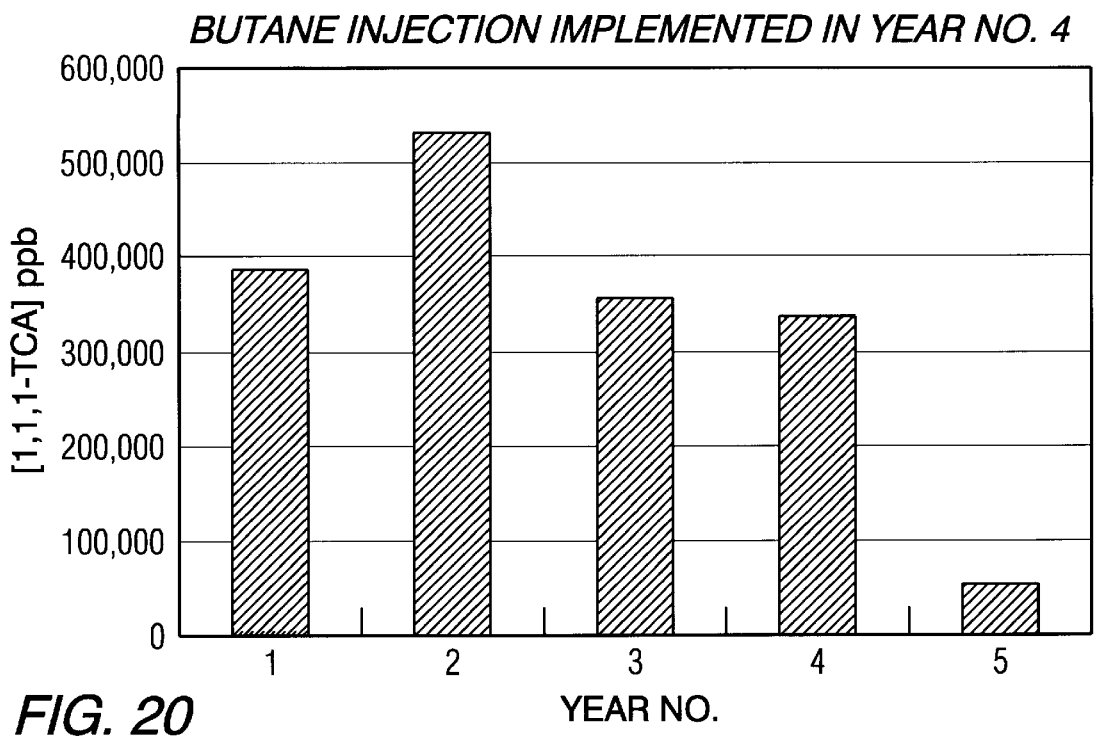
FIG. 20 is a graph showing total 1,1,1-TCA concentrations at the three monitoring locations set forth in FIGS. 17–19, demonstrating a significant overall decrease in 1,1,1-TCA levels at the treatment site after switching from a conventional remediation process to a remediation process of the present invention.
Figure 21:
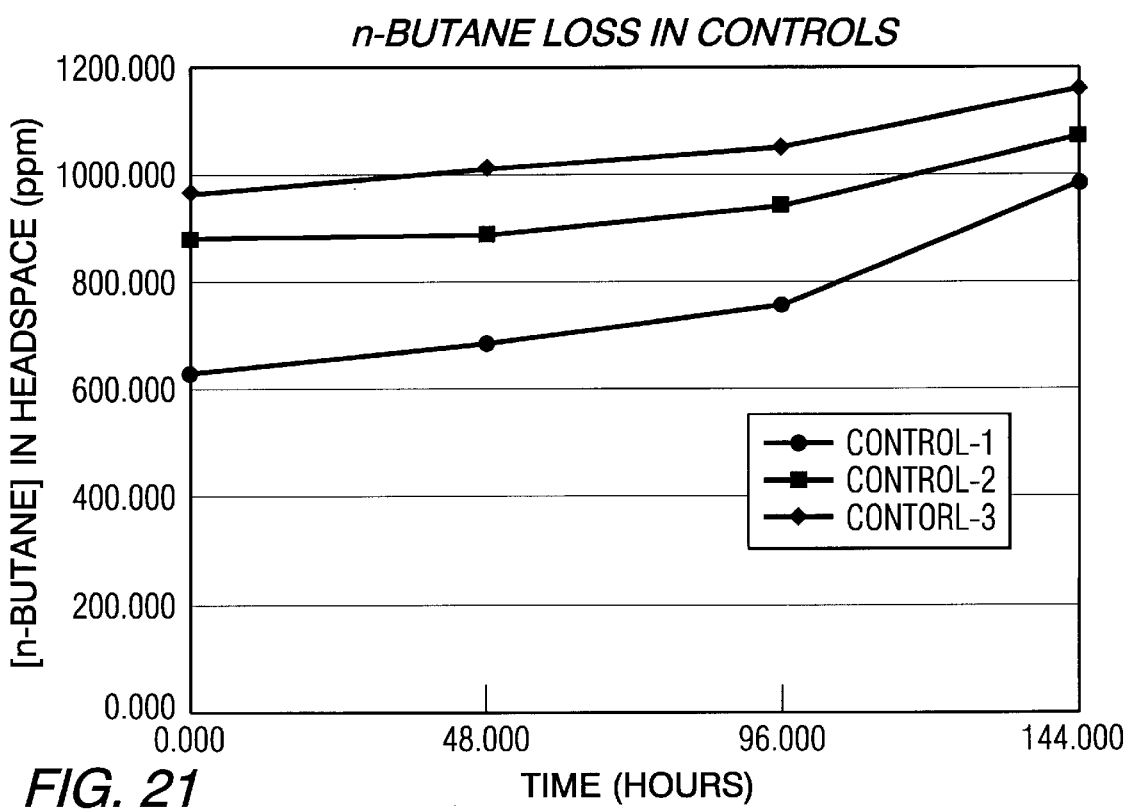
FIGS. 21 is a graph showing butane concentration at various times for experimental control samples.
Figure 22:
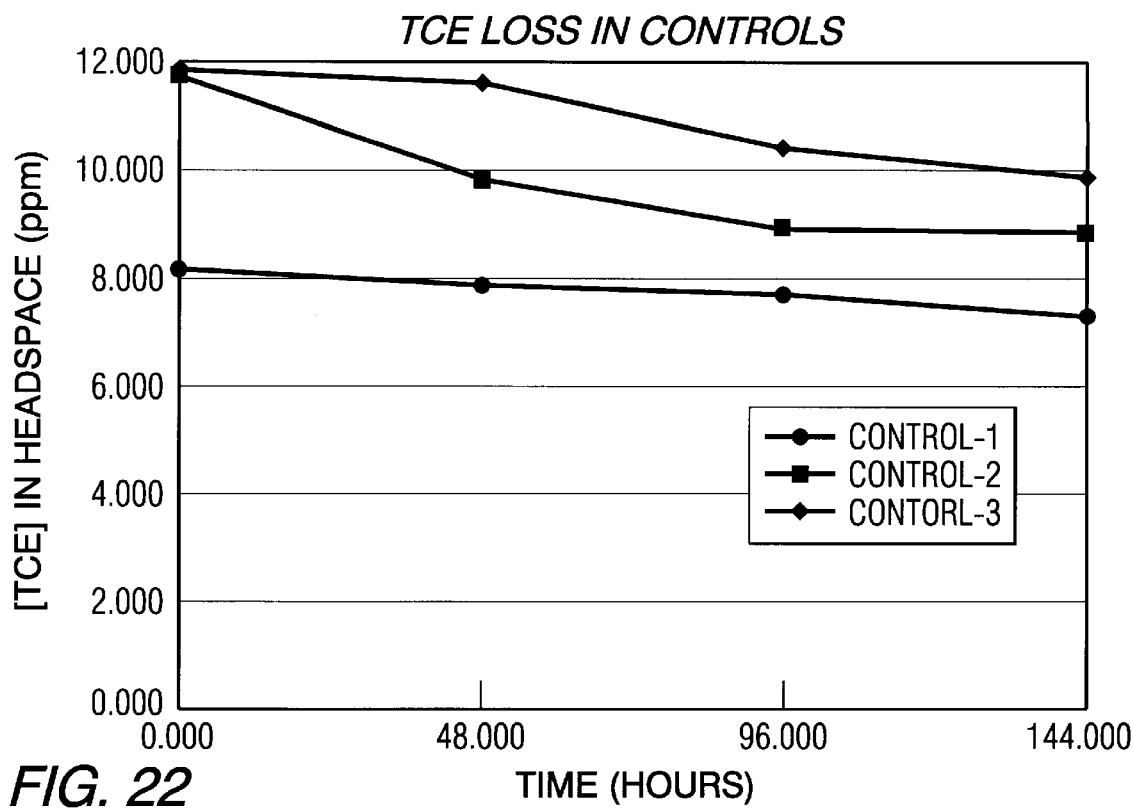
FIG. 22 is a graph showing TCE concentration at various times for experimental control samples.

As FIG. 20 demonstrates that the total 1,1,1-TCA concentrations in all shallow monitoring wells located in the butane zone of influence dropped to a concentration never observed at the site prior to implementation of the present system.

Trichloroethene (TCE) and trichbroethane (TCA) are particular hydrocarbon pollutants that may be degraded in accordance with the system and method of the present invention. Furthermore, the present system may be used to degrade methyl tertiary butyl ether (MTBE) pollutants, as described in U.S. Patent Application entitled "Bioremediation of Methyl Tertiary Butyl Ether Pollutants with Butane-Utilizing Bacteria" filed Mar. 24, 1999, which is incorporated herein by reference. The present system may also be used to degrade polychlorinated biphenyl (PCB) pollutants, as described in U.S. patent application entitled "Bioremediation of Polychlorinated Biphenyl Pollutants with Butane-Utilizing Bacteria" filed Mar. 24, 1999, which is incorporated herein by reference. In addition, the present system may be used to degrade petroleum pollutants as described in U.S. patent application entitled "Bioremediation of Petroleum Pollutants with Alkane-Utilizing Bacteria" filed Mar. 24, 1999, which is incorporated herein by reference.

It has been discovered that butane-utilizing bacteria are extremely effective at degrading low molecular weight halogenated aliphatic hydrocarbons such as TCE and TCA in-situ. The butane-utilizing bacteria may be used to aerobically degrade TCE and TCA by cometabolism and/or direct metabolism processes. For example, an embodiment of the present invention provides a robust system using butane-utilizing bacteria having low TCE toxicity and improved TCE consumption capabilities, in contrast with conventional bioremediation techniques which typically use methane-utilizing bacteria to degrade TCE.

The butane-utilizing bacteria used in accordance with the present invention preferably produce oxygenase enzymes and are capable of metabolizing butane. The operative enzymes may include extracellular enzymes, intracellular enzymes and cell-bound enzymes. The butane-utilizing bacteria typically produce butane monoxygenase and/or butane dioxygenase enzymes, and in some embodiments may also be capable of producing dehalogenase enzymes which directly metabolize TCE.

The butane-utilizing bacteria may contain gram negative and gram positive aerobic rods and cocci, facultative anaerobic gram negative rods, non-photosynthetic, non-fruiting gliding bacteria and irregular non-sporing gram positive rods.

Of the Pseudomonadaceae family comprising gram-negative aerobic rods and cocci, species of the following genera may be suitable: Pseudomonas; Variovorax; Chryseobacterium; Comamonas; Acidovorax; Stenotrophomonas; Sphingobacterium; Xanthomonas; Frateuria; Zoogloea; Alcaligenes; Flavobacterium; Derxia; Lampropedia; Brucella; Xanthobacter; Thermus; Thermomicrobium; Halomonas; Alteromonas; Serpens; Janthinobacterium; Bordetella; Paracoccus; Beijerinckia; and Francisella.

Of the Nocardioform Actinomycetes family comprising gram-positive Eubacteria and Actinomycetes, the following genera may be suitable: Nocardia; Rhodococcus; Gordona; Nocardioides; Saccharopotyspora; Micropolyspora; Promicromonospora; Intrasporangium; Pseudonocardia; and Oerskovia.

Of the Micrococcaceae family comprising gram-positive cocci, the following genera may be suitable: Micrococcus; Stomatococcus; Planococcus; Staphylococcus; Aerococcus; Peptococcus; Peptostreptococcus; Coprococcus; Gemella; Pediococcus; Leuconostoc; Ruminococcus; Sarcina; and Streptococcus.

Of the Vibrionaceae family comprising facultative anaerobic gram-negative rods, the following genera may be suitable: Aeromonas; Photobacterium; Vibrio; Plesiomonas; Zymomonas; Chromobacterium; Cardiobacterium; Calymmatobacterium; Streptobacillus; Eikenella; and Gardnerella.

Of the Rhizobiaceae family comprising gram-negative aerobic rods and cocci, the following genera may be suitable: Phyllobacterium; Rhizobium; Bradyrhizobium; and Agrobacterium.

Of the Cytophagaceae family comprising nonphotosynthetic, gliding bacteria, non-fruiting, the following genera may be suitable: Cytophaga; Flexibacter; Saprospira; Flexithrix; Herpetosiphon; Capnocytophaga; and Sporocytophaga.

Of the Corynebacterium family comprising irregular, non-sporing gram-positive rods, the following genera may be suitable: Aureobacterium; Agromyces; Arachnia; Rothia; Acetobacterium; Actinomyces; Arthrobactera; Arcanobacterium; Lachnospira; Propionibacterium; Eubacterium; Butyrivibria; Brevibacterium; Bifidobacterium; Microbacterium; Caseobacter; and Thermoanaerobacter.

The following isolation techniques were used for obtaining pure and mixed cultures of various methane-, propane- and butane-utilizing bacteria. Enrichment procedures were used to increase bacterial population for a given growth substrate. Soil samples collected from a variety of sites underwent enrichment transfers weekly for a period of one year. The methods and materials used for the enrichment studies are described below.

Soil samples were collected with a stainless-steel hand auger at depths that varied between one to two feet. The soils samples were stored in dedicated glass containers and moistened with sterile deionized/distilled water for transport to the laboratory. The hand auger was decontaminated between sampling locations with three Alconox soap/distilled water rinses. Soil samples used as inocula were collected from the locations summarized in Table 1.

TABLE 1

| Sample Number/Matrix | Sample Location |
| --- | --- |
| 1/soil | Landfill cell |
| 2/soil | #2 fuel oil impacted soil |
| 3/soil | Landfill cell |
| 4/soil | Gasoline and waste oil impacted soils |
| 5/soil | Shallow freshwater lagoon |
| 6/soil | Salt marsh |
| 7/soil | Industrial outfall |
| 8/soil | #2 fuel oil impacted soil |

Cultures were transferred weekly for a period of one year in liquid media to increase the relative numbers of methane-, propane- and butane-utilizing bacteria. The liquid media was a mineral salts media (MSM) prepared from the following chemicals:

| | |
| --- | --- |
| $MgSO_4\text{-}7H_2O$ | 1.0 g; |
| $CaCl_2$ | 0.2 g; |
| $NH_4Cl$ | 0.5 g; |
| $FeCl_3\text{-}6H_2O$ | 4.0 mg; |
| Trace elements solution | 0.5 ml; and |
| Distilled water | 900 ml. |

A trace elements solution, which provides micronutrients for bacterial growth, was prepared comprising the following ingredients:

| | |
| --- | --- |
| $ZnCl_2$ | 5.0 mg; |
| $MnCl_2\text{-}4H_2O$ | 3.0 mg; |
| $H_3BO4$ | 30.0 mg; |
| $NiCl_2\text{-}6H_2O$ | 2.0 mg; |
| $(NH_4)_6Mo_7O_{24}\text{-}4H_2O$ | 2.25 mg; and |
| Distilled water | 1000 ml. |

The pH of the MSM was adjusted to 6.8 before autoclaving (20 min at 121 degree C.) with 20.0 ml of a phosphate buffer solution comprising 3.6 g of $Na_2HPO_4$ and 1.4 g of $KH_2PO_4$ in 100 ml of distilled water. After autoclaving the MSM and the buffer solution, another 2.0 ml of the buffer solution was added to the MSM when the temperature of the media reached 60 degree C. The MSM cocktail was completed with the addition of 4.0 mg of casamino acids and 4.0 mg of yeast (Difco) dissolved in 100 ml of distilled water. The nutrient solution was filter sterilized by vacuum filtration through a 0.2 micron filter (Gelman) prior to addition to the MSM.

Prior to the first enrichment transfer, the inocula from the eight sampling locations summarized in Table 1 underwent a series of pre-treatments. The first two pre-treatments were conducted on the original soil materials used as inocula. The last two treatments were applied as MSM alterations during the weekly transfers. The pre-treatments consisted of the following: (1) 30% ethanol saturation rinse followed by a sterile phosphate buffer rinse (ethanol); (2) 60° C. water bath for 15 minutes (heat); (3) no treatment (no-treat); (4) MSM containing 10% aqueous solution of sodium chloride (10% NaCl); and (5) MSM with pH of 2.0 (pH of 2). Treatment Nos. (4) and (5) were employed in an attempt to locate extreme halophiles and acidophiles capable of utilizing hydrocarbons as a growth substrate.

The first enrichment transfers for each sample series were conducted in 72 ml serum bottles (Wheaton) with 20 ml of MSM and 1.0 g of inocula. Subsequent culture transfers (5.0 ml) were conducted with sterilized plastic syringes (B&D). The bottles were capped with red rubber plugs and crimped with aluminum seals (Wheaton). Each sample was handled aseptically and all glassware, materials and supplies were sterilized by autoclaving. Table 2 summarizes the enrichment transfer schedule and the concentration of methane or propane replaced in the headspace of each serum bottle using a dedicated gas tight syringe (Hamilton) with a Fisher Scientific inert sampling valve (on/off lever) to control gas loss from the needle tip between each transfer.

TABLE 2

| Sample No. | Pre-Treatment | Food Source | Sample ID |
|---|---|---|---|
| 1 | ethanol | methane | 1EM |
| 1 | heat | methane | 1HM |
| 1 | no-treat | methane | 1NM |
| 1 | 10% NaCl | methane | 1SM |
| 1 | pH of 2.0 | methane | 1AM |
| 1 | ethanol | propane | 1EP |
| 1 | heat | propane | 1HP |
| 1 | no-treat | propane | 1NP |
| 1 | 10% NaCl | propane | 1SP |
| 1 | pH of 2.0 | propane | 1AP |

The amount of oxygen required for mineralization of methane, propane and butane can be derived from the following equations.

$$CH_4 + 2O_2 = CO_2 + 2H_2O \quad 2:1$$
$$C_3H_8 + 5O_2 = 3CO_2 + 4H_2O \quad 5:1$$
$$C_4H_{10} + 6.5O_2 = 4CO2 + 5H_2O \quad 6.5:1$$

Table 2 summarizes the entire set of enrichment transfers prepared for Sample No. 1. The first sample series did not include a butane treatment. The remaining seven samples were prepared in identical fashion and, in addition, contained a butane treatment series, as shown in Tables 3 through 9. A control (serum bottle with sterilized MSM only) was maintained for each sample series.

All hydrocarbon gases described herein were research grade quality (Scott Specialty Gases). Methane was added at a concentration of 27% (vol/vol), propane at 10% and butane at 6%. After the first six months of enrichment transfers, the concentrations were reduced to 13% for methane and 9% for propane. The concentration of butane remained the same at 6%.

TABLE 3

| Sample No. | Pre-Treatment | Food Source | Sample ID |
|---|---|---|---|
| 2 | ethanol | methane | 2EM |
| 2 | heat | methane | 2HM |
| 2 | no-treat | methane | 2NM |
| 2 | 10% NaCl | methane | 2SM |
| 2 | pH of 2.0 | methane | 2AM |
| 2 | ethanol | propane | 2EP |
| 2 | heat | propane | 2HP |
| 2 | no-treat | propane | 2NP |
| 2 | 10% NaCl | propane | 2SP |
| 2 | pH of 2.0 | propane | 2AP |
| 2 | ethanol | butane | 2EB |
| 2 | heat | butane | 2HB |
| 2 | no-treat | butane | 2NB |
| 2 | 10% NaCl | butane | 2SB |
| 2 | pH of 2.0 | butane | 2AB |

TABLE 4

| Sample No. | Pre-Treatment | Food Source | Sample ID |
|---|---|---|---|
| 3 | ethanol | methane | 3EM |
| 3 | heat | methane | 3HM |
| 3 | no-treat | methane | 3NM |
| 3 | 10% NaCl | methane | 3SM |
| 3 | pH of 2.0 | methane | 3AM |
| 3 | ethanol | propane | 3EP |
| 3 | heat | propane | 3HP |
| 3 | no-treat | propane | 3NP |
| 3 | 10% NaCl | propane | 3SP |
| 3 | pH of 2.0 | propane | 3AP |
| 3 | ethanol | butane | 3EB |
| 3 | heat | butane | 3HB |
| 3 | no-treat | butane | 3NB |
| 3 | 10% NaCl | butane | 3SB |
| 3 | pH of 2.0 | butane | 3AB |

TABLE 5

| Sample No. | Pre-Treatment | Food Source | Sample ID |
|---|---|---|---|
| 4 | ethanol | methane | 4EM |
| 4 | heat | methane | 4HM |
| 4 | no-treat | methane | 4NM |
| 4 | 10% NaCl | methane | 4SM |
| 4 | pH of 2.0 | methane | 4AM |
| 4 | ethanol | propane | 4EP |
| 4 | heat | propane | 4HP |
| 4 | no-treat | propane | 4NP |
| 4 | 10% NaCl | propane | 4SP |
| 4 | pH of 2.0 | propane | 4AP |
| 4 | ethanol | butane | 4EB |
| 4 | heat | butane | 4HB |
| 4 | no-treat | butane | 4NB |
| 4 | 10% NaCl | butane | 4SB |
| 4 | pH of 2.0 | butane | 4AB |

TABLE 6

| Sample No. | Pre-Treatment | Food Source | Sample ID |
|---|---|---|---|
| 5 | ethanol | methane | 5EM |
| 5 | heat | methane | 5HM |
| 5 | no-treat | methane | 5NM |
| 5 | 10% NaCl | methane | 5SM |
| 5 | pH of 2.0 | methane | 5AM |
| 5 | ethanol | propane | 5EP |
| 5 | heat | propane | 5HP |
| 5 | no-treat | propane | 5NP |
| 5 | 10% NaCl | propane | 5SP |
| 5 | pH of 2.0 | propane | 5AP |
| 5 | ethanol | butane | 5EB |
| 5 | heat | butane | 5HB |
| 5 | no-treat | butane | 5NB |
| 5 | 10% NaCl | butane | 5SB |
| 5 | pH of 2.0 | butane | 5AB |

TABLE 7

| Sample No. | Pre-Treatment | Food Source | Sample ID |
|---|---|---|---|
| 6 | ethanol | methane | 6EM |
| 6 | heat | methane | 6HM |
| 6 | no-treat | methane | 6NM |
| 6 | 10% NaCl | methane | 6SM |
| 6 | pH of 2.0 | methane | 6AM |
| 6 | ethanol | propane | 6EP |
| 6 | heat | propane | 6HP |
| 6 | no-treat | propane | 6NP |
| 6 | 10% NaCl | propane | 6SP |
| 6 | pH of 2.0 | propane | 6AP |
| 6 | ethanol | butane | 6EB |
| 6 | heat | butane | 6HB |
| 6 | no-treat | butane | 6NB |
| 6 | 10% NaCl | butane | 6SB |
| 6 | pH of 2.0 | butane | 6AB |

TABLE 8

| Sample No. | Pre-Treatment | Food Source | Sample ID |
|---|---|---|---|
| 7 | ethanol | methane | 7EM |
| 7 | heat | methane | 7HM |
| 7 | no-treat | methane | 7NM |
| 7 | 10% NaCl | methane | 7SM |
| 7 | pH of 2.0 | methane | 7AM |
| 7 | ethanol | propane | 7EP |
| 7 | heat | propane | 7HP |
| 7 | no-treat | propane | 7NP |
| 7 | 10% NaCl | propane | 7SP |
| 7 | pH of 2.0 | propane | 7AP |
| 7 | ethanol | butane | 7EB |
| 7 | heat | butane | 7HB |
| 7 | no-treat | butane | 7NB |
| 7 | 10% NaCl | butane | 7SB |
| 7 | pH of 2.0 | butane | 7AB |

TABLE 9

| Sample No. | Pre-Treatment | Food Source | Sample ID |
|---|---|---|---|
| 8 | ethanol | methane | 8EM |
| 8 | heat | methane | 8HM |
| 8 | no-treat | methane | 8NM |
| 8 | 10% NaCl | methane | 8SM |
| 8 | pH of 2.0 | methane | 8AM |
| 8 | ethanol | propane | 8EP |
| 8 | heat | propane | 8HP |
| 8 | no-treat | propane | 8NP |
| 8 | 10% NaCl | propane | 8SP |
| 8 | pH of 2.0 | propane | 8AP |
| 8 | ethanol | butane | 8EB |
| 8 | heat | butane | 8HB |
| 8 | no-treat | butane | 8NB |
| 8 | 10% NaCl | butane | 8SB |
| 8 | pH of 2.0 | butane | 8AB |

After the first two weeks of enrichment transfers, all liquid suspensions, with the exception of the 10% NaCl treatments, the 2.0 pH treatments and the controls, demonstrated a significant increase in turbidity.

After conducting the enrichment transfers for 25 weeks, morphological descriptions and direct cell counts were compiled for all isolates. Morphological descriptions of the isolates were compiled using an Olympus BH-2 Phase Contrast Microscope. In addition, a Bright Line Hemacytometer (Fisher Scientific) was used to enumerate cell densities by the direct count method. Table 10 summarizes the descriptions and cell density enumerations. Serum bottles of sterilized MSM were maintained as controls.

TABLE 10

| Sample ID | Morphology | Enumeration (cells/ml) |
|---|---|---|
| 1EM | cocci | 2.5E8 |
| 1HM | cocci/bacilli | 1.8E8 |
| 1NM | bacilli | 1.3E8 |
| 1SM | cocci | 5.8E6 |
| 1AM | cocci | 3.8E6 |
| 1EP | bacilli | 4.0E6 |
| 1HP | cocci | 1.3E7 |
| 1NP | bacilli | 9.8E6 |
| 1SP | diplococci | 4.0E6 |
| 1AP | bacilli (variable) | 1.5E6 |
| 2EM | cocci/bacilli | 1.2E8 |
| 2HM | cocci/bacilli | 7.3E7 |
| 2NM | streptococci/bacilli | 1.1E8 |
| 2SM | comma-shaped | 6.6E7 |
| 2AM | comma-shaped | 8.3E6 |
| 2EP | bacilli | 1.2E8 |
| 2HP | bacilli/comma-shaped | 1.8E8 |
| 2NP | bacilli (variable) | 1.1E8 |
| 2SP | cocci | 7.0E6 |
| 2AP | cocci | 3.3E6 |
| 2EB | cocci/bacilli | 2.1E8 |
| 2HB | bacilli (variable) | 2.5E8 |
| 2NB | cocci/comma-shaped | 1.9E8 |
| 2SB | bacilli | 2.5E6 |
| 2AB | cocci | 3.0E6 |
| 3EM | cocci/bacilli | 1.4E8 |
| 3HM | cocci | 1.2E8 |
| 3NM | cocci | 5.8E7 |
| 3SM | cocci | 7.5E5 |
| 3AM | cocci | 7.5E5 |
| 3EP | bacilli | 7.8E7 |
| 3HP | bacilli | 3.0E7 |
| 3NP | bacilli | 7.1E7 |
| 3SP | cocci | 1.0E6 |
| 3AP | bacilli | 2.5E5 |
| 3EB | bacilli (variable) | 1.5E8 |
| 3HB | cocci/bacilli | 3.1E7 |
| 3NB | cocci | 3.1E8 |
| 3SB | cocci (irregular) | 1.7E7 |
| 3AB | cocci/bacilli | 2.5E5 |
| 4EM | cocci (variable) | 1.6E8 |
| 4HM | diplococci | 3.1E8 |
| 4NM | cocci | 1.6E8 |
| 4SM | cocci | 1.3E6 |
| 4AM | bacilli | 2.5E5 |
| 4EP | bacilli (variable) | 1.0E8 |
| 4HP | bacilli (variable) | 2.2E8 |
| 4NP | cocci | 1.3E8 |
| 4SP | cocci | 1.5E6 |
| 4AP | cocci/bacilli | 6.5E6 |
| 4EB | bacilli | 3.6E8 |
| 4HB | bacilli (variable) | 4.8E8 |
| 4NB | bacilli | 2.6E8 |
| 4SB | comma-shaped | 1.3E6 |
| 4AB | cocci | 1.0E6 |
| 5EM | cocci (variable) | 1.3E8 |
| 5HM | cocci | 1.4E8 |
| 5NM | cocci | 2.4E8 |
| 5SM | no cells | 0.0 |
| 5AM | no cells | 0.0 |
| 5EP | cocci (variable) | 5.1E7 |
| 5HP | bacilli | 3.2E7 |
| 5NP | streptococci | 2.1E8 |
| 5SP | cocci (variable) | 2.8E6 |
| 5AP | bacilli | 5.0E5 |
| 5EB | bacilli | 3.1E8 |
| 5HB | cocci | 3.2E7 |
| 5NB | cocci | 1.6E8 |
| 5SB | bacilli | 1.0E6 |
| 5AB | cocci | 2.5E6 |
| 6EM | bacilli (variable) | 1.7E8 |
| 6HM | cocci | 2.6E8 |
| 6NM | cocci/spirochetes | 1.3E8 |
| 6SM | cocci (variable) | 1.3E6 |
| 6AM | cocci (variable) | 2.0E6 |
| 6EP | bacilli | 2.8E7 |
| 6HP | bacilli | 1.3E8 |
| 6NP | bacilli/spirochetes | 2.0E8 |
| 6SP | cocci (variable) | 3.5E6 |
| 6AP | cocci (variable) | 5.0E5 |
| 6EB | cocci | 3.5E7 |
| 6HB | bacilli | 1.3E8 |
| 6NB | bacilli | 4.8E7 |
| 6SB | cocci | 2.3E6 |
| 6AB | cocci | 3.3E6 |
| 7EM | streptococci | 1.3E8 |
| 7HM | staphylococci | 3.2E7 |
| 7NM | cocci/bacilli | 3.1E8 |
| 7SM | cocci (variable) | 3.0E6 |
| 7AM | cocci (variable) | 4.0E6 |

TABLE 10-continued

| Sample ID | Morphology | Enumeration (cells/ml) |
|---|---|---|
| 7EP | bacilli | 1.4E8 |
| 7HP | bacilli | 4.1E8 |
| 7NP | bacilli | 3.5E8 |
| 7SP | cocci (variable) | 1.2E7 |
| 7AP | cocci (variable) | 1.5E6 |
| 7EB | bacilli (variable) | 1.6E8 |
| 7HB | bacilli (variable) | 3.9E8 |
| 7NB | bacilli | 4.2E8 |
| 7SB | cocci (variable) | 4.3E6 |
| 7AB | cocci (variable) | 2.8E6 |
| 8EM | cocci | 5.6E7 |
| 8HM | cocci | 6.1E7 |
| 8NM | cocci | 5.7E7 |
| 8SM | cocci (variable) | 5.3E6 |
| 8AM | bacilli | 2.3E6 |
| 8EP | bacilli | 1.4E8 |
| 8EP | cocci | 3.8E8 |
| 8NP | cocci | 2.9E8 |
| 8SP | square-shaped | 6.5E6 |
| 8AP | cocci (variable) | 3.8E6 |
| 8EB | bacilli | 1.3E8 |
| 8HB | bacilli/streptococci | 9.8E7 |
| 8NB | bacilli (variable) | 1.2E8 |
| 8SB | bacilli (variable) | 2.0E6 |
| 8AB | cocci (variable) | 2.8E6 |
| Control-1 | no cells | 0.0 |
| Control-2 | no cells | 0.0 |
| Control-3 | no cells | 0.0 |

Sample ID strains 3NB and 6NB were placed on deposit with the American Type Culture Collection (ATCC), Rockville, Md. on Aug. 22, 1996, under ATCC designation numbers 55808 and 55809, respectively.

A microcosm study using static headspace methods was conducted to evaluate methane, propane and butane consumption and TCE degradation rates for selected isolates. Static headspace involves a partitioning of volatile components between the aqueous and vapor phases enclosed in a gas tight vessel such as a serum bottle.

Each microcosm contained 25 ml of MSM and inoculum in a 72 ml serum bottle, thus yielding an effective headspace of 47 ml. Low concentrations of research grade methane, propane or n-butane ranging from 200 to 1,200 parts per million (ppm) were added to the headspace in their respective microcosms, in contrast to concentrations used during enrichment transfers, in order to avoid saturating enzyme sites with the growth substrate which would reduce cometabolic rates. A TCE concentration in the range of 2 to 12 ppm was added to the headspace of each microcosm. According to Henry's Law, the TCE concentration in the headspace would yield a corresponding concentration of approximately 4 to 24 ppm in the aqueous phase. Hydrocarbon and TCE disappearance were evaluated at times 0, 48 and 96 hours for the methane and propane microcosms. TCE and n-butane disappearance was evaluated at times 0, 48, 96 and 144 hours. Serum bottles containing sterilized MSM and methane, MSM and propane, MSM and n-butane, and MSM and TCE were maintained as controls. The serum bottles were capped with gray butyl rubber plugs coated with Teflon and crimped with aluminum seals (Wheaton). The serum bottle caps were coated with paraffin wax and stored in an inverted position in a water bath. A 250-microliter headspace sample from each serum bottle (after 2 min agitation of bottle) was analyzed using a Photovac 10S Plus gas chromatograph (GC) equipped with a photoionization detector (PID), an isothermal oven and a CP-Sil 5 CB capillary column. Duplicate analyses were conducted on each sample. Gas-tight Hamilton syringes with Fisher Scientific inert sampling valves comprising an on/off lever were used for on-column injections. The following GC parameters were employed for the microcosm evaluation:

| | |
|---|---|
| Oven temperature | 40 degrees C.; |
| Detector flow | 10 ml/min; |
| Backflush flow | 10 ml/min; |
| Carrier gas | ultra zero air (certified <0.1 ppm total hydrocarbons); |
| TCE detection limit | 0.0588 parts per billion (ppb); |
| Methane detection limit | 100 ppb; |
| Propane detection limit | 75 ppb; and |
| N-butane detection limit | 50 ppb. |

The results of the microcosm studies evaluating and comparing the TCE degradation rates of methane-, propane- and butane-utilizing bacteria are described below.

Table 11 summarizes the microcosm evaluation of methane consumption and TCE disappearance for selected isolates, given in ppm. Regression models were used to plot data to determine kinetic rates.

TABLE 11

| Sample ID | Zero Hour $CH_4$/TCE | 48 Hours $CH_4$/TCE | 96 Hours $CH_4$/TCE |
|---|---|---|---|
| 1EM | 1,144/5.909 | 1,093/3.470 | 909.5/2.854 |
| 1HM | 1,164/4.239 | 708.5/2.538 | BDL/1.563 |
| 1NM | 1,043/4.215 | 460.3/1.749 | BDL/1.107 |
| 2EM | 1,235/5.476 | 806.2/3.498 | 5.310/1.826 |
| 2HM | 1,260/5.741 | 1,310/3.955 | 972.1/2.530 |
| 2NM | 1,191/4.234 | 1,130/3.360 | BDL/2.070 |
| 3EM | 1,191/5.525 | 1,179/4.008 | 559.7/2.212 |
| 3HM | 1,210/4.920 | 1,204/3.586 | 739.8/1.969 |
| 3NM | 1,147/5.678 | 1,099/3.751 | 581.9/1.815 |
| 4EM | 840/4.552 | 352.7/0.767 | BDL/0.157 |
| 4HM | 431/3.799 | 166.6/2.547 | BDL/1.520 |
| 4NM | 1,112/4.517 | 460.5/3.447 | 8.437/1.789 |
| 5EM | 1,068/9.672 | 243.5/2.681 | 8.786/1.386 |
| 5HM | 1,152/6.691 | 967.6/1.570 | BDL/0.005 |
| 5NM | 1,108/7.775 | 620.7/1.191 | 4.856/0.074 |
| 6EM | 270/4.223 | 151.6/2.956 | BDL/2.068 |
| 6HM | 1,145/4.638 | 980.9/3.570 | 123.9/1.599 |
| 6NM | 1,161/4.462 | 1,034/4.100 | 573.4/0.805 |
| 7EM | 1,218/4.687 | 1,242/3.599 | 925.3/1.640 |
| 7HM | 1,277/4.877 | 1,309/3.860 | 1,081/2.151 |
| 7NM | 464/4.337 | 163/1.903 | BDL/1.004 |
| 8NM | 1,261/4.924 | 1,260/3.608 | 1,113/1.807 |
| $CH_4$ control-1 | 1,064/--- | 998/--- | 1,002/--- |
| $CH_4$ control-2 | 968/--- | 874/--- | 8791--- |
| $CH_4$ control-3 | 723/--- | 7461--- | 721/--- |
| TCE control-1 | ---/7.830 | ---/6.400 | ---/6.200 |
| TCE control-2 | ---/4.874 | ---/3.770 | ---/4.100 |
| TCE control-3 | ---/11.69 | ---/9.064 | ---/10.20 |

BDL = below instrument detection limit

The average loss of methane and TCE in the control bottles was 51.0 and 1.30 ppm, respectively. Methane was completely consumed within 96 hours by the following isolates: 1HM, 1NM, 2NM, 4EM, 4HM, 5HM, 6EM and 7NM. However, the initial methane concentrations varied. A lag phase of methane consumption was observed in several isolates between zero and 48 hours, for example, 1EM, 3EM, 3HM, 3NM, 7EM, 7HM and 8NM. This lag phase apparently represents an acclamation period for the isolates and not a manifestation of the toxic effects of TCE since methane consumption resumed between hours 48 and 96.

Isolates in 4EM, cell density 1.6E8 (Table 10), had initial $CH_4$/TCE concentrations of 840/4.552 ppm, respectively, and final $CH_4$/TCE concentrations of 0/0.157 ppm. The methane consumption rate for isolate 4EM was calculated to be 8.75 mg $h^{-1}$ $L^{-1}$, and the TCE degradation rate was 0.04 mg $h^{-1}$ $L^{-1}$. Therefore, 219 ppm of methane was required to degrade 1.0 ppm TCE.

Isolates in 5HM, cell density 1.4E8, had initial $CH_4$/TCE concentrations of 1,152/6.691 ppm, respectively, and final $CH_4$/TCE concentrations of 0/0.005 ppm. The methane consumption rate for isolate 5HM was calculated to be 12.0 mg $h^{-1}$ $L^{-1}$, and the TCE degradation rate was 0.07 mg $h^{-1}$ $L^{-1}$. Therefore, 171 ppm of methane was required to degrade 1.0 ppm TCE.

Isolates in 5NM, cell density 2.4E8, had initial $CH_4$/TCE concentrations of 1,108/7.775 ppm, respectively, and final $CH^4$/TCE concentrations of 4.856/0.074 ppm. The methane consumption rate for isolate 5NM was calculated to be 11.5 mg $h^{-1}$ $L^{-1}$, and the TCE degradation rate was 0.05 mg $h^{-1}$ $L^{-1}$. Therefore, 230 ppm of methane was required to degrade 1.0 ppm TCE.

Isolates in 6NM, cell density 2.6E8, had initial $CH_5$/TCE concentrations of 1,161/4.462 ppm, respectively, and final $CH_5$/TCE concentrations of 573.4/0.805 ppm. The methane consumption rate for isolate 6NM was calculated to be 6.12 mg $h^{-1}$ $L^{-1}$, and the TCE degradation rate was 0.04 mg $h^{-1}$ $L^{-1}$. Therefore, 153 ppm of methane was required to degrade 1.0 ppm TCE.

Review of the results indicate that some isolates produce enzymes that are effective at mineralizing TCE while others harvested on the same growth substrate produce enzymes that are ineffectual.

Table 12 summarizes the microcosm evaluation of propane consumption and TCE disappearance for selected isolates, given in ppm. Regression models were used to plot data to determine kinetic rates.

TABLE 12

| Sample ID | Zero Hour $C_3H_8$/TCE | 48 Hours $C_3H_8$/TCE | 96 Hours $C_3H_8$/TCE |
|---|---|---|---|
| 1HP | 1,653/4.437 | 1,055/>4.0 | 1,414/2.760 |
| 2EP | 1,099/4.226 | ***/1.496 | 1,024/0.152 |
| 2HP | 1,787/2.609 | 1,421/2.166 | 494.4/1.796 |
| 2NP | 1,730/>4.0 | 1,424/5.075 | 267.6/2.536 |
| 3HP | 1,555/1.922 | 800.9/1.812 | 17.92/1.130 |
| 3NP | 1,693/2.292 | 1,211/>2.0 | 8.612/1.328 |
| 4EP | 1,869/1.922 | 985/*** | 525.3/1.991 |
| 4HP | 1,071/1.972 | 975.6/0.724 | 646.1/0.062 |
| 4NP | 1,128/2.401 | 1,070/>2.0 | 925.4/2.536 |
| 5HP | 1,731/1.896 | 955.3/*** | 678.2/1.383 |
| 5NP | 1,837/2.468 | 865.4/>2.01 | 247.5/1.919 |
| 6EP | 1,760/*** | 1,639/12.50 | 1,402/10.0 |
| 6HP | 1,738/7.392 | ***/2.317 | 1,133/0.625 |
| 6NP | 3,458/8.061 | 1,062/5.196 | 910.1/2.562 |
| 7HP | 1,737/5.327 | BDL/3.299 | 20.70/4.583 |
| 7NP | 1,733/5.024 | BDL/*** | 15.30/4.017 |
| 8EP | 1,985/5.260 | 779.6/5.771 | 15.91/3.193 |
| 8HP | 1,806/4.772 | 1,315/>4.5 | 553.1/2.723 |
| 8NP | 1,868/4.768 | BDL/2.616 | 15.02/1.984 |
| $C_3H_8$ control-1 | 1,586/--- | 1,618/--- | 1,332/--- |
| $C_3H_8$ control-2 | 1,732/--- | 1,781/--- | 1,448/--- |
| $C_3H_8$ control-3 | 1,777/--- | 1,879/--- | 1,518/--- |
| TCE control-1 | ---/2.638 | ---/5.416 | ---/5.022 |
| TCE control-2 | ---/5.280 | ---/5.089 | ---/7.760 |
| TCE control-3 | ---/6.844 | ---/10.08 | ---/9.269 |

BDL = below instrument detection limit
*** = high standard deviation

The average loss of propane in the control bottles did not exceed 15 percent of total added over a period of 96 hours. Propane was completely consumed within 48 hours by the isolates 7HP, 7NP and 8NP. The average initial propane concentration for these three isolates was 1,770 ppm. In contrast, no selected methane-utilizing isolates achieved complete methane oxidation in less than 96 hours. The lag phase observed in the methane microcosm study between zero and 48 hours for several isolates was not apparent in the propane microcosm study. Of particular note are the isolates 4HP and 6NP. Isolates 7HP and 7NP demonstrated minimal TCE degradation averaging 20% of the total added.

Isolates in 4HP, cell density 2.2E8 (Table 10), had initial $C_3H_8$/TCE concentrations of 1,071/1.972 ppm, respectively, and final $C_3H_8$/TCE concentrations of 646.1/0.062 ppm. The propane consumption rate was calculated to be 4.43 mg $h^{-1}$ $L^{-1}$, and the TCE degradation rate was 0.02 mg $h^{-1}$ $L^{-1}$. Therefore, 222 ppm of propane was required to degrade 1.0 ppm TCE.

Isolates in 6NP, cell density 2.6E8, had initial $C_4H_8$/TCE concentrations of 1,161/4.462 ppm, respectively, and final $C_4H8$/TCE concentrations of 573.4/0.805 ppm. The propane consumption rate was calculated to be 26.5 mg $h^{-1}$ $L^{-1}$, and the TCE degradation rate was 0.06 mg $h^{-1}$ $L^{-1}$. Therefore, 442 ppm of propane are required to degrade 1.0 ppm TCE. There was a nearly equivalent correlation for the linear (r=0.8914) and exponential (r=0.9140) data plots for the propane consumption rate for isolate 6NP. In addition, the data plots for the TCE degradation rate showed the same linear (r=0.9997) and exponential (r=0.9910) trends.

Review of the results indicate that some isolates produce enzymes, as observed for the methane microcosm evaluation, that are effective at mineralizing TCE while others produce enzymes that are apparently ineffectual.

Table 13 summarizes the microcosm evaluation of n-butane consumption and TCE disappearance for selected isolates in accordance with the present invention, given in ppm. Corresponding graphs illustrating the butane microcosm results are included in FIGS. 21–36.

TABLE 13

| Sample ID | Zero Hour $C_4H_{10}$/TCE | 48 Hours $C_4H_{10}$/TCE | 96 Hours $C_4H_{10}$/TCE | 144 Hours $C_4H_{10}$/TCE |
|---|---|---|---|---|
| 2EB | 694.6/8.321 | 584.5/3.740 | 500/1.768 | BDL/0.945 |
| 2HB | 659.4/4.110 | 488.7/2.615 | BDL/1.274 | BDL/0.477 |
| 2NB | 701 9/5.415 | 616.6/≧5.0 | 452.7/2.405 | BDL/1.760 |
| 3EB | 1077/9.399 | 551 0/7.330 | 476.8/2.641 | BDL/1.260 |
| 3NB | 657.3/11.42 | 564.8/10.12 | ≧564/3.827 | 559.8/2.368 |
| 4EB | 670.3/7.065 | 544.1/1.758 | 473.2/0.774 | BDL/0.158 |
| 4HB | 709.2/6.752 | 333.7/3.006 | BDL/2.900 | BDL/1.825 |
| 4NB | 710.6/6.817 | BDL/2.750 | BDL/1.383 | BDL/1.199 |
| 5EB | 659.8/5.873 | 517.5/2.737 | BDL/2.253 | BDL/1.113 |
| 6HB | 625.9/5.508 | 576.3/1.046 | 542.4/0.142 | 397.4/BDL |
| 6NB | 675.8/5.996 | 622.0/0.836 | 620.9/0.268 | BDL/BDL |
| 7EB | 726.0/2.357 | 619.8/2.331 | BDL/≧2.300 | BDL/2.100 |
| 7HB | 656.3/5.055 | 355.0/2.703 | BDL/≧2.700 | BDL/2.648 |
| 7NB | 687.5/6.232 | 297.2/3.064 | BDL/2.440 | BDL/1.721 |
| 8EB | 651.5/2.934 | 448.5/*** | BDL/2.684 | BDL/2.446 |
| 8HB | 718.4/2.599 | 576.2/1.967 | BDL/*** | BDL/1.953 |
| Butane Control-1 | 632.0/--- | 681.9/-- | 762.5/--- | 986.6/--- |
| Butane Control-2 | 884.5/--- | 889.0/--- | 942.7/--- | 1075/-- |
| Butane Control-3 | 966.9/--- | 1012/--- | 1053/--- | 1168/--- |
| TCE Control-1 | ---/8.149 | ---/7.840 | ---/7.717 | ---/7.392 |
| TCE Control-2 | ---/11.720 | ---/9.831 | ---/8.949 | ---/8.922 |
| TCE Control-3 | ---/11.835 | ---/11.605 | ---/10.438 | ---/9.954 |

BDL = below instrument detection limit
*** = high standard deviation

As shown in Table 13, n-butane was completely consumed within 48 hours by 4NB and 96 hours by 2HB, 4HB, 4NB, 5EB, 7EB, 7HB and 7NB. A lag phase was not observed for growth between zero and 48 hours. According to the graphs of FIGS. 23, 25, 27, 29, 31, 33 and 35, depicting n-butane consumption versus time for selected isolates, n-butane consumption appears to follow apparent zero order kinetics, indicating that the rate of reaction may be independent of the concentration of the isolates. However, according to the graphs of FIGS. 24, 26, 28, 30, 32, 34 and 36, depicting TCE loss over time, zero and first order kinetics were observed. The occurrence of first order kinetics indicates that the TCE degradation rate may be dependent on the concentration of the isolates such that there is a linear relationship between the natural log of concentration at a given time over the initial concentration. Of particular note are the isolates 2EB, 2HB, 2NB, 3EB, 3NB, 4EB, 4HB, 4NB, 5EB, 6HB, 6NB and 7NB. The average loss of TCE in the control bottles (1–3) ranged from 9 to 23 percent.

Figure 23:
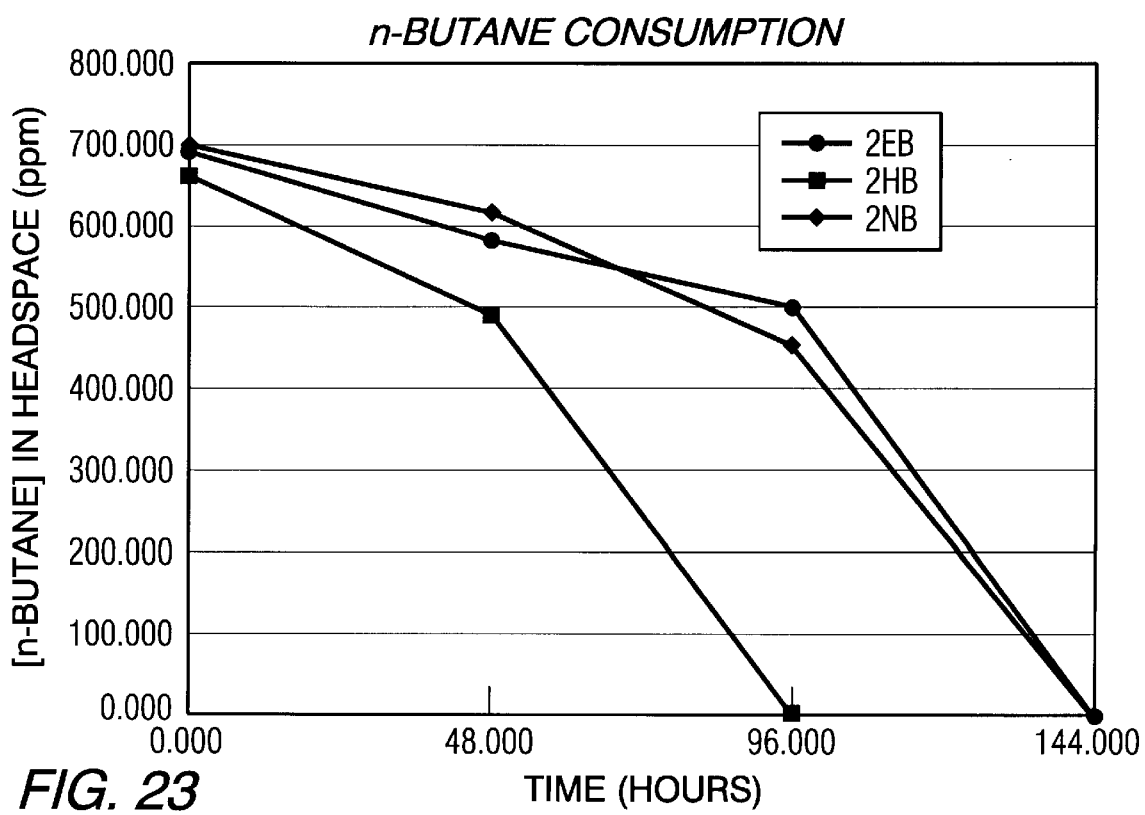
FIGS. 23–36 are graphs showing butane and TCE loss for various butane-utilizing bacteria in accordance with the present invention.
Figure 24:
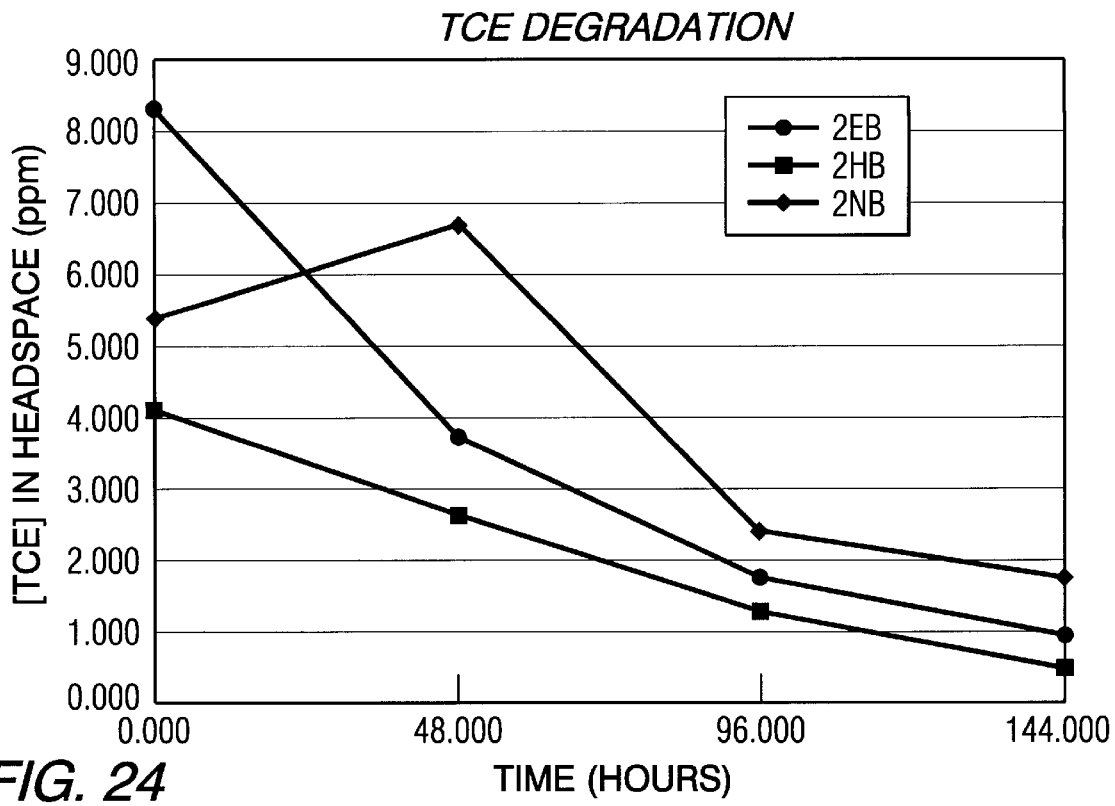

Isolates in 2EB, cell density 2.1E8 (Table 10), had initial $C_4H_{10}$/TCE concentrations of 694.6/8.321 ppm, respectively, and final $C_4H_{10}$/TCE concentrations of 0/0.945 ppm (see FIGS. 23 and 24). The n-butane consumption rate for isolate 2EB was calculated to be 4.52 mg $h^{-1}$ $L^{-1}$, and the TCE degradation rate was 0.02 mg $h^{-1}$ $L^{-1}$. Therefore, 226 ppm of n-butane was required to degrade 1.0 ppm TCE. Since the 2EB-containing microcosm showed no correlation between TCE and n-butane degradation, TCE apparently serves as a carbon source.

Isolates in 2HB, cell density 2.5E8, had initial $C_4H_{10}$TCE concentrations of 659.4/4.110 ppm, respectively, and final $C_4H_{10}$/TCE concentrations of 0/0.477 ppm (see FIGS. 23 and 24). In comparison with the propane-utilizing microcosm, 2HP, that degraded 31 percent of the total TCE added, 2HB degraded 88 percent of the total added. The n-butane consumption rate for 2HB was calculated to be 5.06 mg $h^{-1}$ $L^{-1}$, and the TCE degradation rate was 0.03 mg $h^{-1}$ $L^{-1}$. Therefore, 169 ppm of n-butane was required to degrade 1.0 ppm TCE. The 2HB-containing microcosm showed a good correlation between TCE and n-butane degradation characteristic of cometabolic degradation.

Isolates in 2NB, cell density 1.9E8, had initial $C_4H_{10}$/TCE concentrations of 701.9/5.415 ppm, respectively, and final $C_4H_{10}$/TCE concentrations of 0.0/1.760 ppm (see FIGS. 23 and 24). Therefore, 473 ppm of n-butane was required to degrade 1.0 ppm TCE. The propane-utilizing microcosm, 2NP, degraded 25 percent less of the total added TCE than the 2NB-containing microcosm. The n-butane consumption rate for 2HB was calculated to be 4.73 mg $h^{-1}$ $L^{-1}$, and the TCE degradation rate was 0.01 mg $h^{-1}$ $L^{-1}$. Since the 2NB-containing microcosm showed no correlation between TCE and n-butane degradation, it is apparent that this isolate uses TCE as a carbon source.

Figure 25:
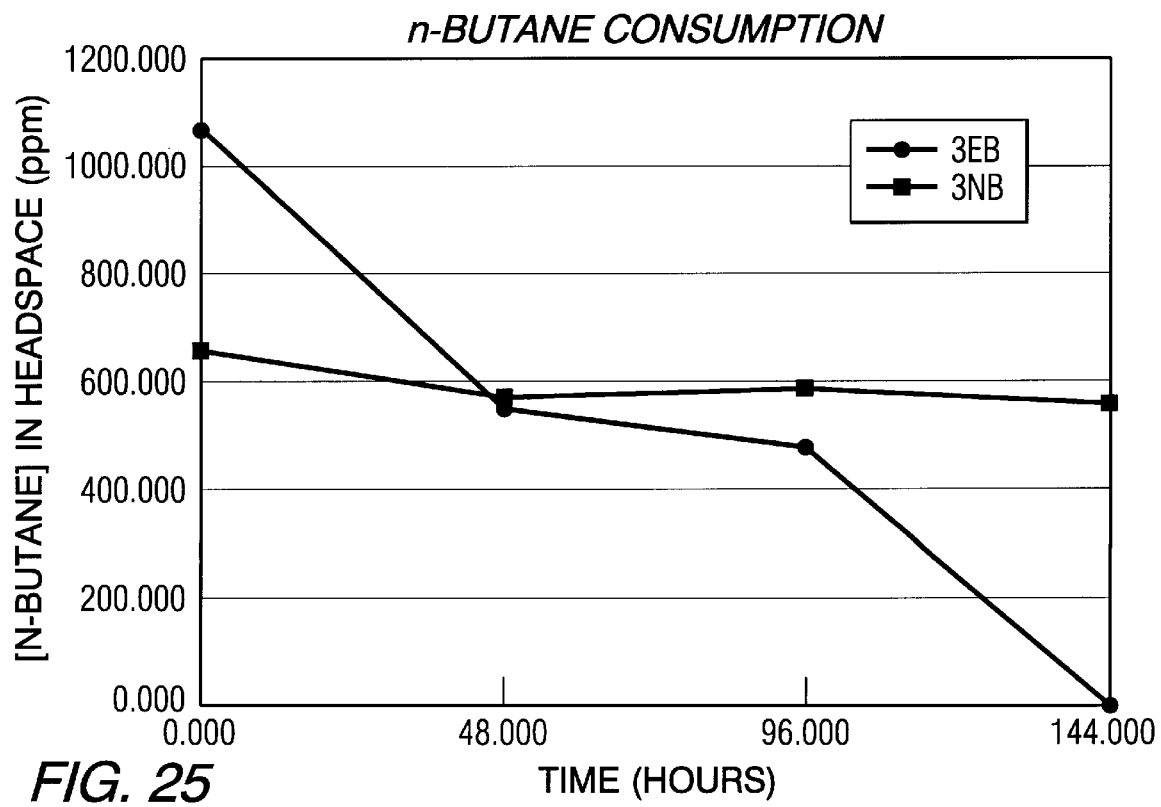
Figure 26:
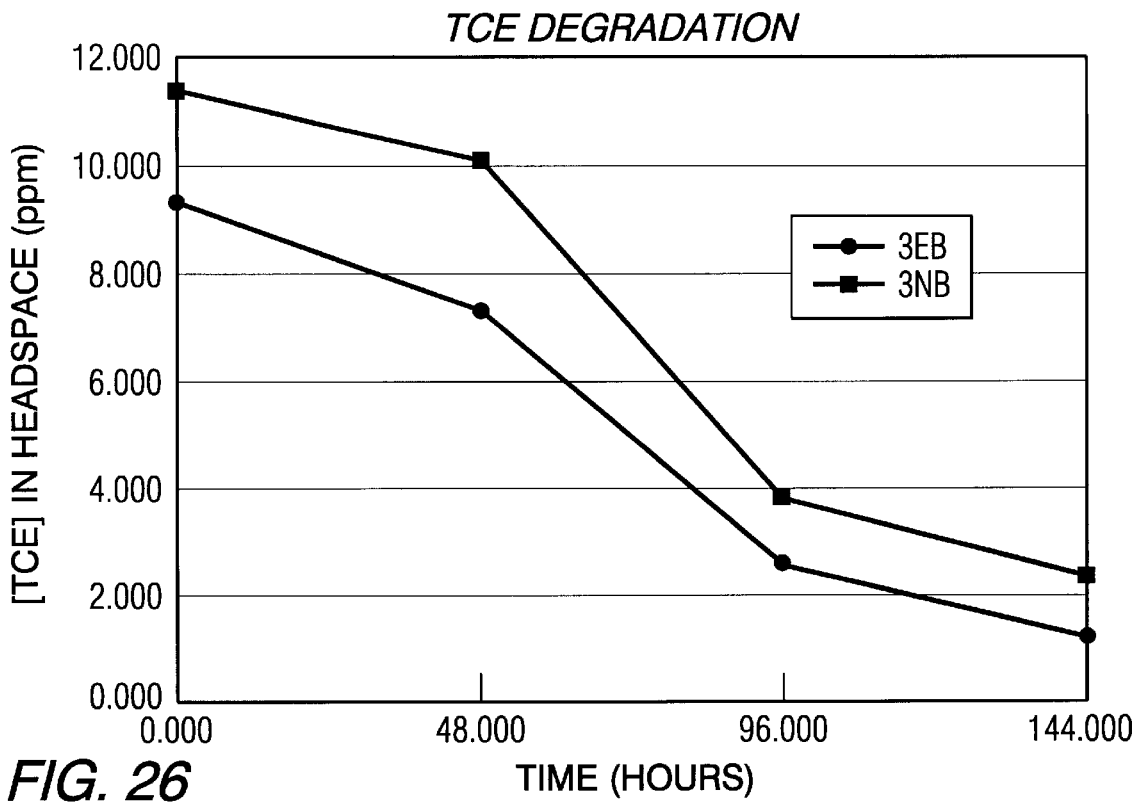

Isolates in 3EB, cell density 1.5E8, had initial $C_4H_{10}$/TCE concentrations of 1077/9.399 ppm, respectively, and final $C_4H_{10}$/TCE concentrations of 0/1.260 ppm (see FIGS. 25 and 26). Inoculum 3EB degraded 87 percent of the total TCE added. The n-butane consumption rate for 3EB was 6.89 mg $h^{-1}$ $L^{-1}$, and the TCE degradation rate was 0.06 mg $h^{-1}$ $L^{-1}$. Therefore, 115 ppm of n-butane was required to degrade 1.0 ppm TCE. Since the 3EB-containing microcosm showed little correlation between TCE and n-butane degradation, this isolate apparently uses TCE as a carbon source. Isolates in 3NB, cell density 3.1E8, had initial $C_4H_{10}$/TCE concentrations of 657.3/11.42 ppm, respectively, and final $C_4H_{10}$/TCE concentrations of 559.8/2.368 ppm (see FIGS. 25 and 26). In contrast, the propane-utilizing microcosm, 3NP, degraded 42 percent of the total TCE added whereas 3NB degraded 79 percent of the total added. The TCE degradation rate was 0.01 mg $h^{-1}$ $L^{-1}$. Therefore, 10.77 ppm of n-butane was required to degrade 1.0 ppm TCE.

Figure 27:
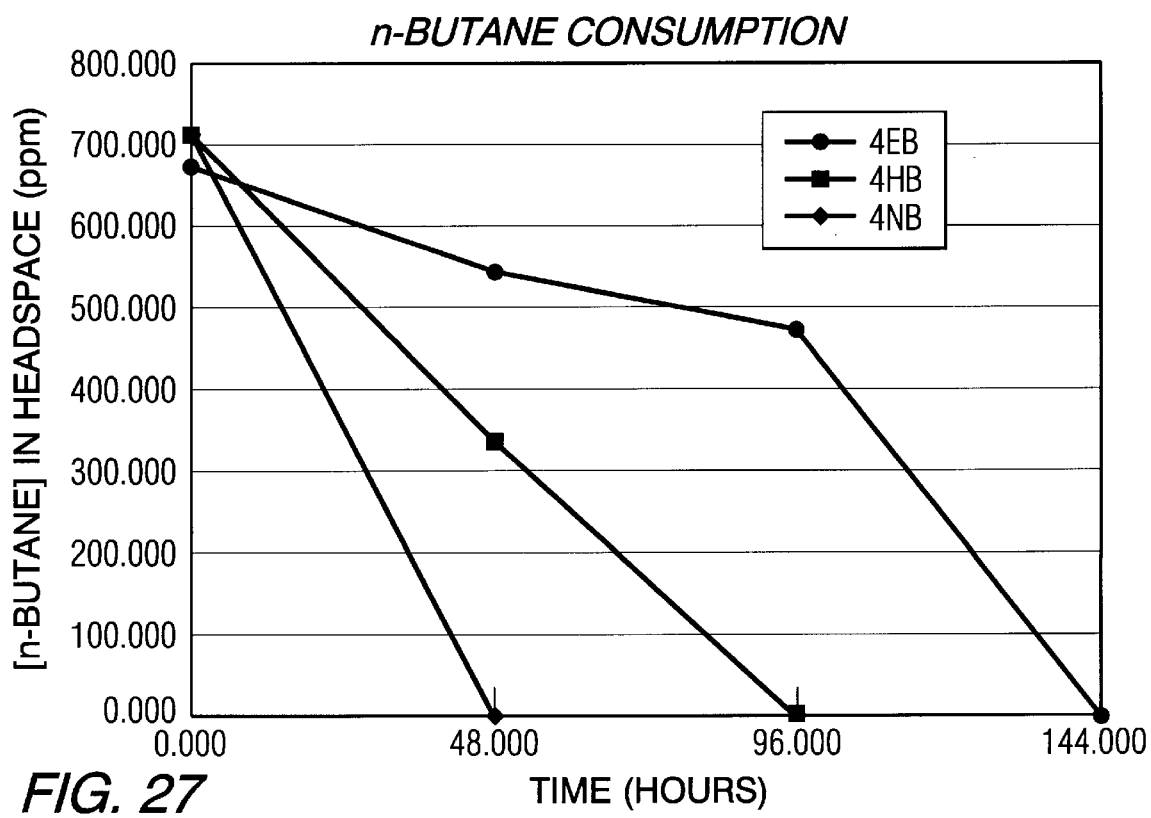
Figure 28:
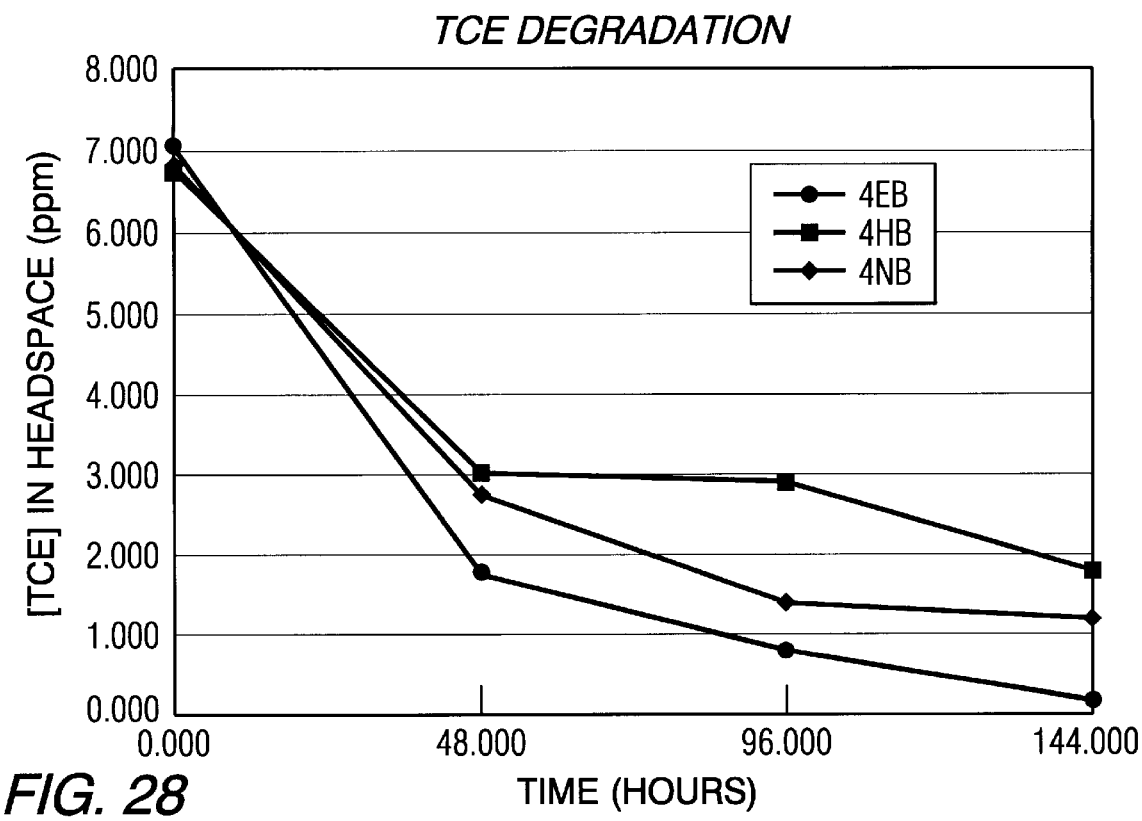

Isolates in 4EB, cell density 3.6E8, had initial $C_4H_{10}$/TCE concentrations of 670.3/7.065 ppm, respectively, and final $C_4H_{10}$/TCE concentrations of 0/0.158 ppm (see FIGS. 27 and 28). The propane-utilizing microcosm, 4EP, showed no TCE degradation. The inoculum 4EB degraded 98 percent of the total TCE added. The n-butane consumption rate for 4EB was calculated to be 4.34 mg $h^{-1}$ $L^{-1}$, and the TCE degradation rate was 0.03 mg $h^{-1}$ $L^{-1}$. Since the 4EB-containing microcosm showed no correlation between TCE and n-butane degradation, it is apparent that this isolate uses TCE as a carbon source.

Isolates in 4HB, cell density 4.8E8, had initial $C_4H_{10}$/TCE concentrations of 709.2/6.752 ppm, respectively, and final $C_4H_{10}$/TCE concentrations of 0/1.825 ppm (see FIGS. 27 and 28). The inoculum 4HB degraded 73 percent of the total TCE added. The n-butane consumption rate for 4HB was calculated to be 5.13 mg $h^{-1}$ $L^{-1}$, and the TCE degradation rate was 0.01 mg $h^{-1}$ $L^{-1}$. Since the 4HB-containing microcosm showed no correlation between TCE and n-butane degradation, it is apparent that this isolate uses TCE as a carbon source.

Isolates in 4NB, cell density 2.6E8, had initial $C_4H_{10}$/TCE concentrations of 709.2/6.752 ppm, respectively, and final $C_4H_{10}$/TCE concentrations of 0/1.825 ppm (see FIGS. 27 and 28). The propane-utilizing microcosm, 4NP, showed no TCE degradation whereas 4NB degraded 82 percent of the total TCE added. The n-butane consumption rate for 4NB was calculated to be 4.44 mg $h^{-1}$ $L^{-1}$, and the TCE degradation rate was 0.01 mg $h^{-1}$ $L^{-1}$. Since the 4NB-containing microcosm showed no correlation between TCE and n-butane degradation, it is apparent that this isolate uses TCE as a carbon source.

Figure 29:
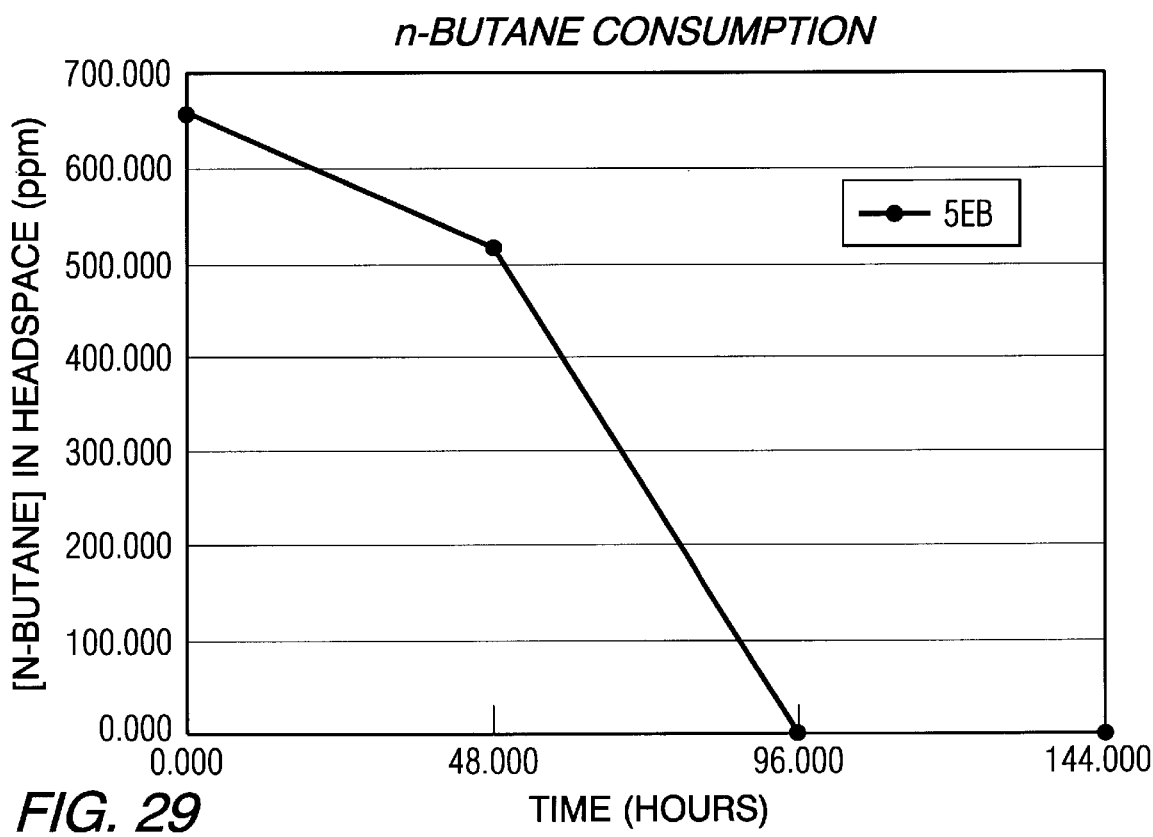
Figure 30:
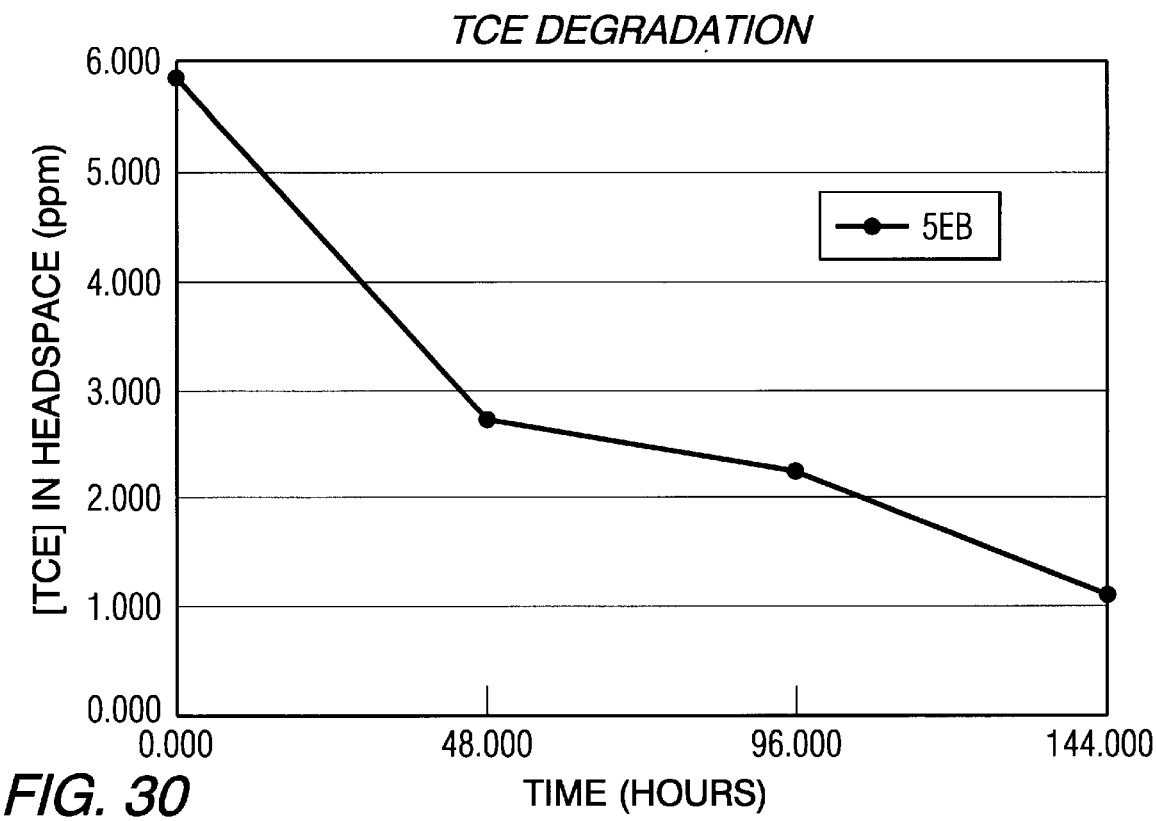

Isolates in 5EB, cell density 3.1E8, had initial $C_4H_{10}$/TCE concentrations of 659.8/5.873 ppm, respectively, and final $C_4H_{10}$/TCE concentrations of 0/1.113 ppm (see FIGS. 29 and 30). The inoculum 5EB degraded 81 percent of the total TCE added. The n-butane consumption rate for 5EB was 5.20 mg $h^{-1}$ $L^{-1}$, and the TCE degradation rate was 0.01 mg $h^{-1}$ $L^{-1}$. Therefore, 520 ppm of n-butane was required to degrade 1.0 ppm TCE. Since the 5EB-containing microcosm showed no correlation between TCE and n-butane degradation, it is apparent that this isolate uses TCE as a carbon source.

Figure 31:
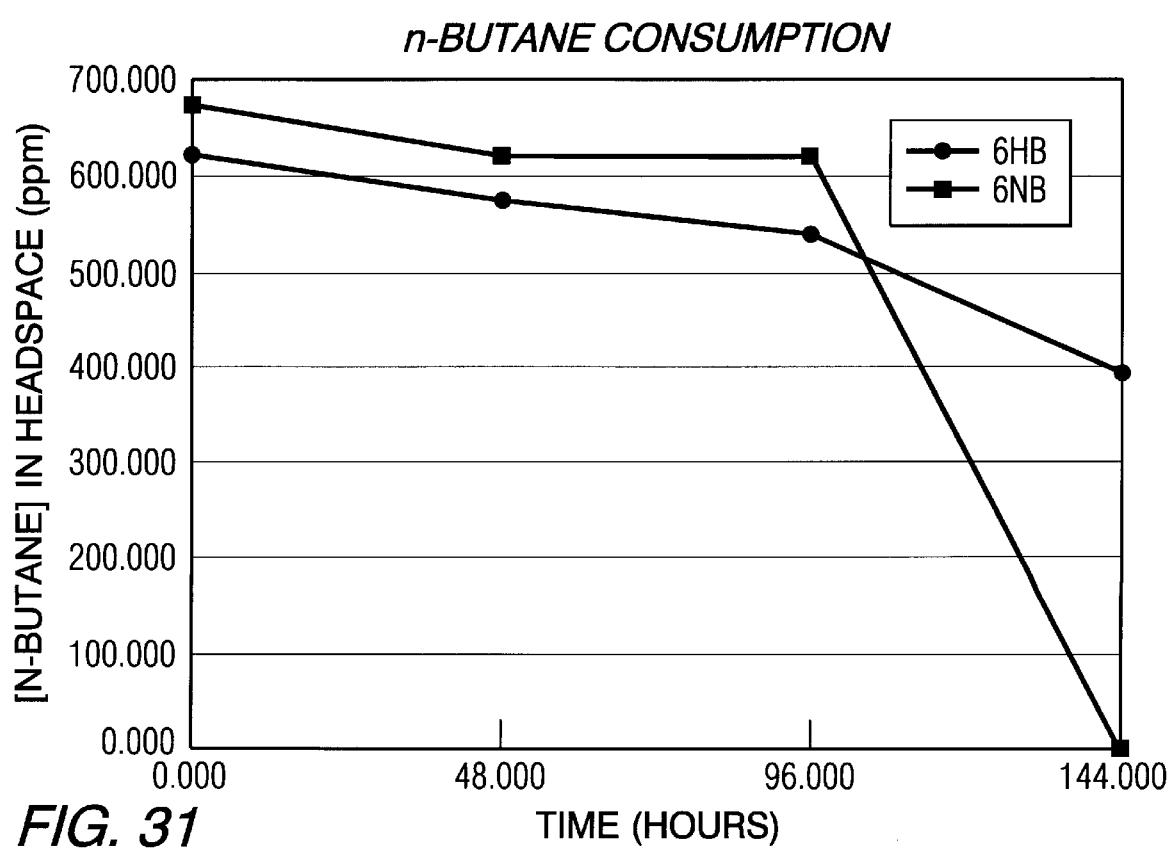
Figure 32:
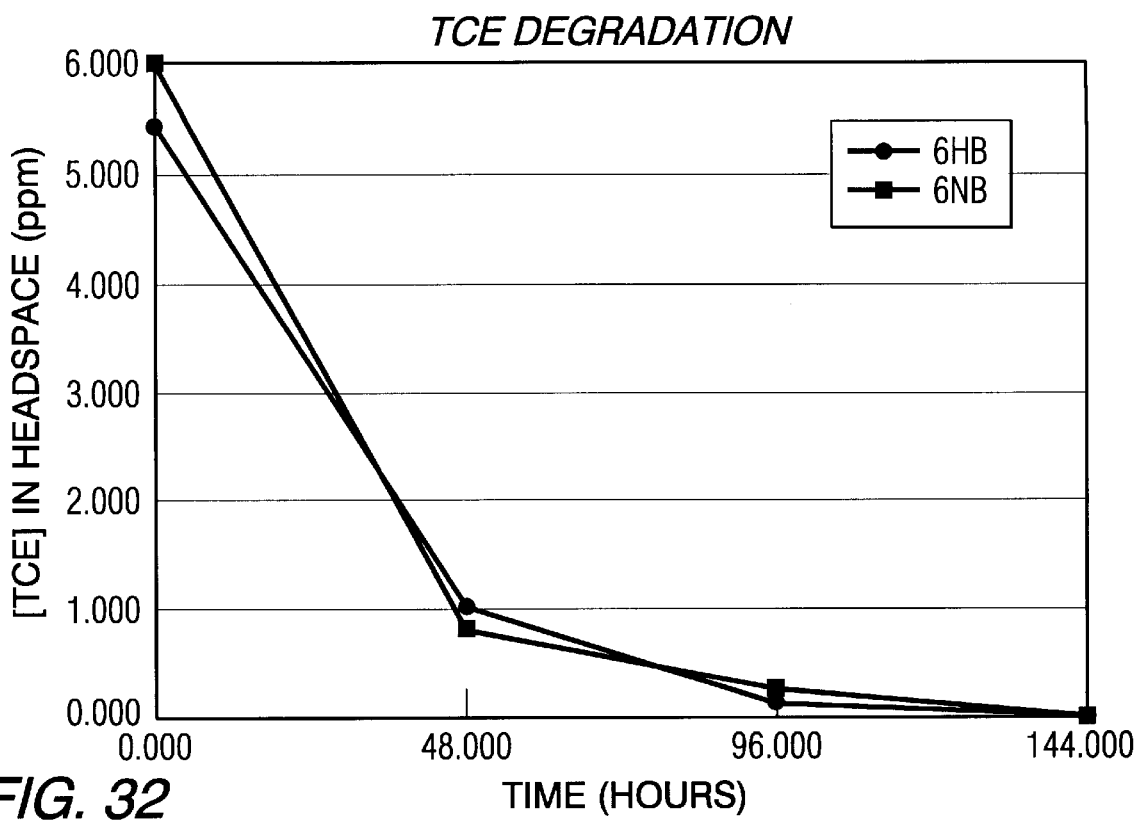

Isolates in 6HB, cell density 1.3E8, had initial $C_4H_{10}$TCE concentrations of 625.9/5.508 ppm, respectively, and final $C_4H_{10}$/TCE concentrations of 397.4/0.0 ppm (see FIGS. 31 and 32). The inoculum 6HB degraded 100 percent of the total TCE added. The n-butane consumption rate was 1.50 mg $h^{-1}$ $L^{-1}$, and the TCE degradation rate was 0.04 mg $h^{-1}$ $L^{-1}$. Therefore, 37.50 ppm of n-butane was required to degrade 1.0 ppm TCE, a very low butane requirement. These isolates may degrade TCE in the absence of butane.

Isolates in 6NB, cell density 4.8E7, had initial $C_4H_{10}$/TCE concentrations of 675.8/5.996 ppm, respectively, and final $C_4H_{10}$/TCE concentrations of 0.0/0.0 ppm (see FIGS. 31 and 32). The inoculum 6NB degraded 100 percent of the total TCE added. The n-butane consumption rate was 4.23 mg $h^{-1}$ $L^{-1}$, and the TCE degradation rate was 0.04 mg $h^{-1}$ $L^{-1}$. Therefore, 106 ppm of n-butane was required to degrade 1.0 ppm TCE. The 6NB-containing microcosm showed a good correlation between TCE and n-butane consumption. Thus, degradation is apparently a cometabolic process.

Figure 33:
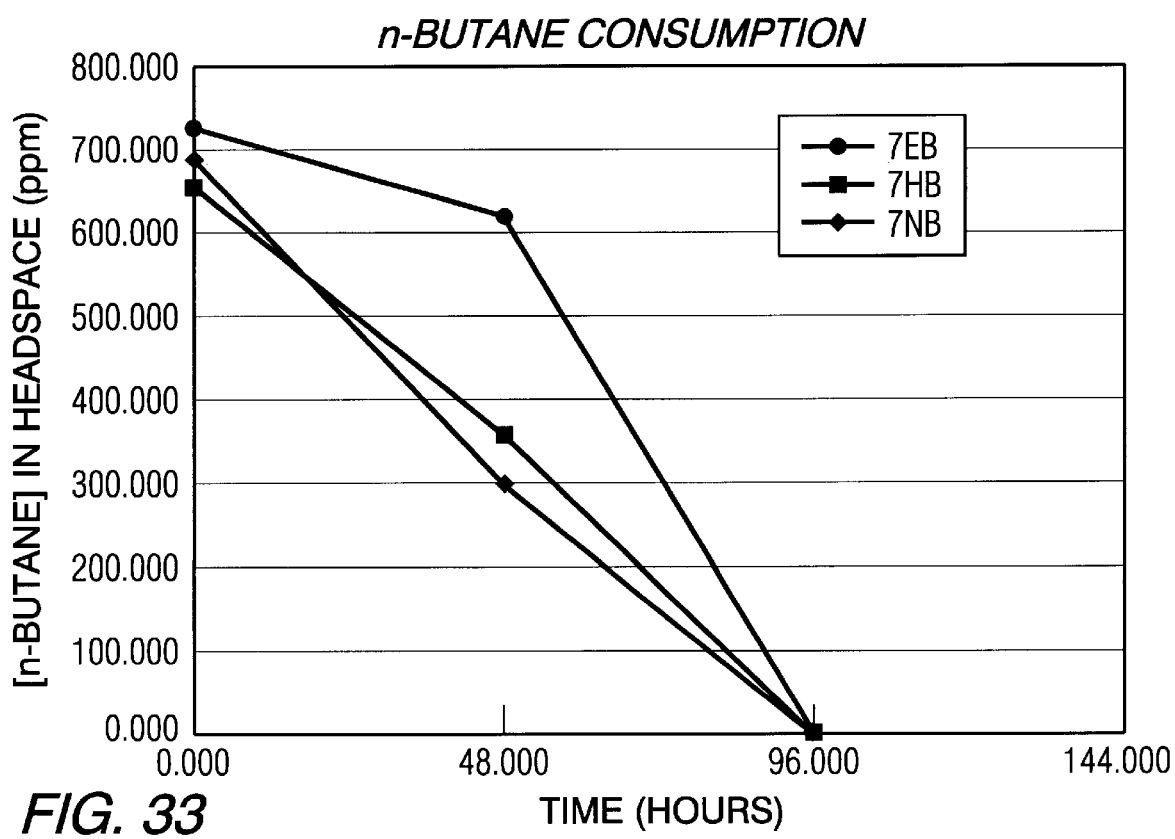

Isolates in 7EB, cell density 1.6E8, had initial $C_4H_{10}$/TCE concentrations of 726.0/2.357 ppm, respectively, and final $C_4H_{10}$/TCE concentrations of 0.0/2.100 ppm (see FIGS. 33 and 34). The inoculum 7EB degraded only 11% of the total TCE added. The n-butane consumption rate was 5.0 mg h$^{-1}$ L$^{-1}$, and the TCE degradation rate was 0.002 mg h$^{-1}$ L$^{-1}$.

Figure 34:
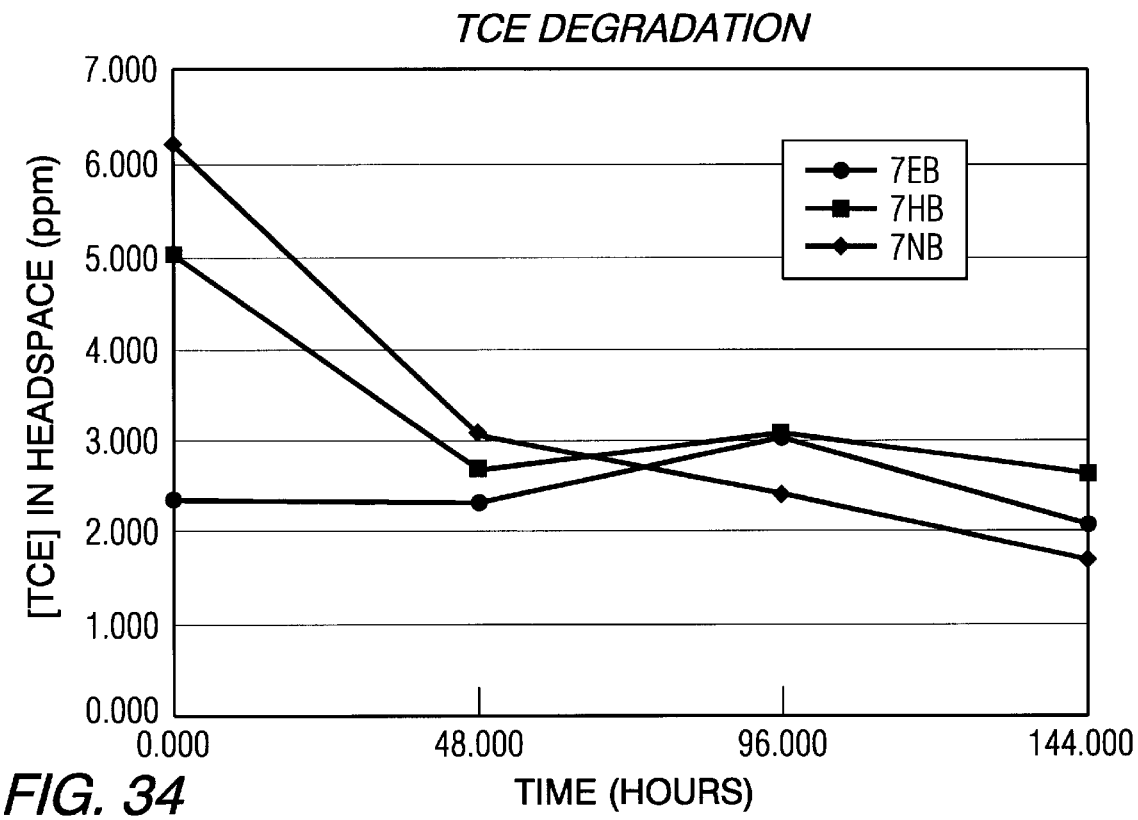
Figure 35:
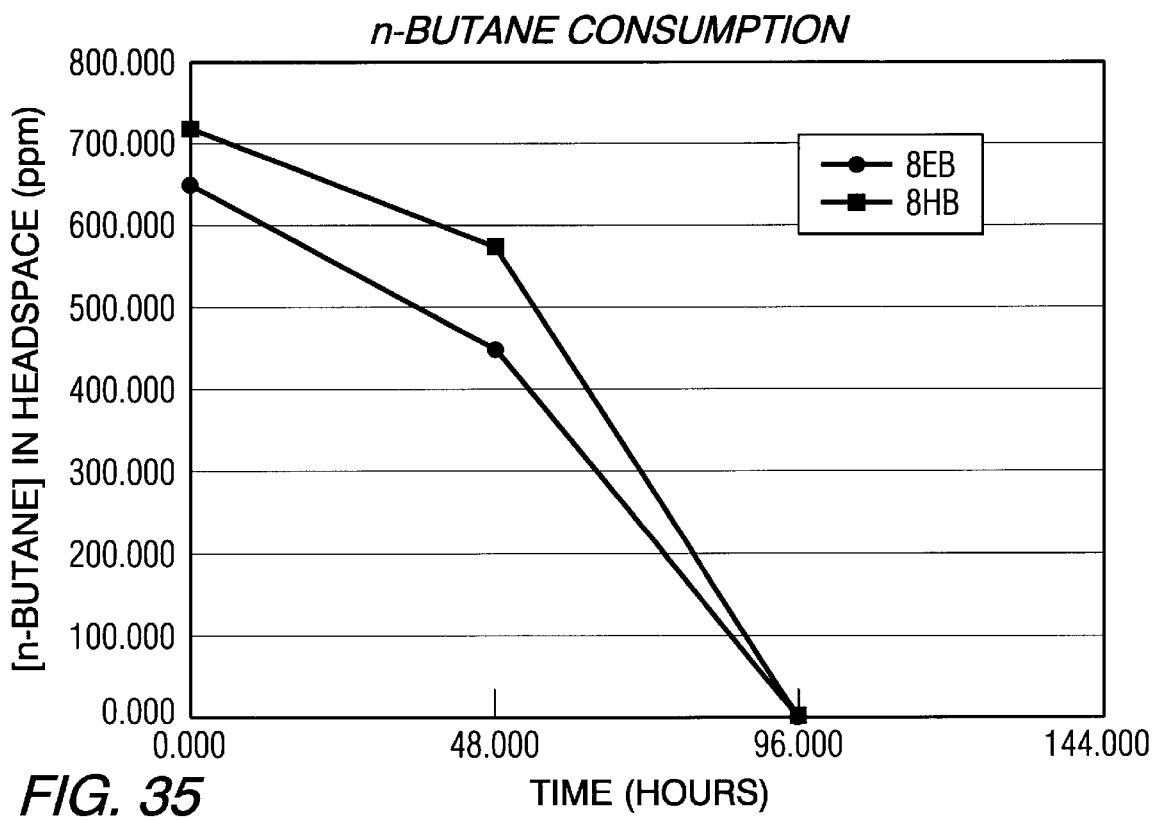
Figure 36:
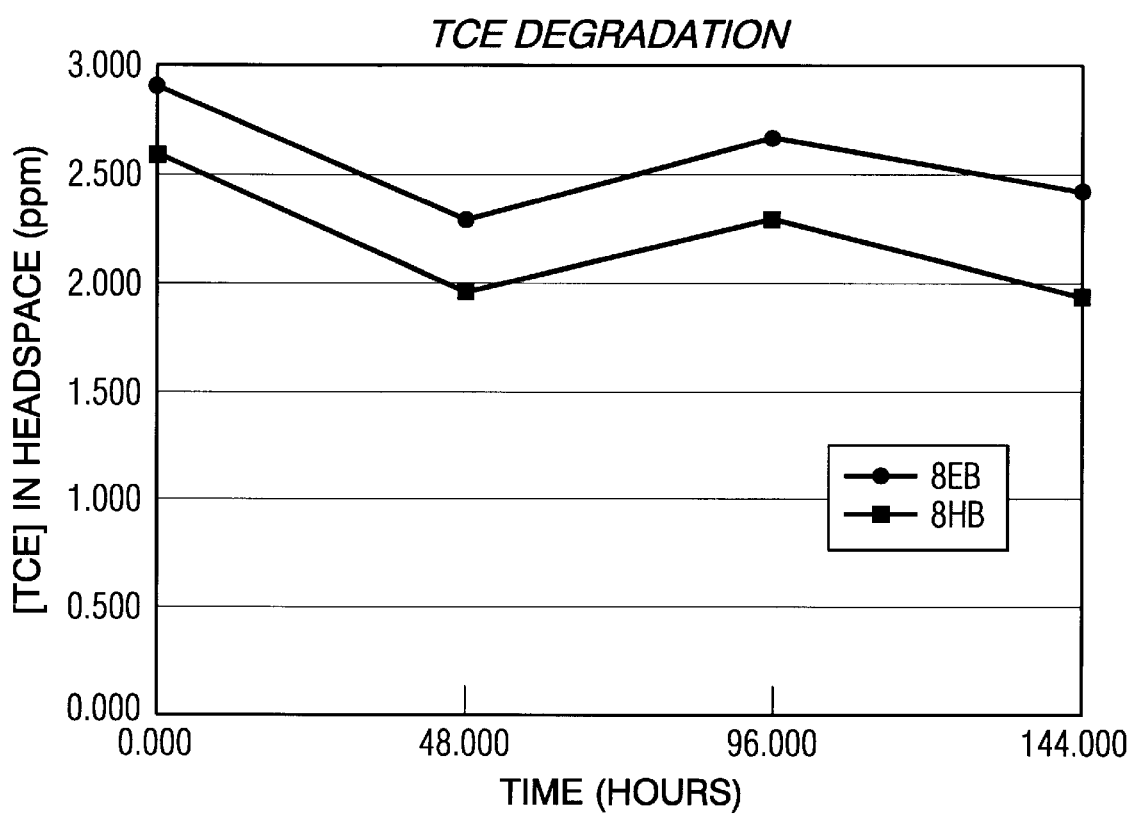

Isolates in 7HB, cell density 3.9E8, had initial C$_4$H$_{10}$/TCE concentrations of 656.3/5.05 ppm, respectively, and final C$_4$H$_{10}$/TCE concentrations of 0.0/2.700 ppm (see FIGS. 33 and 34). The inoculum 7HP degraded 14 percent of the total TCE added, while the inoculum 7HB degraded 47% of the total TCE added. The n-butane consumption rate for 7HB was 4.6 mg h$^{-1}$ $^{L-1}$, and the TCE degradation rate was 0.02 mg h$^{-1}$ L$^{-1}$. The 7HB-containing microcosm showed a good correlation between TCE and n-butane consumption. Thus, degradation is apparently a cometabolic process.

Isolates in 7NB, cell density 4.2E8, had initial C$_4$H$_{10}$/TCE concentrations of 687.5/6.232 ppm, respectively, and final C$_4$H$_{10}$/TCE concentrations of 0.0/1.721 ppm (see FIGS. 33 and 34). The inoculum 7NP degraded 20 percent of the total TCE added, while the inoculum 7NB degraded 72 percent of the total TCE added. The n-butane consumption rate was 4.92 mg h$^{-1}$ L$^{-1}$, and the TCE degradation rate was 0.01 mg h$^{-1}$ L$^{-1}$. Since the 7NB-containing microcosm showed no correlation between TCE and n-butane degradation, it is apparent that this isolate uses TCE as a carbon source.

TCE degradation in a few microcosms was independent of butane consumption. For example, the isolates in 4NB and 7NB degraded TCE continuously in the absence of butane. Other microcosms such as 4EB demonstrate cometabolic degradation of TCE with butane.

From the above-noted results, it appears that TCE toxicity for the butane-utilizing bacteria is minimal. The butane-utilizing bacteria are preferably capable of surviving TCE levels above about 6 mg/l, more preferably above about 10 mg/l, and most preferably above about 20 mg/l aqueous phase. As set forth in U.S. Pat. No. 4,713,343 to Wilson Jr. et al., cited previously, the growth of methane-utilizing bacteria are inhibited by the presence of a chlorinated epoxide that forms during the cometabolic degradation of TCE mediated by the enzyme methane monooxygenase. According to Broholm et al., 1990, cited previously, TCE is toxic to methane-utilizing bacteria at concentrations above 6 mg/l in water. A quantitative comparison of TCE toxicity between methane-, propane- and butane-utilizing bacteria showed that the butane-utilizing bacteria of the present invention were substantially less susceptible to the effects of TCE toxicity. Butane-utilizing bacteria survived at an average of 1.4 times higher concentrations of TCE than propane oxidizers. Moreover, the butane-utilizing bacteria are capable of surviving at several orders of magnitude higher TCE concentrations than methane oxidizers.

In accordance with a preferred embodiment of the present invention, TCE is degraded at higher rates with butane-utilizing bacteria in comparison with methane- or propane-utilizing bacteria. Over 50% of the butane-utilizing bacteria degraded TCE to half of its initial concentration within 48 hours after incubation. This high rate of degradation was not observed in over 80 percent of the microcosms containing methane- or propane-utilizing bacteria. The butane-utilizing bacteria of the present invention are preferably capable of degrading TCE at a rate of greater than about 1 mg/hr/liter in water, more preferably at a rate of greater than about 1.5 or 2 mg/hr/liter.

As a food source for microbial consumption, butane has been found to be a superior substrate to methane or propane due to its solubility factor. Methane and propane are characterized as slightly soluble in water while butane is characterized as very soluble in water. At 17 degrees centigrade, 3.5 ml of methane and 6.5 ml of propane dissolves in 100 ml of water. In contrast, 15 ml of butane dissolves in 100 ml of water. Such higher solubility increases microbial access to the growth substrate for metabolism. Butane is thus approximately four times more soluble in groundwater than methane. In accordance with the present invention, butane injection results in large radii of influence at injection wellheads.

Another cause of the higher TCE cometabolic rates for the butane-utilizers in comparison with the methane- or propane-utilizers may be the molecular structure of the compounds and enzymes. TCE is a large planar molecule composed of two carbon atoms and three chlorine atoms. Methane is a small single tetrahedral carbon molecule, while propane is a three carbon molecule. On the other hand, butane is a large non-planar four carbon molecule. While not intending to be bound by any particular theory, molecular structure, reactive surface area and size may play a role in causing the operative enzymes of the butane oxidizers to be superior TCE degraders in comparison with the methane and propane operative enzymes. The occurrence of TCE degradation in absence of any other growth substrate clearly provides highly improved TCE degradation capability. Furthermore, while methane-utilizing bacteria are typically sensitive to normal oxygen tension of an air atmosphere and require decreased oxygen levels for growth, the butane-utilizing bacteria of the present invention are not sensitive to ambient oxygen tension and can be used with normal atmospheres. In addition, the butane-utilizers do not exhibit copper toxicity, and do not require carbon dioxide as a supplementary carbon source.

Various propane-utilizing and butane-utilizing bacteria were characterized as follows. Microorganism identification is based on the Similarity Index. The Similarity Index in the Microbial Identification System (MIS) is a numerical value which expresses how closely the fatty acid composition of an unknown sample compares with the mean fatty acid methyl ester composition of the strains used to create the library entry listed as its match. The database search presents the best matches and associated similarity indices. An exact match of the fatty acid make-up of the unknown sample to the mean of a library entry results in a similarity index of 1.000. The similarity index will decrease as each fatty acid varies from the mean percentage. Strains with a similarity of 0.500 or higher and with a separation of 0.100 between first and second choice are good matches (good or excellent). A similarity index between 0.300 and 0.500 may be a good match but would indicate an atypical strain (OK). Values lower than 0.300 suggest that the species is not in the database but those listed provide the most closely related species (weak or poor).

In the cases where a strain remained unidentified after fatty acid analysis, the Biolog system was employed where microorganisms are identified by comparing substrate utilization characteristics of the unknown isolate to the Biolog database.

The following isolates were chosen for identification at two independent laboratories: propane-utilizers 2EP, 3EP, 4HP, 6HP, 6NP and 8NP; and butane-utilizers 2EB, 2HB, 3EB, 3NB, 4EB, 4HB, 4NB, 5EB, 6HB, 6NB and 7NB.

The majority of the propane-utilizers and butane-utilizers were characterized as different genera/species by both laboratories for the comparison-pair isolates 2EP-2EB, 3EP-3EB, 4HP4HB, 6HP-6HB, and 6NP-6NB, thus indicating that the butane-utilizers are a distinct class of microorganism from the propane degraders. Since methane-utilizing bacteria are obligate methane oxidizers, no isolates from the methane microcosms were submitted for laboratory analysis. Most isolates from the microcosms were mixed. Between both laboratories, 59 genus/specie were identified with "good or excellent" precision, 14 with "OK" precision (atypical strains) and 22 with "weak" precision (species not in database and remain as unknowns). A summary of the butane-utilizers that have demonstrated the ability to degrade TCE are identified in Table 14.

TABLE 14

| Sample ID | Genus | Species |
|---|---|---|
| 2HB* | Pseudomonas | putida |
| 2EB | Pseudomonas | rubrisubalbicans |
| 3EB | Pseudomonas | rubrisubalbicans |
| 5EB | Pseudomonas | aeruginosa |
| 6NB | Pseudomonas | aeruginosa |
| 2EB | Variovorax | paradoxus |
| 2HB | Variovorax | paradoxus |
| 3EB | Variovorax | paradoxus |
| 3NB | Variovorax | paradoxus |
| 4HB | Variovorax | paradoxus |
| 4NB | Variovorax | paradoxus |
| 5EB* | Variovorax | paradoxus |
| 6HB | Variovorax | paradoxus |
| 2EB | Variovorax | paradoxus** |
| 6NB | Variovorax | paradoxus*** |
| 7NB | Nocardia | asteroides |
| 2HB | Nocardia | asteroides*** |
| 3EB | Nocardia | asteroides*** |
| 4HB* | Nocardia | asteroides*** |
| 4NB | Nocardia | asteroides*** |
| 7NB | Nocardia | asteroides*** |
| 5EB* | Nocardia | brasiliensis |
| 2EB | Nocardia | restricta |
| 2HB | Nocardia | globerula |
| 2HB | Chryseobacterium | indologenes |
| 4HB | Chryseobacterium | indologenes |
| 7NB | Chryseobacterium | indologenes |
| 5EB | Chryseobacterium | meningosepticum |
| 2EB | Comamonas | acidovorans |
| 3NB | Comamonas | acidovorans |
| 6HB | Comamonas | acidovorans |
| 6NB | Comamonas | acidovorans |
| 4EB | Acidovorax | delafieldii |
| 4NB | Acidovorax | delafieldii |
| 6NB | Acidovorax | delafieldii |
| 4NB | Rhodococcus | rhodochrous |
| 7NB | Rhodococcus | rhodochrous |
| 2EB | Rhodococcus | erythropolis |
| 3EB | Rhodococcus | erythropolis |
| 6HB | Rhodococcus | erythropolis |
| 4EB* | Rhodococcus | fascians |
| 5EB* | Rhodococcus | fascians |
| 4NB | Aureobacterium | barkeri |
| 4HB | Aureobacterium | esteroaromaticum |
| 4NB | Aureobacterium | esteroaromaticum |
| 6HB | Aureobacterium | saperdae |
| 5EB | Micrococcus | varians |
| 7NB | Micrococcus | varians |
| 7NB | Micrococcus | kristinae |
| 6HB | Aeromonas | caviae |
| 6NB | Aeromonas | caviae |
| 2EB | Stenotrophomonas | maltophilia |
| 3EB | Stenotrophomonas | maltophilia |
| 4EB | Stenotrophomonas | maltophilia |
| 5EB | Stenotrophomonas | maltophilia |
| 6HB | Stenotrophomonas | maltophilia |
| 6NB | Stenotrophomonas | maltophilia |
| 4EB | Sphingobacterium | thalpophilum |
| 4NB* | Sphingobacterium | spiritivorum |
| 4NB | Shewanella | putrefaciens B |
| 3NB* | Phyllobacterium | myrsinacearum |
| 6HB | Clavibacter | michiganense |
| 6HB | Clavibacter | michiganense**** |
| 6NB | Alcaligenes | xylosoxydans |

TABLE 14-continued

| Sample ID | Genus | Species |
|---|---|---|
| 7HB* | Gordoina | terrae |
| 7NB | Corynebacterium | aquaticum B |
| 7NB | Cytophaga | johnsonae |

\* = low similarity index indicating a poor match with the fatty-acid database. In these cases, the species in the consortia listed was matched to a database testing substrate utilization and remained unidentified. The (*) best describes an unknown genera/species.
\*\* = GC Subgroup A subspecies
\*\*\* = GC Subgroup B subspecies
\*\*\*\* = tessellarius subspecies In accordance with an embodiment of the present invention, butane-utilizing bacteria have been found to withstand TCE concentrations that have proven fatal to methanotrophic bacteria. The butane-utilizing bacteria also demonstrate higher TCE degradation than propane-utilizing bacteria. In addition, analysis of TCE degradation by selected isolates indicates that certain butane-utilizing bacteria use TCE as a carbon source.

In accordance with the present invention, butane biostimulation destroys pollutants in-situ by introducing bacteria and/or encouraging indigenous bacteria already acclimated to site conditions to flourish, and does not rely on chemical transfer to activated carbon or catalytic destructions. Since the growth of butane-utilizing bacteria extends throughout the zone of butane biostimulation, the system and method of the present invention may remediate contamination in the saturated zone, capillary fringe and vadose zone of contaminated groundwater sites. The preferred butane delivery system of the present invention operates with minimal maintenance, and also operates under extreme conditions of heat and cold. The system and method of the present invention provide convenient and low-cost remediation alternatives to conventional hazardous waste site cleanup techniques.

Whereas particular embodiments of this invention have been described above for purposes of illustration, it will be evident to those skilled in the art that numerous variations of the details of the present invention may be made without departing from the invention as defined in the appended claims.

What is claimed is:

1. An in-situ bioremediation system comprising:
a source of a butane substrate;
a source of an oxygen-containing gas; and
at least one injector in flow communication with the source of butane substrate and the source of oxygen-containing gas, wherein the butane substrate comprises at least about 10 weight percent butane.

2. The system of claim 1, wherein the butane substrate comprises at least about 50 weight percent butane.

3. The system of claim 1, wherein the butane substrate comprises at least about 90 weight percent butane.

4. The system of claim 1, wherein the butane substrate comprises at least about 99 weight percent n-butane.

5. The system of claim 1, wherein the source of butane substrate comprises a butane cylinder.

6. The system of claim 5, wherein the butane cylinder is in flow communication with a source of pusher gas.

7. The system of claim 6, wherein the pusher gas comprises helium.

8. The system of claim 7, wherein the source of pusher gas comprises a helium cylinder.

9. The system of claim 1, wherein the source of butane substrate comprises means for storing the butane substrate in liquid form.

10. The system of claim 1, wherein the butane substrate is supplied to the injector in liquid form.

11. The system of claim 1, wherein the butane substrate is supplied to the injector in gaseous form.

12. The system of claim 1, wherein the oxygen-containing gas comprises air.

13. The system of claim 12, wherein the source of oxygen-containing gas comprises an air compressor.

14. The system of claim 12, wherein the source of oxygen-containing gas comprises atmospheric air.

15. The system of claim 1, wherein the source of oxygen-containing gas comprises an oxygen cylinder.

16. The system of claim 1, wherein the system comprises a plurality of the injectors.

17. The system of claim 16, wherein the source of butane substrate is in flow communication with a first one of the injectors and the source of oxygen-containing gas is in flow communication with a second one of the injectors.

18. The system of claim 16, wherein the butane substrate and the oxygen-containing gas are supplied to separate ones of the injectors.

19. The system of claim 16, wherein both the butane substrate and the oxygen-containing gas are supplied to each of the injectors.

20. The system of claim 1, wherein the system comprises one of the injectors and both the source of butane substrate and the source of oxygen-containing gas are in flow communication with the injector.

21. The system of claim 1, wherein the at least one injector comprises a fluid inlet at a proximal end thereof and a fluid outlet at a distal end thereof.

22. The system of claim 21, wherein the at least one injector comprises a plurality of dispersion openings at the distal end thereof.

23. The system of claim 21, wherein the at least one injector has a length of from about 1 to about 500 feet from its proximal end to its distal end.

24. The system of claim 21, wherein the distal end of the at least one injector is positioned below an upper surface of a contaminated waste site a distance of from 0 to about 500 feet.

25. The system of claim 21, wherein the distal end of the at least one injector is positioned below an upper surface of a contaminated waste site a distance of from about 1 to about 100 feet.

26. The system of claim 21, wherein the distal end of the at least one injector is positioned below ground.

27. The system of claim 26, wherein the distal end of the at least one injector is positioned in groundwater.

28. The system of claim 26, wherein the distal end of the at least one injector is positioned in soil.

29. The system of claim 1, further comprising at least one valve in flow communication between the source of butane substrate and the at least one injector.

30. The system of claim 29, wherein the valve is in flow communication between the source of oxygen-containing gas and the at least one injector.

31. The system of claim 29, further comprising a controller for the at least one valve.

32. The system of claim 31, wherein the controller comprises means for periodically opening and closing the at least one valve.

33. The system of claim 31, wherein the controller comprises a timer.

34. The system of claim 1, further comprising at least one valve in flow communication between the source of oxygen-containing gas and the at least one injector.

35. The system of claim 1, further comprising means for periodically supplying the butane substrate to the at least one injector.

36. The system of claim 35, further comprising means for periodically supplying the oxygen-containing gas to the at least one injector.

37. The system of claim 1, further comprising a source of bacterial nutrients in flow communication with the at least one injector.

38. The system of claim 37, wherein the bacterial nutrients comprise at least one compound selected from nitrogen-containing compounds and phosphorous-containing compounds.

39. The system of claim 38, wherein the bacterial nutrients comprise ammonia, nitrate, ammonium chloride and sodium orthophosphate salts, or a combination thereof.

40. The system of claim 1, further comprising a source of butane-utilizing bacteria in flow communication with the at least one injector.

41. The system of claim 40, wherein the at least one injector comprises an opening at a proximal end thereof in flow communication with the source of butane-utilizing bacteria.

42. The system of claim 40, wherein the butane-utilizing bacteria comprises at least one bacterium selected from the group consisting of Pseudomonas, Variovorax, Nocardia, Chryseobacterium, Comamonas, Acidovorax, Rhodococcus, Aureobacterium, Micrococcus, Aeromonas, Stenotrophomonas, Sphingobacterium, Shewanella, Phyllobacterium, Clavibacter, Alcaligenes, Gordona, Corynebacterium and Cytophaga.

43. The system of claim 40, wherein the butane-utilizing bacteria comprises at least one bacterium selected from the group consisting of *putida, rubrisubalbicans, aeruginosa, paradoxus, asteroides, brasiliensis, restricta, globerula, indologenes, meningosepticum, acidovorans, delafieldii, rhodochrous, erythropolis, fascians, barkeri, esteroaromaticum, saperdae, varians, kristinae, caviae, maltophilia, thalpophilum, spiritivorum, putrefaciens B, myrsinacearum, michiganense, xylosoxydans, terrae, aquaticum B* and *johnsonae.*

44. The system of claim 40, wherein the butane-utilizing bacteria comprises at least one bacterium selected from the group consisting of *Pseudomonas rubrisubalbicans, Pseudomonas aeruginosa, Variovorax paradoxus, Nocardia asteroides, Nocardia restricta, Chryseobacterium indologenes, Comamonas acidovorans, Acidovorax delafieldii, Rhodococcus rhodochrous, Rhodococcus erythropolis, Aureobacterium esteroaromaticum, Aureobacterium saperdae, Micrococcus varians, Micrococcus kristinae, Aeromonas caviae, Stenotrophomonas maltophilia, Sphingobacterium thalpophilum, Clavibacter michiganense, Alcaligenes xylosoxydans, Corynebacterium aquaticum B* and *Cytophaga johnsonae.*

45. A method of treating a contaminated site comprising:
supplying a butane substrate to the contaminated site; and
supplying an oxygen-containing gas to the contaminated site wherein the butane substrate comprises at least about 10 weight percent butane.

46. The method of claim 45, wherein the butane substrate comprises at least about 50 weight percent butane.

47. The method of claim 45, wherein the butane substrate comprises at least about 90 weight percent butane.

48. The method of claim 45, wherein the butane substrate comprises at least about 99 weight percent n-butane.

49. The method of claim 45, wherein the butane substrate is supplied to the contaminated site in liquid form.

50. The method of claim 45, further comprising supplying the butane substrate to the contaminated site continuously.

51. The method of claim 45, further comprising supplying the butane substrate to the contaminated site periodically.

52. The method of claim 45, wherein the oxygen-containing gas comprises air.

53. The method of claim 45, further comprising supplying the oxygen-containing gas to the contaminated site continuously.

54. The method of claim 45, further comprising supplying the oxygen-containing gas to the contaminated site periodically.

55. The method of claim 45, further comprising supplying bacterial nutrients to the contaminated site.

56. The method of claim 55, wherein the bacterial nutrients comprise at least one compound selected from nitrogen-containing compounds and phosphorous-containing compounds.

57. The method of claim 56, wherein the bacterial nutrients comprise ammonia, nitrate, ammonium chloride and sodium orthophosphate salts, or a combination thereof.

58. The method of claim 45, further comprising supplying butane-utilizing bacteria to the contaminated site.

59. The method of claim 58, wherein the butane-utilizing bacteria are non-indigenous to the contaminated site.

60. The method of claim 45, wherein the supply of butane substrate and the supply of oxygen-containing gas stimulate the growth of butane-utilizing bacteria at the contaminated site comprising at least one bacterium selected from the group consisting of Pseudomonas, Variovorax, Nocardia, Chryseobacterium, Comamonas, Acidovorax, Rhodococcus, Aureobacterium, Micrococcus, Aeromonas, Stenotrophomonas, Sphingobacterium, Shewanella, Phyllobacterium, Clavibacter, Alcaligenes, Gordona, Corynebacterium and Cytophaga.

61. The method of claim 45, wherein the supply of butane substrate and the supply of oxygen-containing gas stimulate the growth of butane-utilizing bacteria at the contaminated site comprising at least one bacterium selected from the group consisting of *putida, rubrisubalbicans, aeruginosa, paradoxus, asteroides, brasiliensis, restricta, globerula, indologenes, meningosepticum, acidovorans, delafieldii, rhodochrous, erythropolis, fascians, barkeri, esteroaromaticum, saperdae, varians, kristinae, caviae, maltophilia, thalpophilum, spiritivorum, putrefaciens B, myrsinacearum, michiganense, xylosoxydans, terrae, aquaticum B* and *johnsonae*.

62. The method of claim 45, wherein the supply of butane substrate and the supply of oxygen-containing gas stimulate the growth of butane-utilizing bacteria at the contaminated site comprising at least one bacterium selected from the group consisting of *Pseudomonas rubrisubalbicans, Pseudomonas aeruginosa, Variovorax paradoxus, Nocardia asteroides, Nocardia restricta, Chryseobacterium indologenes, Comamonas acidovorans, Acidovorax delafieldii, Rhodococcus rhodochrous, Rhodococcus erythropolis, Aureobacterium esteroaromaticum, Aureobacterium saperdae, Micrococcus varians, Micrococcus kristinae, Aeromonas caviae, Stenotrophomonas maltophilia, Sphingobacterium thalpophilum, Clavibacter michiganense, Alcaligenes xylosoxydans, Corynebacterium aquaticum B* and *Cytophaga johnsonae*.

63. The method of claim 45, wherein the contaminated site comprises soil.

64. The method of claim 45, wherein the contaminated site comprises surface water.

65. The method of claim 45, wherein the contaminated site comprises groundwater.

66. The method of claim 45, wherein the contaminated site is below a ground surface.

67. The method of claim 45, wherein the butane substrate and the oxygen-containing gas are supplied to the contaminated site at a depth of from about 1 to about 500 feet below the ground surface.

68. The method of claim 66, wherein the butane substrate and the oxygen-containing gas are supplied to the contaminated site at a depth of from about 1 to about 100 feet below the ground surface.

69. The method of claim 45, wherein the contaminated site comprises a hydrocarbon pollutant.

70. The method of claim 45, wherein the contaminated site comprises at least one pollutant selected from the group consisting of chlorinated aliphatics, chlorinated aromatics and non-chlorinated aromatics.

71. The method of claim 45, wherein the contaminated site comprises a trichloroethene pollutant.

72. The method of claim 45, wherein the contaminated site comprises a trichloroethane pollutant.

73. The method of claim 45, wherein the contaminated site comprises a polychlorinated biphenyl pollutant.

74. The method of claim 45, wherein the contaminated site comprises a petroleum pollutant.

75. An in-situ bioremediation system comprising:
   means for supplying a butane substrate to a contaminated site; and
   means for supplying an oxygen-containing gas to the contaminated site, wherein the butane substrate comprises at least about 10 weight percent butane.

76. The system of claim 75, wherein the butane substrate comprises at least about 50 weight percent butane.

77. The system of claim 75, wherein the butane substrate comprises at least about 90 weight percent butane.

78. The system of claim 75, wherein the butane substrate comprises at least about 99 weight percent n-butane.

79. The system of claim 75, further comprising means for supplying the butane substrate to the contaminated site in liquid form.

80. The system of claim 75, further comprising means for supplying the butane substrate to the contaminated site continuously.

81. The system of claim 75, further comprising means for supplying the butane substrate to the contaminated site periodically.

82. The system of claim 75, wherein the oxygen-containing gas comprises air.

83. The system of claim 75, further comprising means for supplying the oxygen-containing gas to the contaminated site continuously.

84. The system of claim 75, further comprising means for supplying the oxygen-containing gas to the contaminated site periodically.

85. The system of claim 75, further comprising means for supplying bacterial nutrients to the contaminated site.

86. The system of claim 75, further comprising means for supplying butane-utilizing bacteria to the contaminated site.

87. The system of claim 75, wherein the contaminated site comprises soil.

88. The system of claim 75, wherein the contaminated site comprises surface water.

89. The system of claim 75, wherein the contaminated site comprises groundwater.

90. The system of claim 75, wherein the contaminated site is below a ground surface.

91. The system of claim 90, wherein the butane substrate and the oxygen-containing gas are supplied to the contaminated site at a depth of from about 1 to about 500 feet below the ground surface.

92. The system of claim 90, wherein the butane substrate and the oxygen-containing gas are supplied to the contaminated site at a depth of from about 1 to about 100 feet below the ground surface.

93. The system of claim 75, wherein the contaminated site comprises a hydrocarbon pollutant.

94. The system of claim 75, wherein the contaminated site comprises at least one pollutant selected from the group consisting of chlorinated aliphatics, chlorinated aromatics and non-chlorinated aromatics.

95. The system of claim 75, wherein the contaminated site comprises a trichloroethene pollutant.

96. The system of claim 75, wherein the contaminated site comprises a trichloroethane pollutant.

97. The system of claim 75, wherein the contaminated site comprises a methyl tertiary butyl ether pollutant.

98. The system of claim 75, wherein the contaminated site comprises a polychlorinated biphenyl pollutant.

99. The system of claim 75, wherein the contaminated site comprises a petroleum pollutant.

* * * * *

UNITED STATES PATENT AND TRADEMARK OFFICE
CERTIFICATE OF CORRECTION

PATENT NO. : 6,245,235 B1
DATED : June 12, 2001
INVENTOR(S) : Felix Anthony Perriello It is certified that error appears in the above-identified patent and that said Letters Patent is hereby corrected as shown below:

Title page,
Item [56], References Cited, OTHER PUBLICATIONS,
"Fogel et al., "Biodegradation of Chlorinated Ethenes by a Methane-Utilizing Mixed Culture, *Applied and Environment Microbiology*, vol. 51, No. 4, pp. 720-724 (Apr. 1986)." should read -- "Fogel et al., "Biodegradation of Chlorinated Ethenes by a Methane-Utilizing Mixed Culture, *Applied and Environmental Microbiology*, vol. 51, No. 4, pp. 720-724 (Apr. 1986). --.
"Hamamura et al., Chloroform Cometabolism by Butane-Grown CF8, Pseudomonas butanovora, and Myobacterium vaccae JOB5 and Methane-Grown Methylosinus trichosporium OB3b, *Applied and Environmental Microbiology*, vol. 63, No. 9, pp. 3607-3613 (Sep. 1997)." should read -- Harnamura et al., Chroloform Cometabolism by Butane-Grown CF8, Pseudomonas butanovora, and Mycobacterium vaccae JOB5 and Methane-Grown Methylosinus trichosporium OB3b, *Applied and Environmental Microbiology*, vol. 63, No. 9, pp. 3607-1317 (Sep. 1997). --.
"Biodegration of the Gasoline Oxygenates Methyl tert-Butyl Ether, Ethyl tert-Butyl Ether, and tert-Amyl Methyl Ether by Propane-Oxydizing Bacteria, *Applied and Environment Microbiology*, vol. 63, No. 11, pp. 4216-4222, (Nov. 1997)." should read -- Biodegradation of the Gasoline Oxygenates Methyl tert-Butyl Ether, Ethyl, Ethyl tert-Butyl Ether, and tert-Amyl Methyl Ether by Propane-Oxydizing Bacteria, *Applied and Environmental Microbiology*, vol. 63, No. 11, pp. 4216-4222, (Nov. 1997). --.

Column 11,
Line 2, "Saccharopotyspora" should read -- Saccharopolyspora --.

Column 17,
Line 19,
"8EP     cocci     3.8E8" should read
-- 8HP     cocci     3.8E8 --.

Column 18,
Line 46,
"$CH_4$ control-2     968/ --     874/--     8791/--" should read
-- $CH_4$ control-2     968/--     8741/--     8791/-- --.

Column 19,
Lines 19 and 21, "$CH_5$/TCE" should read -- $CH_4$/TCE --.

Column 20,
Line 17, "$C_4H8$/TCE" should read -- $C_4H_8$/TCE --.

UNITED STATES PATENT AND TRADEMARK OFFICE
CERTIFICATE OF CORRECTION

PATENT NO. : 6,245,235 B1
DATED : June 12, 2001
INVENTOR(S) : Felix Anthony Perriello It is certified that error appears in the above-identified patent and that said Letters Patent is hereby corrected as shown below:

Column 21,
Line 59, "Isolates in 3NB, cell density 3.1E8, had initial $C_4H_{10}$/TCE concentrations of 657.3/11.42 ppm, respectively, and final $C_4H_{10}$/TCE concentrations of 559.8/2.368 ppm (see FIGS. 25 and 26.)" should begin a new paragraph.

Column 22,
Line 45, "$C_4H_{10}$TCE" should read -- $C_4H_{10}$/TCE --.

Column 23,
Line 10, "4.6 mg $h^{-1L-1}$" should read -- 4.6 mg $h^{-1}L^{-1}$ --.

Column 24,
Line 66, "4HP4HB" should read -- 4HP-4HB --.

Column 26,
Line 5, "Gordoina" should read -- Gordona --.

Column 30,
Line 3, "claim 45" should read -- claim 66 --.

Signed and Sealed this

Sixteenth Day of May, 2006

JON W. DUDAS
*Director of the United States Patent and Trademark Office*